United States Patent
Hart et al.

(10) Patent No.: US 10,326,869 B2
(45) Date of Patent: Jun. 18, 2019

(54) ENABLING VOICE CONTROL OF TELEPHONE DEVICE

(71) Applicant: AMAZON TECHNOLOGIES, INC., Seattle, WA (US)

(72) Inventors: Gregory Michael Hart, Mercer Island, WA (US); Brian Oliver, Seattle, WA (US); Adrian Hurditch, Seattle, WA (US); Nawdesh Uppal, Mississauga (CA); Reza Abdollahi, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/392,329

(22) Filed: Dec. 28, 2016

(65) Prior Publication Data

US 2018/0054506 A1 Feb. 22, 2018

Related U.S. Application Data

(60) Provisional application No. 62/377,303, filed on Aug. 19, 2016.

(51) Int. Cl.
*H04M 1/00* (2006.01)
*H04M 1/27* (2006.01)
(Continued)

(52) U.S. Cl.
CPC ........ *H04M 1/271* (2013.01); *G05D 23/1919* (2013.01); *H04M 11/045* (2013.01);
(Continued)

(58) Field of Classification Search
CPC .. H04M 1/2535; H04M 11/045; H04M 1/271; H04M 1/6033; H04M 2201/40;
(Continued)

(56) References Cited

U.S. PATENT DOCUMENTS 7,804,815 B1 9/2010 Stahl
7,822,188 B1 10/2010 Kirchhoff et al.
(Continued)

FOREIGN PATENT DOCUMENTS

EP 0568979 A1 11/1993
EP 1041779 A2 10/2000
WO 2007033459 A1 3/2007

OTHER PUBLICATIONS

Hart et al., Pending U.S. Appl. No. 15/392,323, entitled "Enabling Voice Control of Telephone Device"; filed Dec. 28, 2016.
(Continued)

*Primary Examiner* — Nhan T Le
(74) *Attorney, Agent, or Firm* — Pierce Atwood LLP

(57) ABSTRACT

A system capable of connecting a device to a Public Switched Telephone Network (PSTN) using an adapter. The device may send audio data via a data network to a server and the server can determine a voice command included in the audio data. Based on the voice command, the server may send an instruction to an adapter via the data network, the instruction causing the adapter to initiate a telephone call over the PSTN. During the telephone call, the adapter and the server may forward audio data between the device and the PSTN, enabling the device to communicate over the PSTN. The system may enable the device to receive an incoming call from the PSTN and may provide additional functionality, such as determining call statistics during the telephone call, determining if another telephone receives audio data during the telephone call and detecting an alarm signal sent via the PSTN.

20 Claims, 32 Drawing Sheets

(51) Int. Cl.
*G05D 23/19* (2006.01)
*H04M 11/04* (2006.01)
*H04W 84/04* (2009.01)
*H04M 1/253* (2006.01)
*H04M 1/60* (2006.01)

(52) U.S. Cl.
CPC ........ *H04M 1/2535* (2013.01); *H04M 1/6033* (2013.01); *H04M 2201/40* (2013.01); *H04M 2250/74* (2013.01); *H04W 84/042* (2013.01)

(58) Field of Classification Search
CPC ........... H04M 2250/74; H04W 84/042; H04W 92/10; G05D 23/1919
See application file for complete search history.

(56) References Cited

U.S. PATENT DOCUMENTS

| | | | |
|---|---|---|---|
| 2003/0215078 A1 | 11/2003 | Brahm et al. | |
| 2009/0097472 A1 | 4/2009 | Hossain | |
| 2009/0104898 A1 | 4/2009 | Harris | |
| 2010/0290609 A1 | 11/2010 | Clark et al. | |
| 2011/0038469 A1 | 2/2011 | Clark et al. | |
| 2011/0171940 A1* | 7/2011 | Dinur | H04W 48/18 455/414.1 |
| 2013/0053063 A1 | 2/2013 | McSheffrey | |
| 2014/0200896 A1 | 7/2014 | Lee et al. | |
| 2017/0195625 A1* | 7/2017 | Mahar | H04N 7/147 |

OTHER PUBLICATIONS

"First Office Action dated Jul. 24, 2017", U.S. Appl. No. 15/392,323, 23 pages.
Hart et al., Pending U.S. Appl. No. 15/392,314, entitled "Enabling Voice Control of Telephone Device", filed Dec. 28, 2016.
"First Office Action dated Nov. 28, 2017", U.S. Appl. No. 15/392,314, 16 pages.
Kong et al., Pending U.S. Appl. No. 15/692,444, entitled "Voice User Interface for Wired Communications System", filed Aug. 31, 2017.
Do et al., Pending U.S. Appl. No. 15/692,747, entitled "Voice User Interface for Wired Communications System", filed Aug. 31, 2017.
Mee Tchin Jane John Chuan, et al., Pending U.S. Appl. No. 15/692,964, entitled "Enabling Additional Endpoints to Connect to Audio Mixing Device", filed Aug. 31, 2017.
International Search Report and Written Opinion for Application No. PCT/US2017/047611, dated Nov. 6, 2017.
International Preliminary Report on Patentability and Written Opinion for Application No. PCT/US2017/047611, dated Feb. 28, 2019.

* cited by examiner

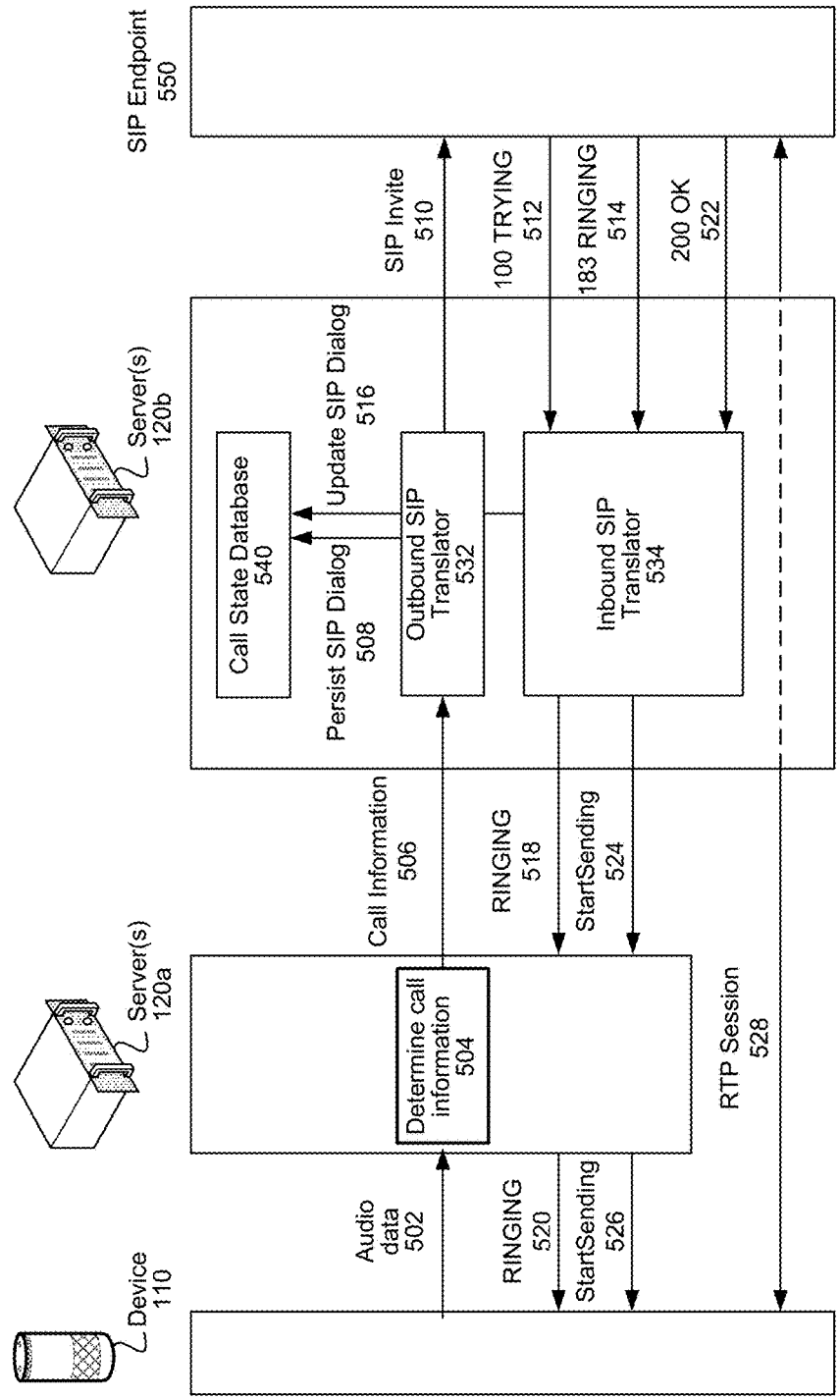

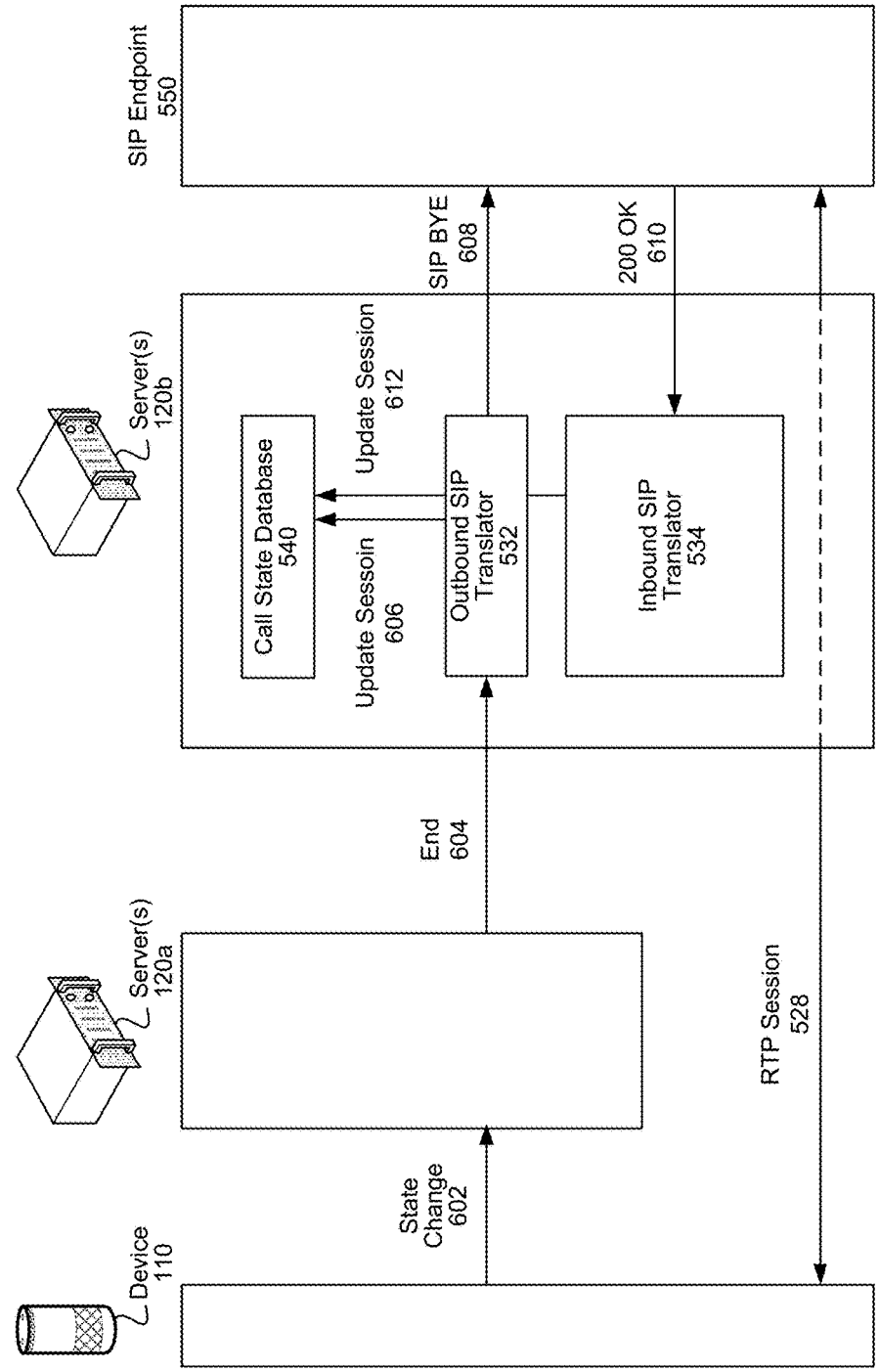

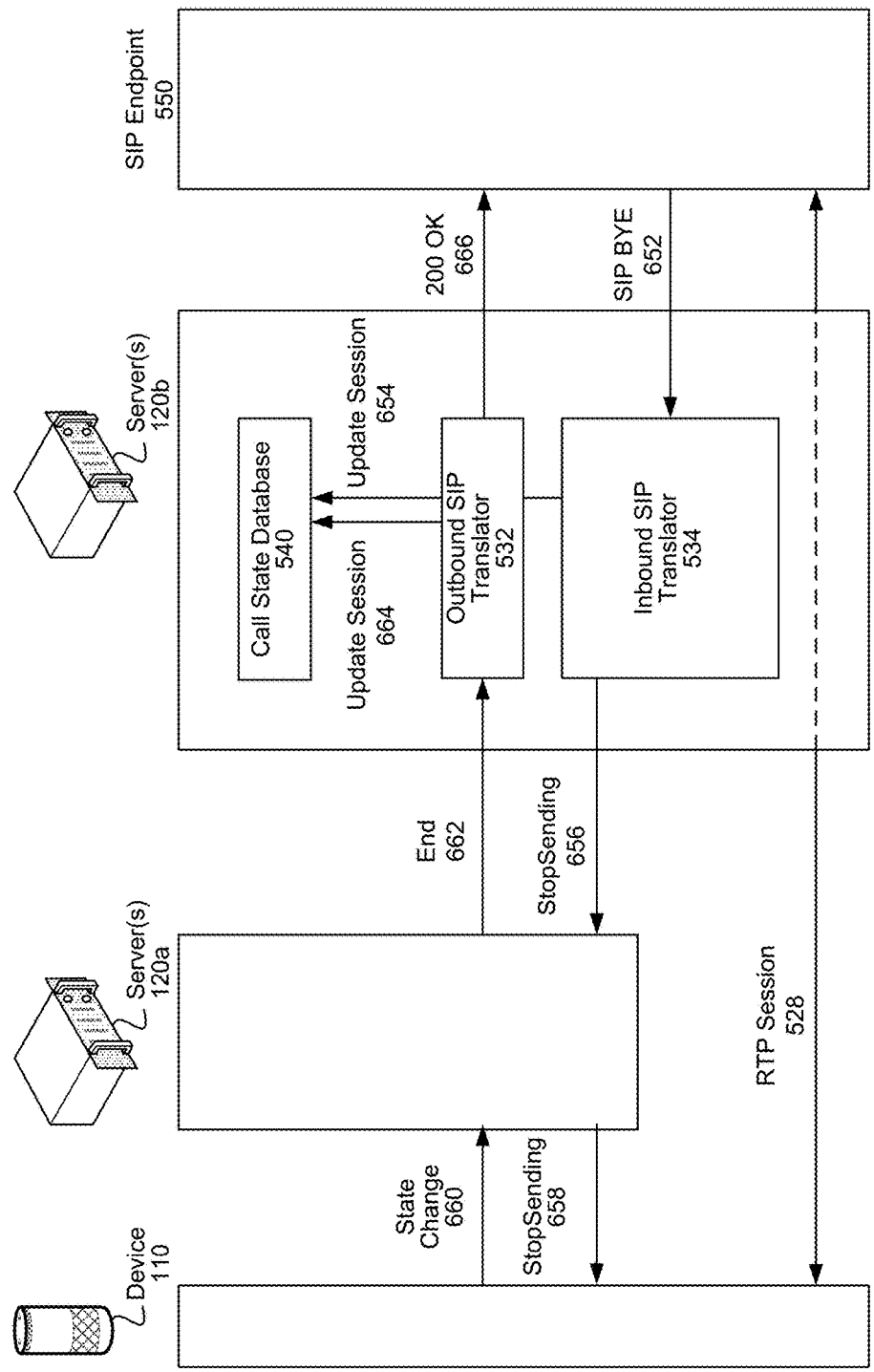

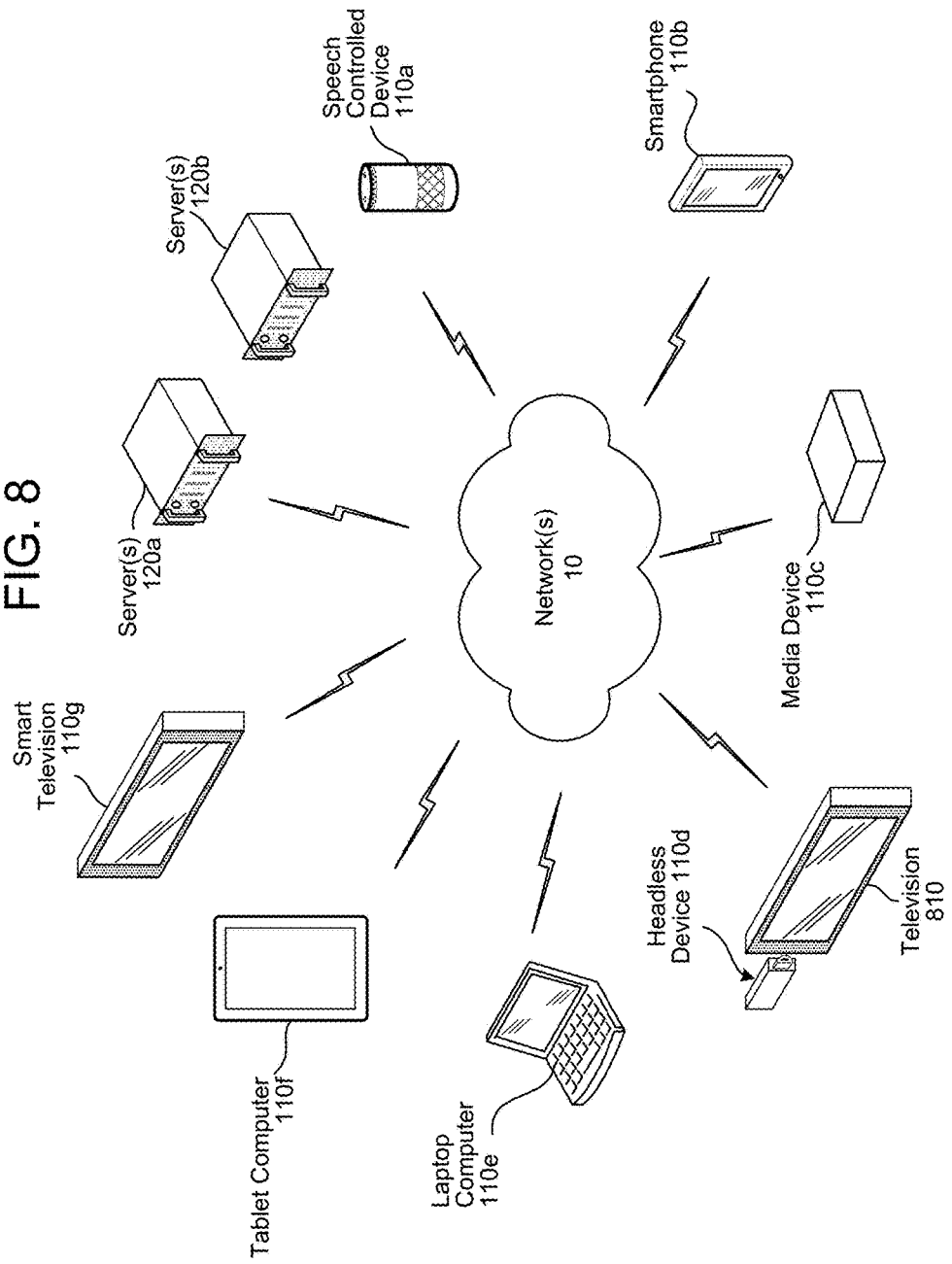

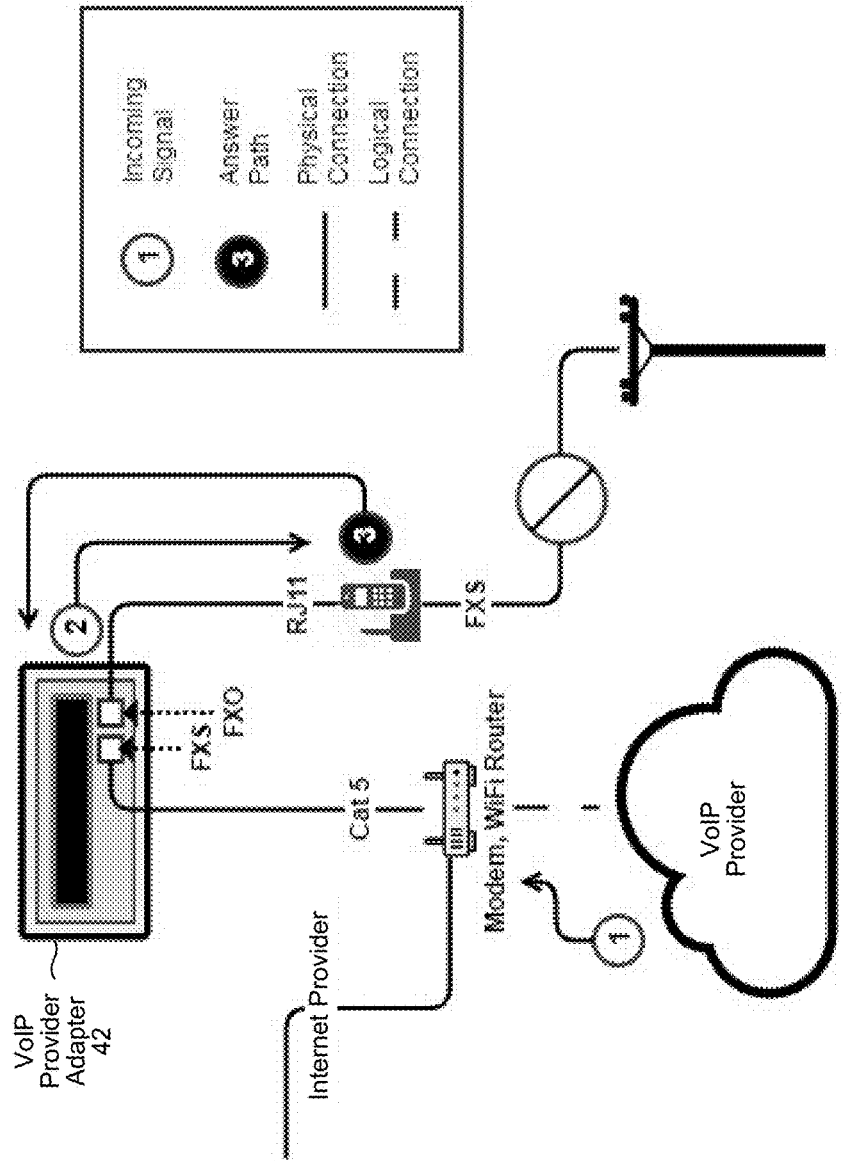

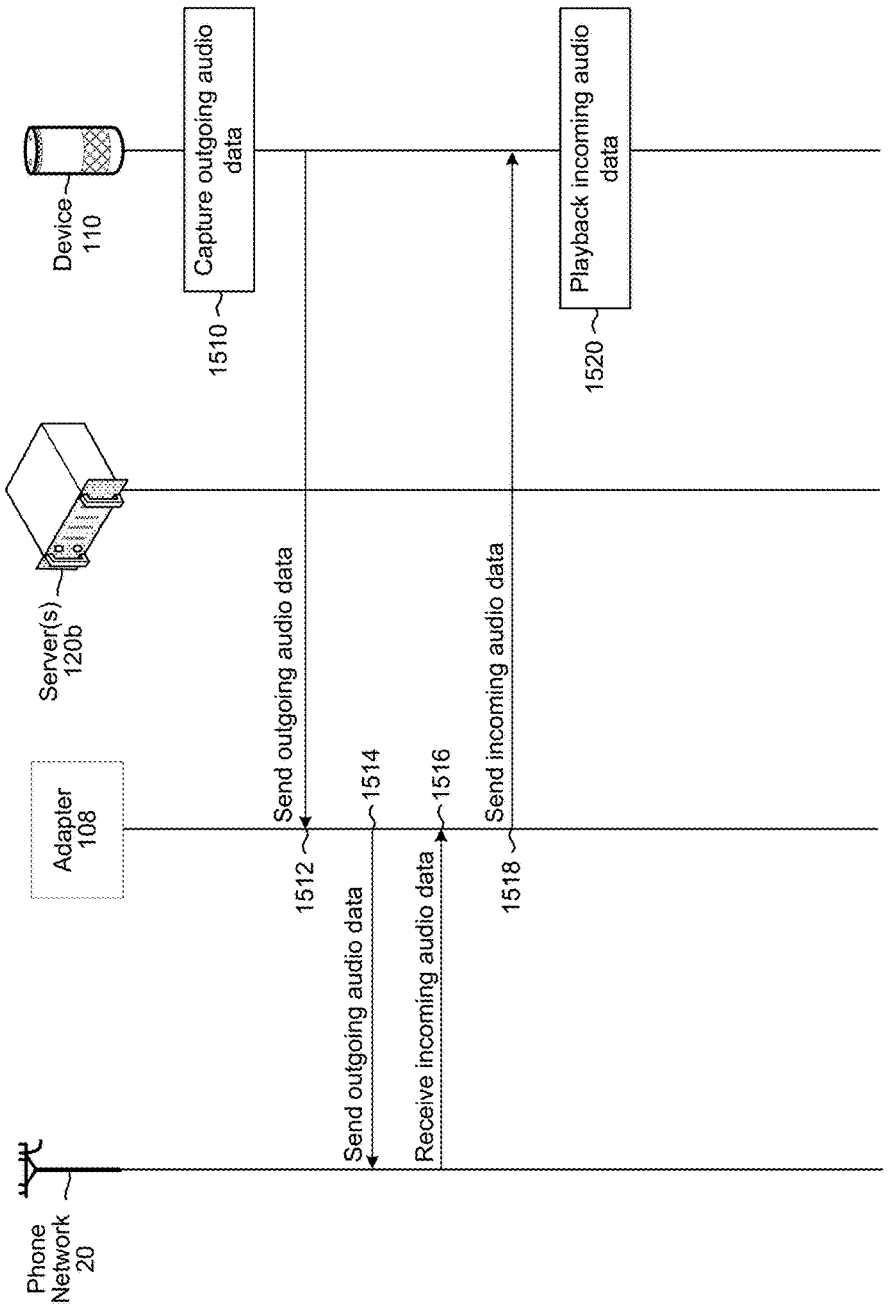

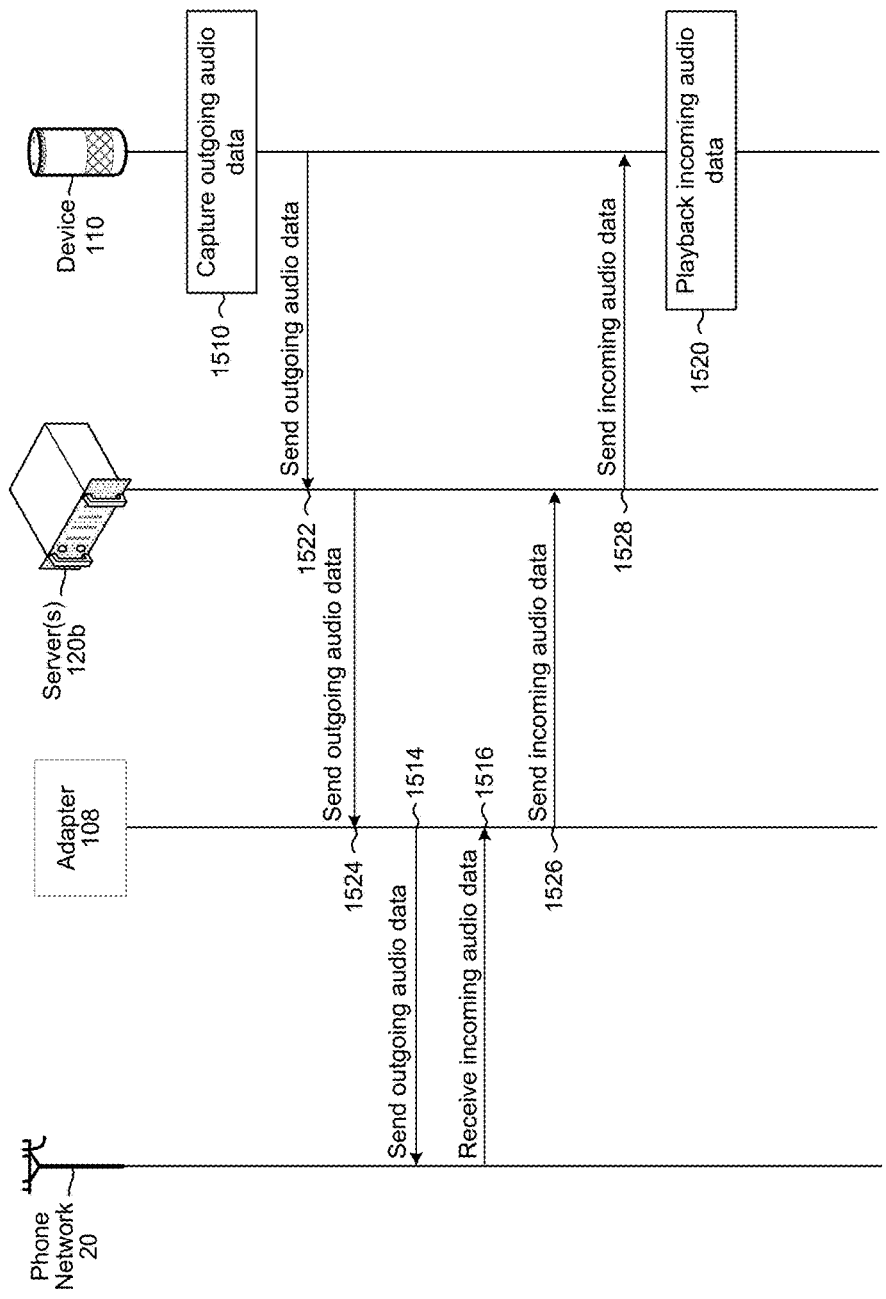

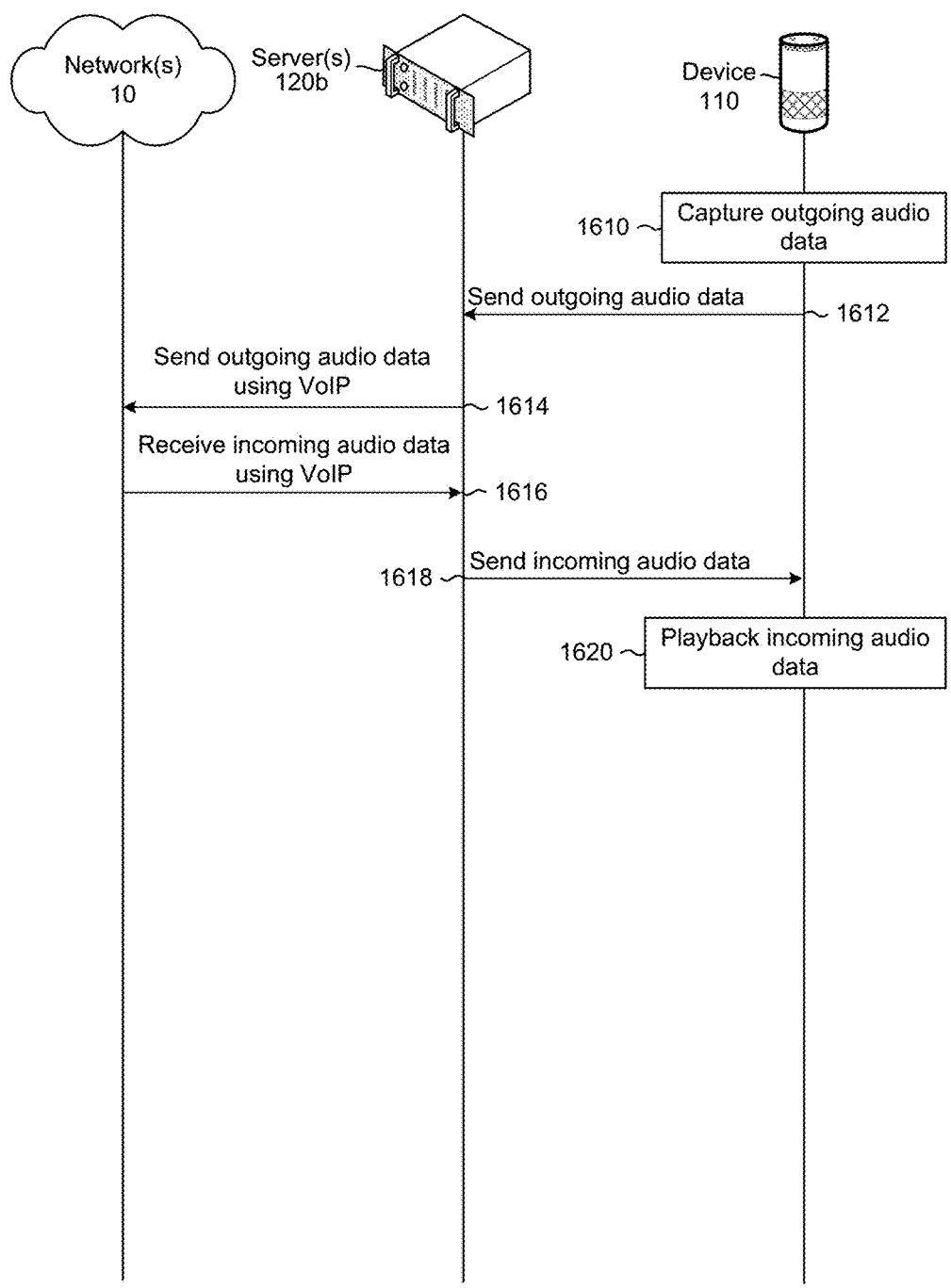

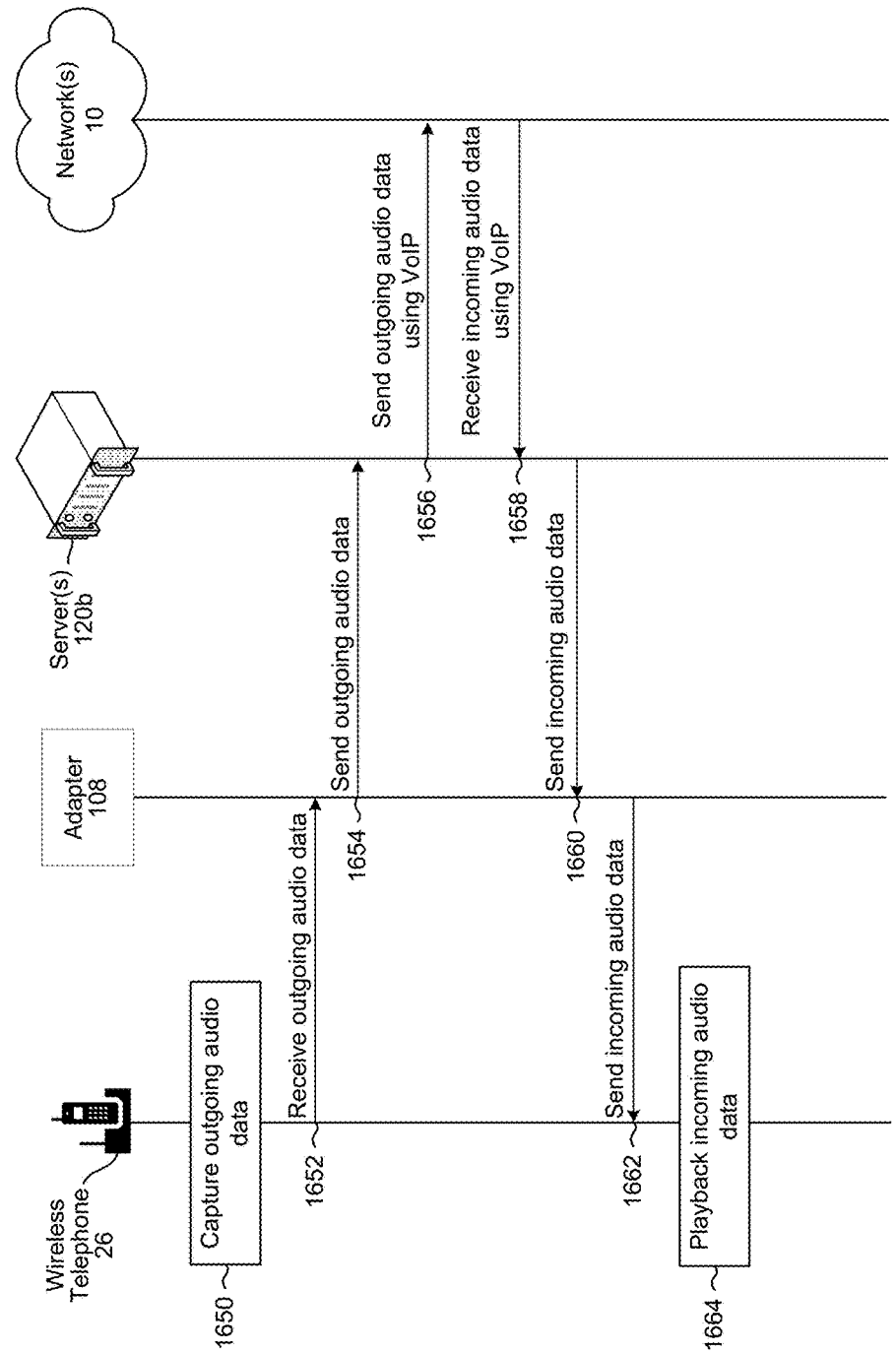

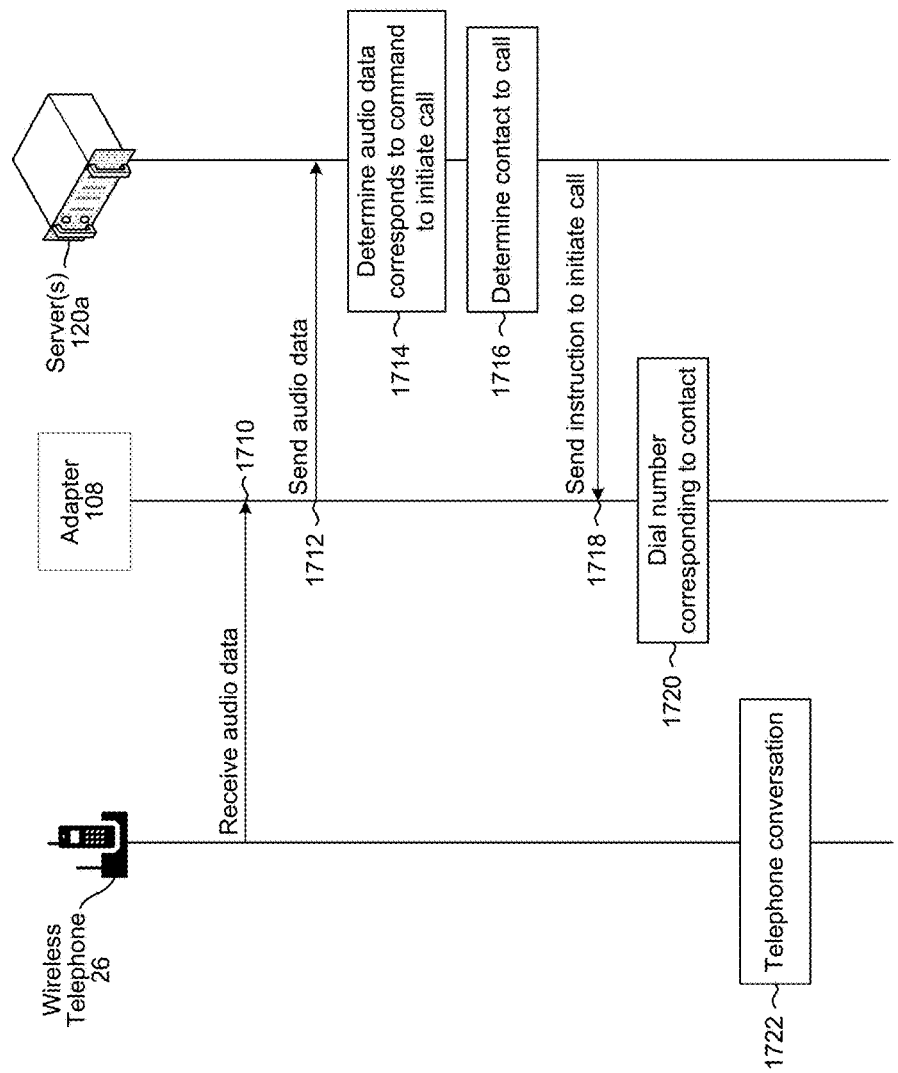

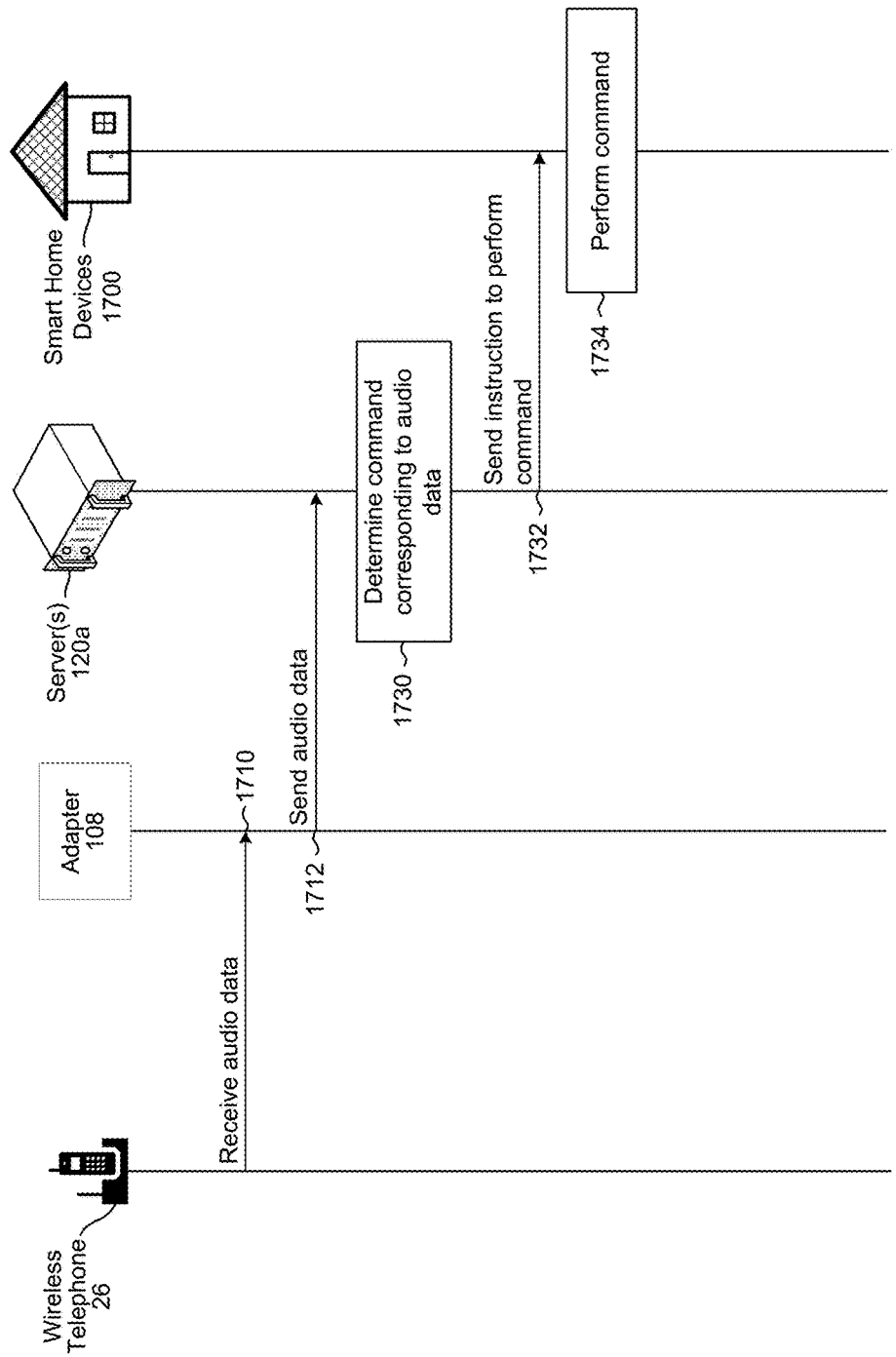

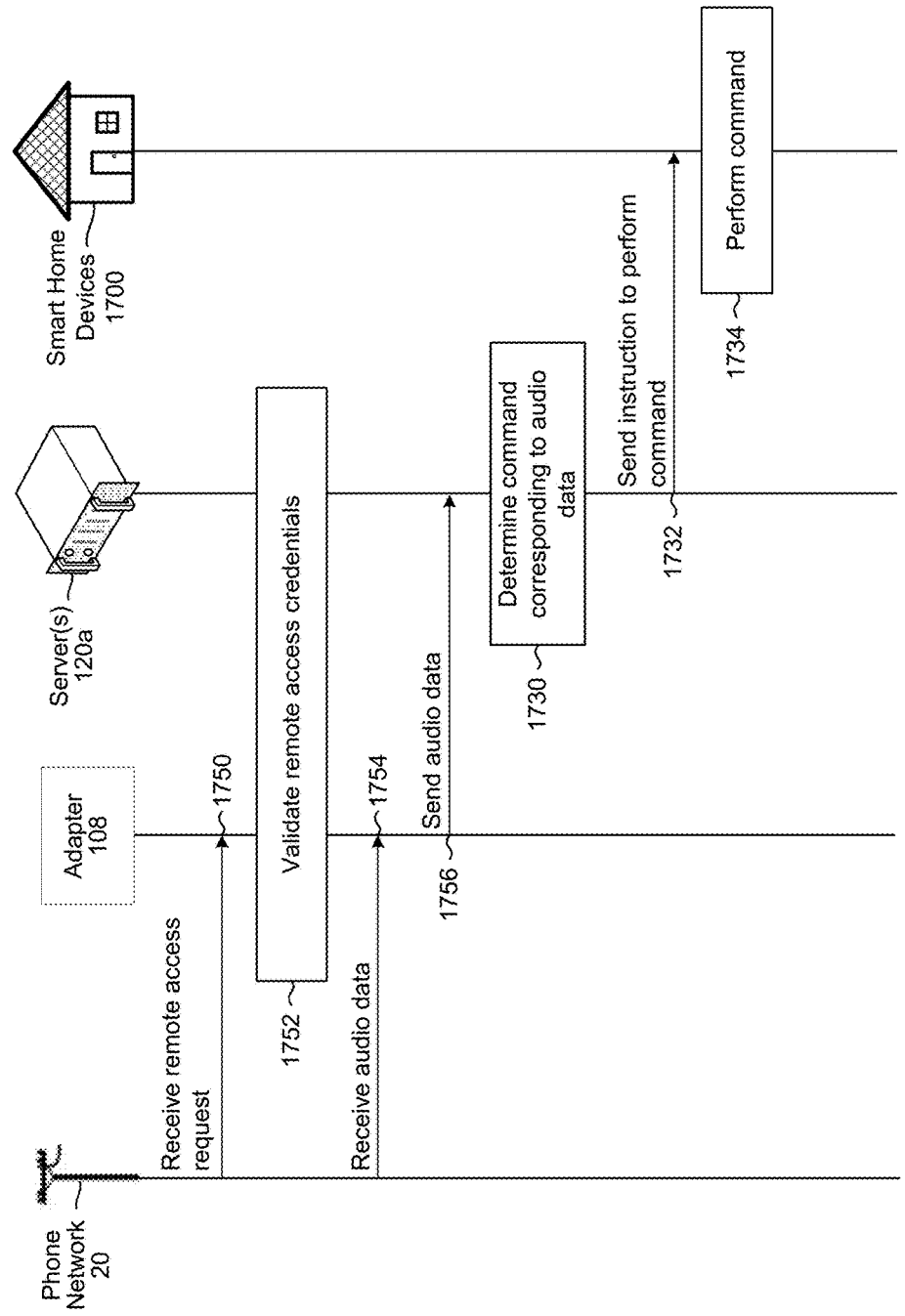

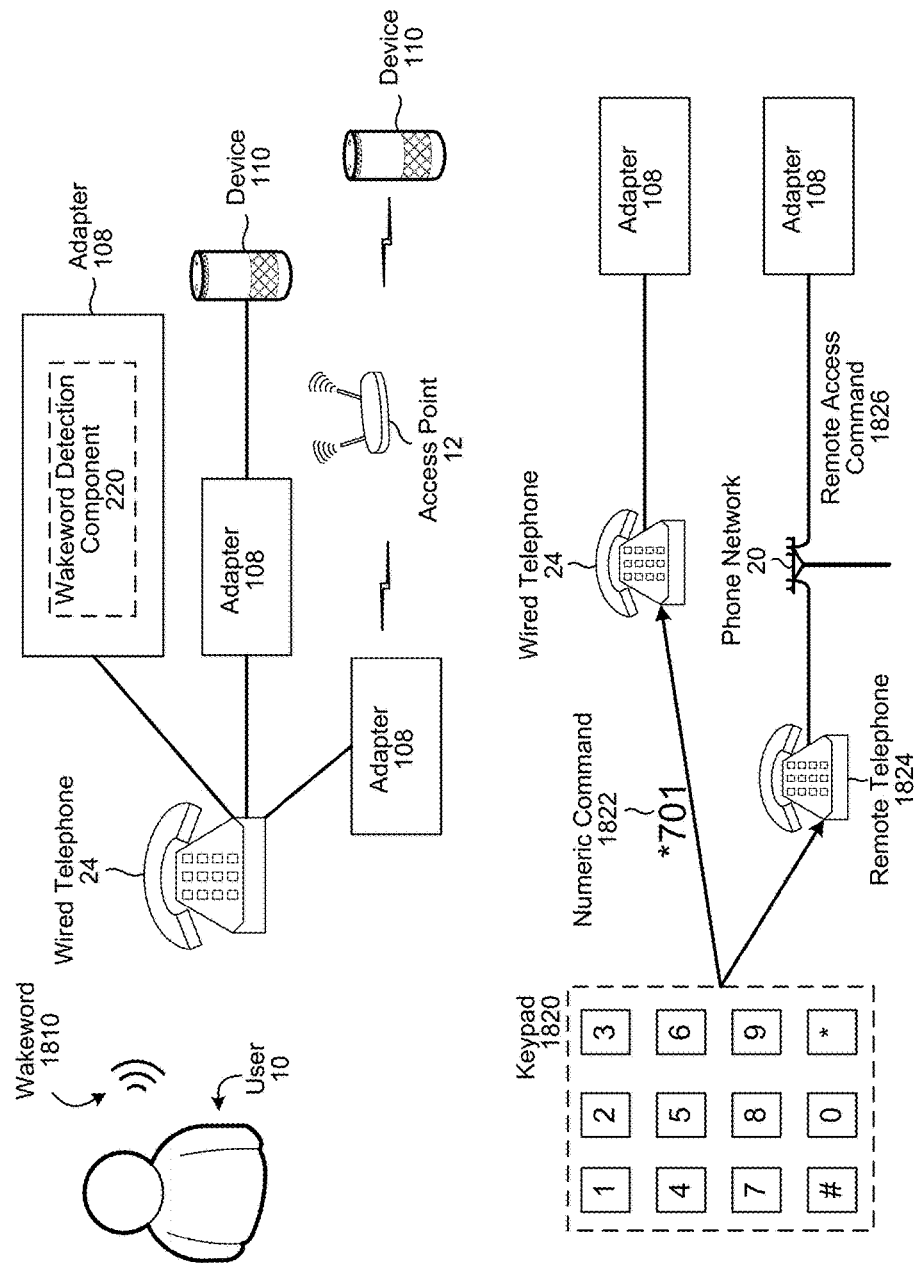

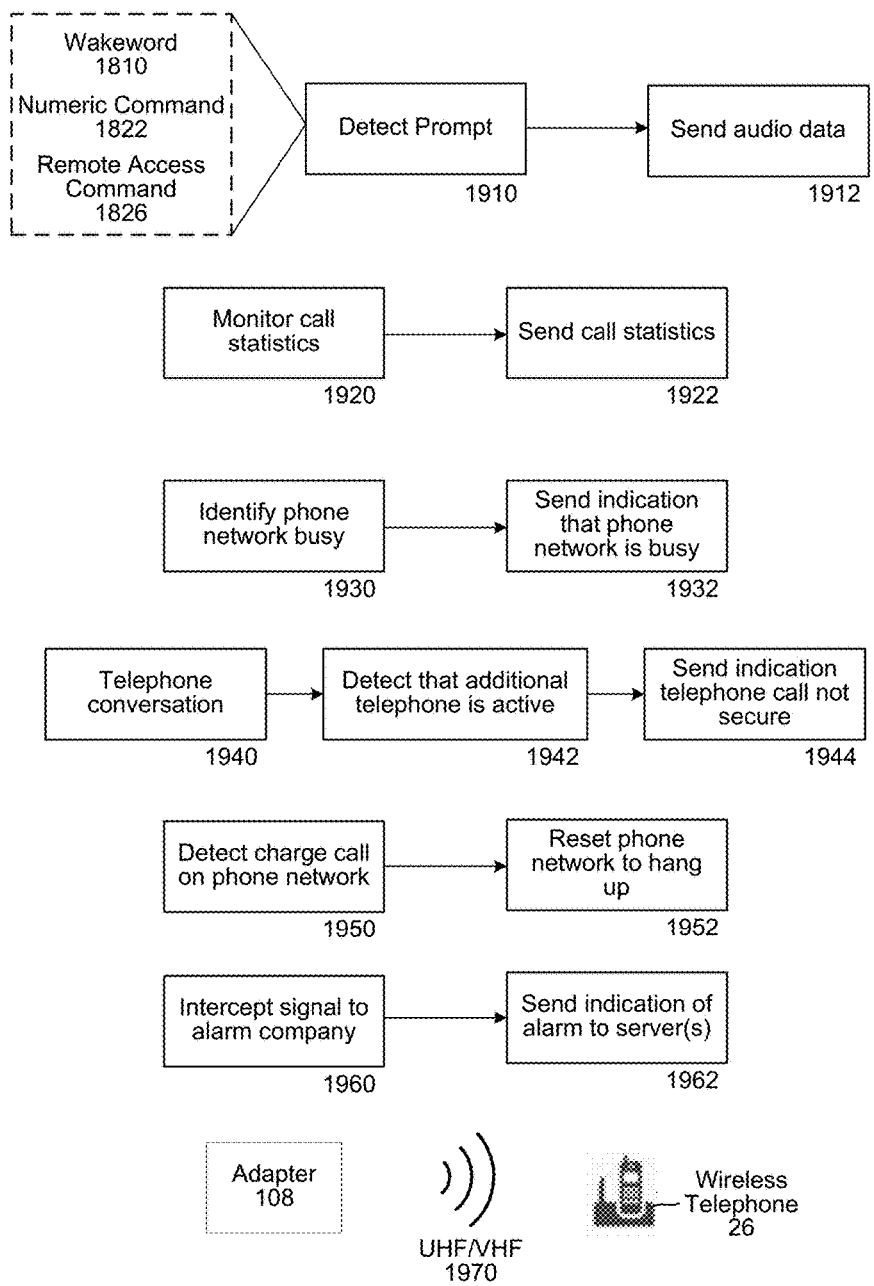

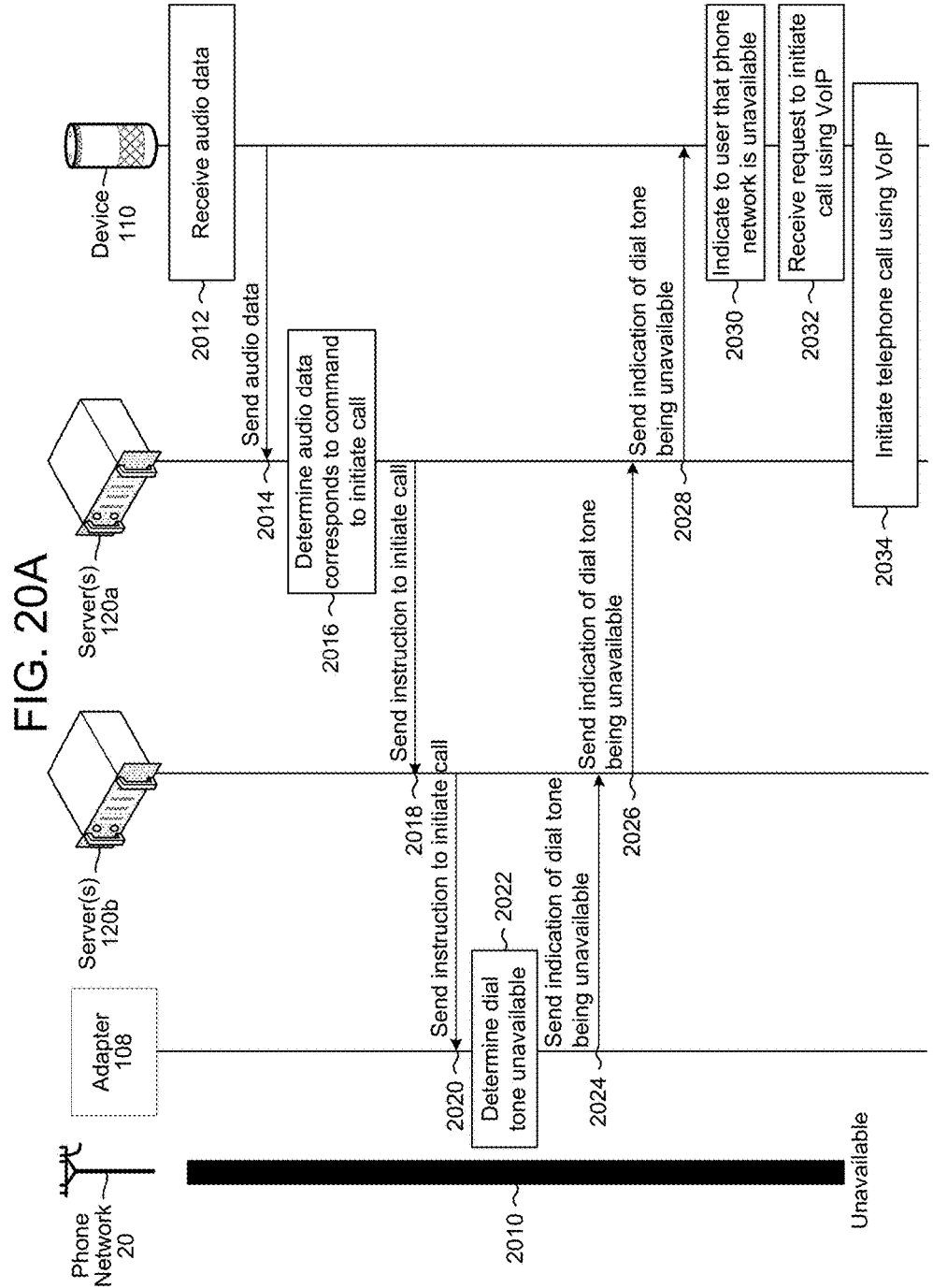

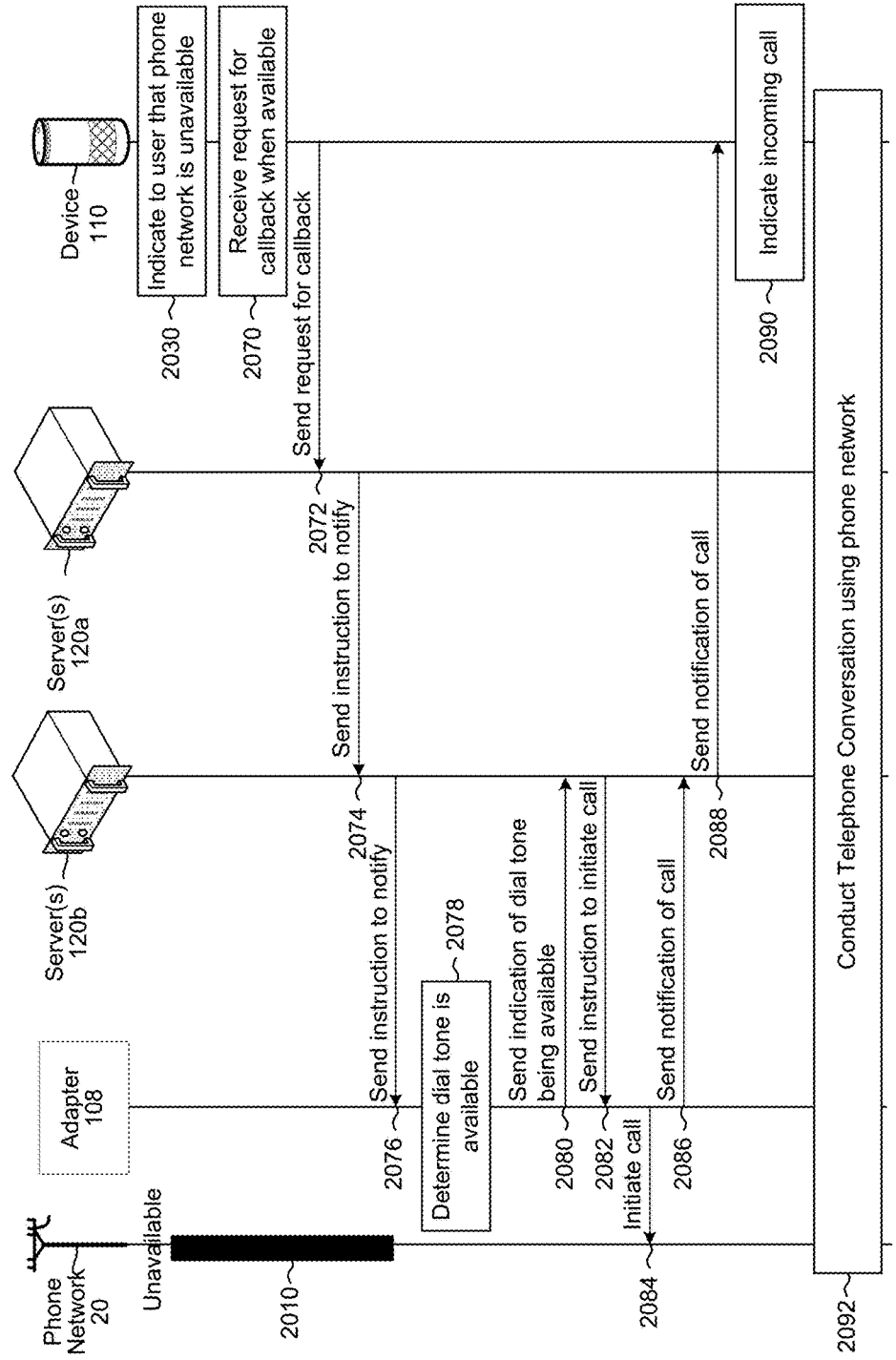

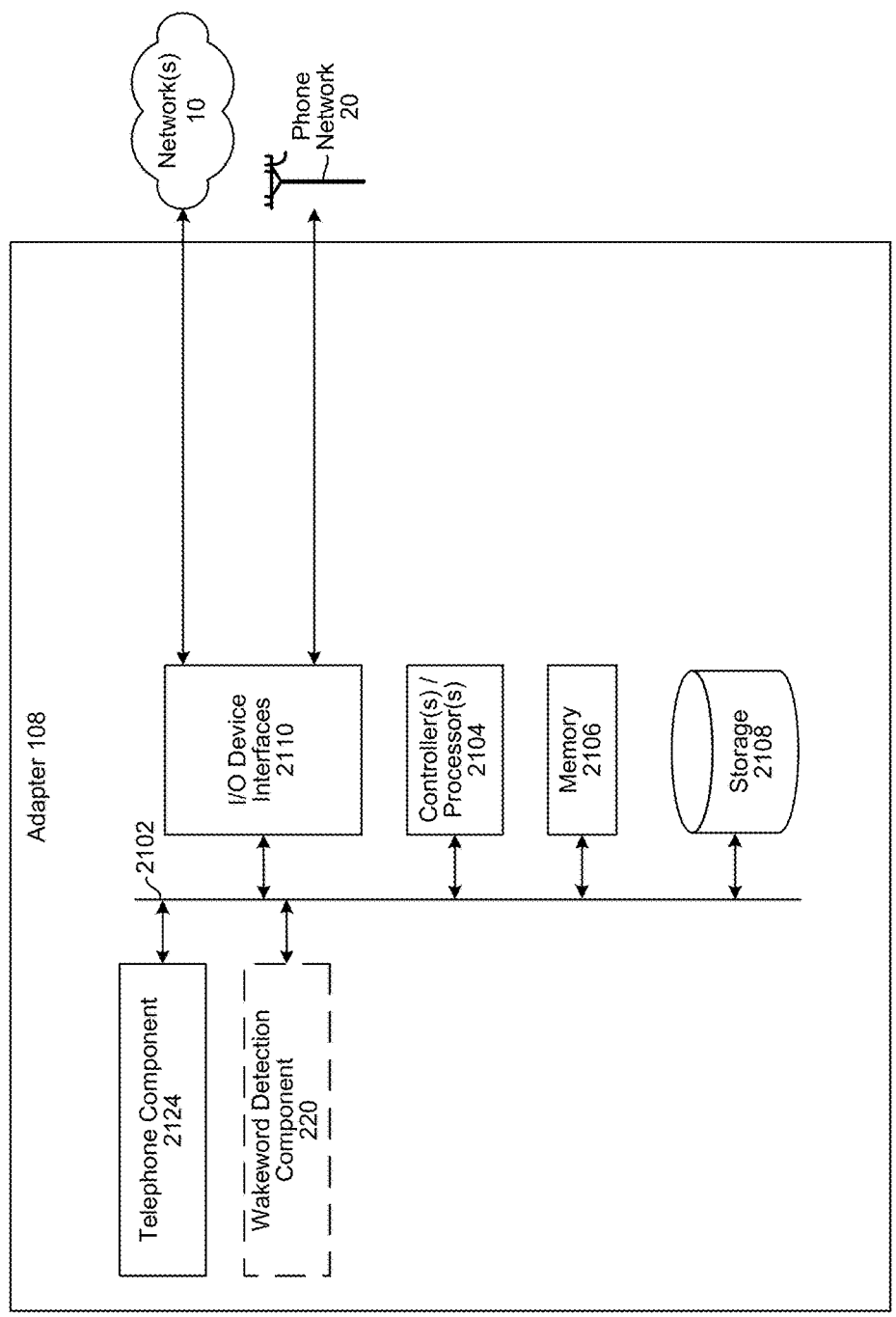

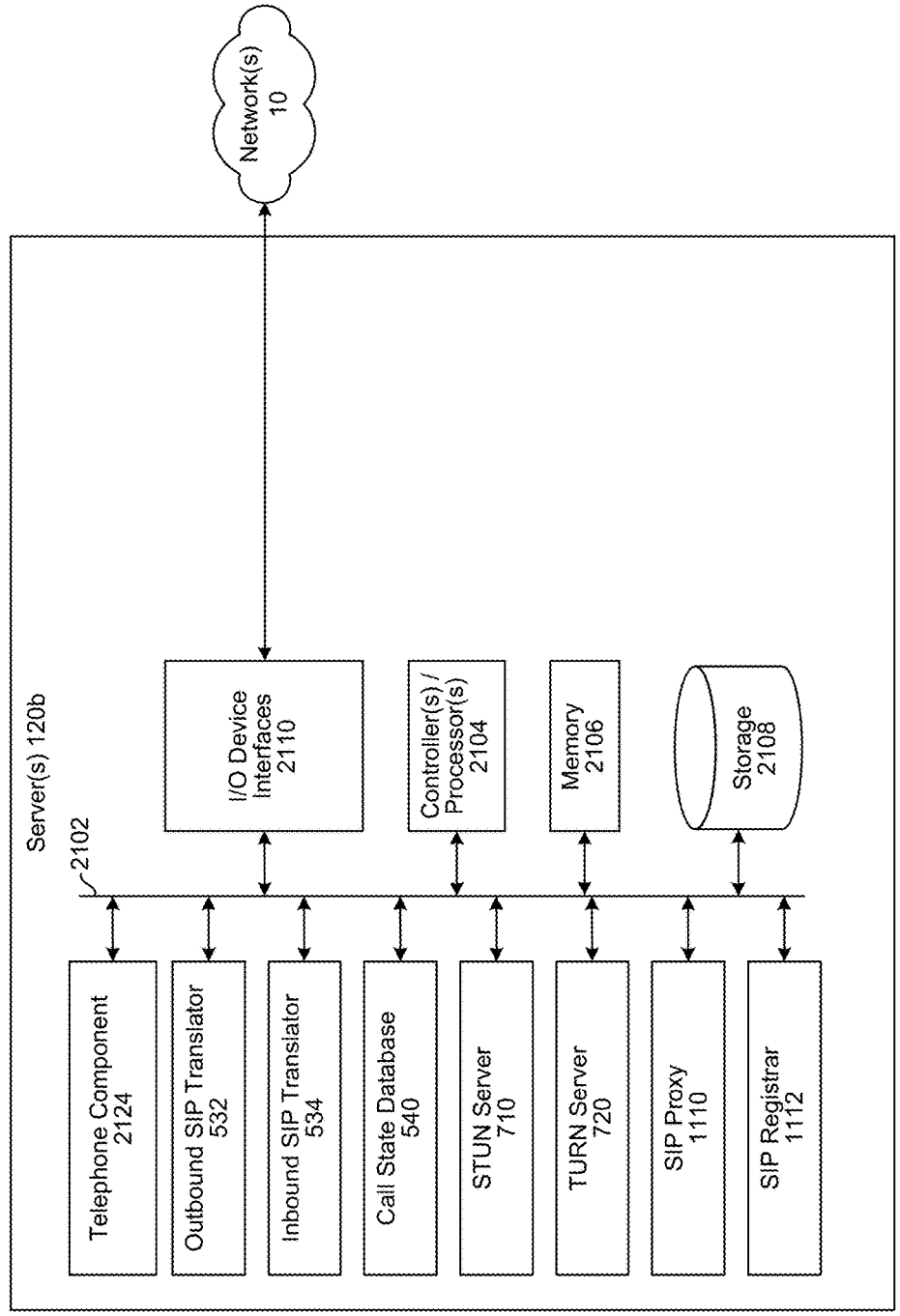

ENABLING VOICE CONTROL OF TELEPHONE DEVICE

CROSS-REFERENCE TO RELATED APPLICATION DATA

This application claims priority to U.S. Provisional Patent Application Ser. No. 62/377,303, entitled "Enabling Voice Control of Landline Telephone Device," filed on Aug. 19, 2016, in the names of Gregory Michael Hart, et al. The above provisional application is herein incorporated by reference in its entirety.

BACKGROUND

Speech recognition systems have progressed to the point where humans can interact with computing devices by relying on spoken commands. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is referred to herein as speech processing. Speech processing may also convert a user's speech into text data which may then be provided to various text-based software applications.

Speech processing may be used by televisions, media devices, computers, hand-held devices, telephone computer systems, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 5 illustrates an example of signaling to initiate a communication session according to examples of the present disclosure.

FIG. 6A-6B illustrate examples of signaling to end a communication session according to examples of the present disclosure.

FIG. 8 illustrates an example of a computer network for use with the system according to examples of the present disclosure.

FIG. 9 illustrates an example of an existing voice over internet protocol (VoIP) solution.

FIGS. 15A-15B are communication diagrams conceptually illustrating examples of sending and receiving audio data during a telephone conversation using a phone network according to embodiments of the present disclosure.

FIGS. 16A-16B are communication diagrams conceptually illustrating examples of sending and receiving audio data during a telephone conversation using voice over internet protocol (VoIP) according to embodiments of the present disclosure.

FIGS. 17A-17C illustrate examples of enabling voice commands on a landline device according to embodiments of the present disclosure.

FIG. 18 illustrates multiple examples of an adapter identifying input commands to send audio data to a remote server according to embodiments of the present disclosure.

FIG. 19 illustrates examples of different functionality provided by an adapter according to embodiments of the present disclosure.

FIGS. 20A-20C are communication diagrams conceptually illustrating examples of services offered when an outgoing call is unavailable according to embodiments of the present disclosure.

FIGS. 21A-21D are block diagrams conceptually illustrating example components of a system according to embodiments of the present disclosure.

DETAILED DESCRIPTION

Telephones coupled to a home telephone circuit may be used to communicate using a phone network, via landlines, such as a public switched telephone network (PSTN) and/or cable television (TV) networks (e.g., via a cable provider), via wireless networks such as Public Land Mobile Network (PLMN) (e.g., cellular network) and/or via the internet using techniques such as Voice over Internet Protocol (VoIP). While VoIP enables devices to communicate using an existing telephone number from any location, including while away from a home associated with the telephone number, telephones connected to the home telephone circuit require a connection to the phone network in the home and are therefore unable to be used more than a short distance from the home.

To enable calls to be initiated and received from any location using an existing phone network service, offered is a system that links the phone network to a home endpoint device (such as a speech controlled device) via the internet. For example, an adapter may connect to the phone network (e.g., via a wired and/or wireless connection) and to remote server(s) (e.g., via the internet) and may be configured to receive and initiate calls using the phone network. Thus, electronic devices connected to the remote server(s) may communicate via the phone network through the adapter and/or the server(s). Such devices may also be controlled using voice commands as part of a speech controlled system In addition to enabling the home endpoint device to connect to the phone network, the system may enable a "landline" telephone connected to the home telephone circuit to connect to the remote server(s) using the adapter. For example, the landline telephone may be connected to the adapter via the home telephone circuit, enabling the adapter to receive audio data generated by the landline telephone and/or to send audio data to the landline telephone. Thus, the system may allow the landline telephone to enable voice commands using the remote server(s), with audio data being forwarded from the adapter to the remote server(s), the remote server(s) identifying a voice command included in the audio data and executing the voice command and/or sending an instruction to execute the voice command. For example, the voice commands may control the home endpoint device and/or the adapter (e.g., initiate or receive a telephone call using the phone network), audio devices (e.g., play music over speakers, capture audio using microphones, or the like), multimedia devices (e.g., play videos using a display, such as a television, computer, tablet or the like), smart home devices (e.g., change temperature controls, turn on/off lights, lock/unlock doors, etc.) or the like. Thus, the adapter may enable the landline telephone to control any device or services controlled by the remote server(s) using voice commands.

Figure 1:
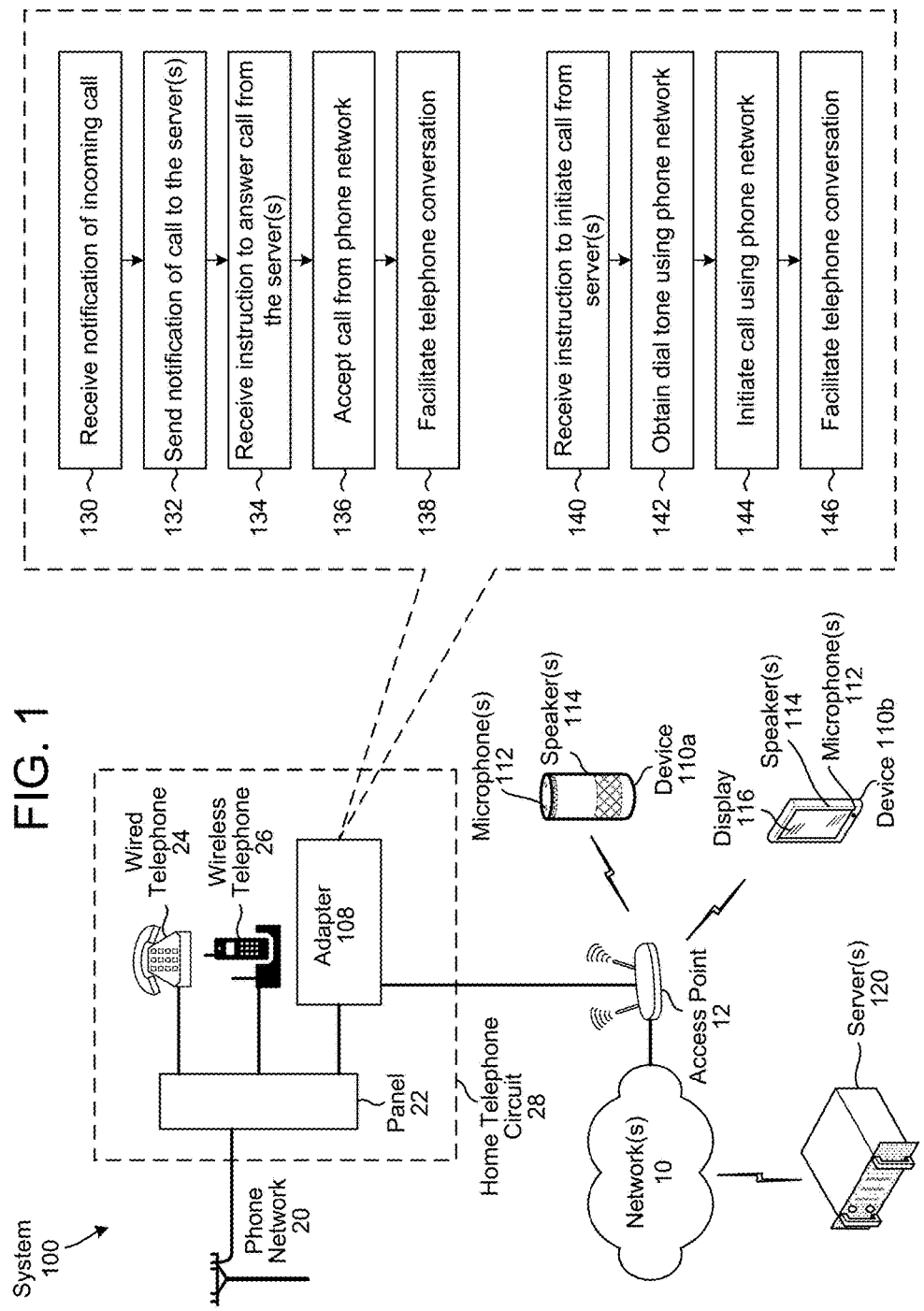
FIG. 1 illustrates a system according to embodiments of the present disclosure.

FIG. 1 illustrates a high-level conceptual block diagram of a system 100 configured to initiate and receive calls over a phone network. Although FIG. 1, and other figures/discussion illustrate the operation of the system in a particular order, the steps described may be performed in a different order (as well as certain steps removed or added) without departing from the intent of the disclosure. As illustrated in FIG. 1, the system 100 may include a phone network 20 connected to a home telephone circuit 28, which includes a panel 22 configured to connect communication devices (e.g., wired telephone 24, wireless telephone 26 and an adapter 108). While FIG. 1 illustrates the phone network 20 as including a telephone pole, the disclosure is not limited to a single phone network and the phone network 20 may be a public switched telephone network (PSTN) 30, a Voice over Internet Protocol (VoIP) provider 40, a cable television (TV) network 50 and/or a Public Land Mobile Network (PLMN) 60 (e.g., cellular network) without departing from the disclosure.

In addition, FIG. 1 illustrates the adapter 108 and/or device(s) 110 (e.g., a speech controlled device 110a and/or a smartphone device 110b) connected to an access point (AP) 12 via wired and/or wireless connections, enabling the adapter 108 and/or the device(s) 110 to connect to network(s) 10. Using the network(s) 10, the adapter 108 and/or the device(s) 110 may be communicatively coupled to remote server(s) 120, including one or more server(s) 120a that are configured to process voice commands and/or one or more server(s) 120b that are configured to enable and/or facilitate communication sessions.

The adapter 108 may be configured to connect to the phone network 20 and/or the network(s) 10 (using a wired local area network (LAN) network adapter (e.g., Ethernet or the like), a wireless local area network (WLAN) network adapter (e.g., WiFi, Bluetooth, ZigBee, etc.) and/or a wireless network adapter (e.g., Long Term Evolution (LTE) network, WiMAX network, 3G network, etc.), or the like) to enable users to make and receive telephone calls using their existing phone network 20 service via devices 110. The devices 110 can initiate and receive calls via the phone network 20 through interactions between the adapter 108, the server(s) 120a/120b, and the user's existing landline (e.g., phone network 20).

As used herein, the user's existing landline refers to the phone number through the phone network 20 that is associated with the home telephone circuit 28. The home telephone circuit 28 may include fixed wiring in the home to which each of the devices connected to the panel 22 may connect using one or more phone jacks such as a one-line RJ11 jack, two-line RJ14 jack, three-line RJ25 jack, four-line RJ61 jack, etc. Thus, telephones connected to the home telephone circuit 28, such as the wired telephone 24 and/or the wireless telephone 26, may be referred to as landline telephones and may make or receive telephone calls using the phone network 20. However, the landline telephones are not limited to a typical landline phone network (e.g., PSTN 30), and may be connected to any phone network 20, such as the PSTN 30, the VoIP provider 40, the cable TV network 50 and/or the PLMN 60 (e.g., cellular network).

The PSTN 30 is a typical landline telephone network that may be used to communicate over telephone wires and may include an analog PSTN and/or a digital PSTN. In contrast, the VoIP provider 40 may be used to communicate over the network(s) 10 by sending and receiving audio data and/or video data using a VoIP provider adapter 41. Similarly, the cable TV network 50 may be used to communicate via cable telephony over cable TV networks. For example, a telephone interface (e.g., cable adapter 51) may convert analog signals from the home telephone circuit 28 to digital signals and send the digital signals over the cable connection to the cable provider, which may connect to the PSTN 30 and send the digital signals using the PSTN 30. The PLMN 60 may be a mobile network that may also be interconnected with the PSTN 30. For example, a telephone interface (e.g., PLMN adapter 61) may convert analog signals from the home telephone circuit 28 to digital signals and may send the digital signals via a wireless connection to the mobile network (e.g., using cellular towers or the like), which may send the digital signals using the PLMN 60 and/or the PSTN 30.

As illustrated in FIG. 1, the adapter 108 may connect to the phone network 20 and may also make or receive telephone calls using the phone network 20. For example, if an incoming call is received by the panel 22, the wired telephone 24, the wireless telephone 26 and/or the adapter 108 may receive an indication that there is an incoming telephone call and the wired telephone 24 and/or the wireless telephone 26 may ring to notify a user that there is an incoming telephone call. If the adapter 108 answers the call, the adapter 108 may communicate via the phone network 20 and the wired telephone 24 and/or the wireless telephone 26 will stop ringing.

The AP 12 may be associated with an internet provider and may create a wireless local area network (WLAN) to which the adapter 108 and/or the device(s) 110 may connect. By connecting to the WLAN, the adapter 108 and/or the devices 110 may communicate with the server(s) 120a/120b via the network(s) 10.

The adapter 108 and/or the device(s) 110 may include a network adapter to connect to the WLAN and/or the network(s) 10 via wired and/or wireless connections. The device(s) 110 may include microphone(s) 112, speakers 114, and/or a display 116. For example, FIG. 1 illustrates the speech controlled device 110a including the microphone(s) 112 and the speakers 114, while the smartphone device 110b includes the microphone(s) 112, the speakers 114 and the display 116. Using the microphone(s) 112, the device 110 may capture outgoing audio data and determine a voice command and/or send the outgoing audio data to the server(s) 120a to determine the voice command. For example, the server(s) 120a may perform Automatic Speech Recognition (ASR) processing, Natural Language Understanding (NLU) processing and/or command processing to determine the voice command as explained herein.

While the examples described herein illustrate the server(s) 120*a* performing multiple functions, the disclosure is not limited thereto. Instead, the device 110 may perform any of the functions described herein without departing from the disclosure. For example, the server(s) 120*a* may assist the device 110 with Automatic Speech Recognition (ASR) processing, Natural Language Understanding (NLU) processing, command processing, generating progress data, saving progress data and/or generating synthesized speech. A single server 120*a* may be capable of performing all speech processing or multiple server(s) 120*a* may combine to perform the speech processing. For example, multiple different devices may combine to perform ASR processing, multiple different devices may combine to perform NLU processing, etc. In addition, certain speech detection or command execution functions may be performed by device 110. Thus, the device 110 and/or the server(s) 120*a* may perform the functions described herein without departing from the disclosure.

Additionally or alternatively, the device 110 may capture outgoing audio data and send the outgoing audio data to the server(s) 120*b* as part of a communication session (e.g., real time synchronous communication session, such as an audio conversation) and the device 110 may receive incoming audio data from the server(s) 120*b* as part of the communication session. For ease of explanation, the following description refers to capturing and sending audio data during the communication session. However, the disclosure is not limited thereto and the device 110 may capture and send video data during the communication session without departing from the present disclosure.

Using the adapter 108, the device 110 may communicate via the phone network 20. Thus, the adapter 108 may enable the device 110 to send outgoing audio data to a remote telephone via the phone network 20 and/or to receive incoming audio data from the remote telephone via the phone network 20 and to generate output audio using the incoming audio data. For example, the adapter 108 may be configured to receive first data from the device 110 via a network component connected to the network(s) 10, to convert (e.g., transcode) the first data into second data (e.g., audio data) and to output the second data via at least one port connected to the phone network 20. Similarly, the adapter 108 may be configured to receive the second data from the phone network 20 via the at least one port, to convert the second data into the first data and to send the first data to the device 110 via the network component. Thus, the adapter 108 may be configured to send and receive the first data and/or the second data using different formats, protocols or the like.

As illustrated in FIG. 1, the adapter 108 may receive (130) a notification of an incoming call from the phone network 20 via the panel 22, may send (132) a notification of the incoming call to the server(s) 120*b* via the network(s) 10, may receive (134) an instruction to answer the incoming call from the server(s) 120*b* via the network(s) 10, may accept (136) the call from the phone network 20 and may facilitate (138) a telephone conversation. For example, during the telephone conversation the adapter 108 may receive the outgoing audio data from the device 110 via the server(s) 120*b* using the network(s) 10 and may send the outgoing audio data using the phone network 20 and/or the adapter 108 may receive the incoming audio data using the phone network 20 and may send the incoming audio data to the device 110 via the server(s) 120*b* using the network(s) 10.

At a later point in time, the adapter 108 may receive (140) an instruction to initiate a telephone call using the phone network 20 from the server(s) 120*b*, may obtain (142) a dial tone using the phone network 20, may initiate (144) a telephone call using the phone network 20 and may facilitate (146) a telephone conversation, as discussed herein. For example, the adapter 108 may receive the outgoing audio data from the device 110 via the server(s) 120*b* using the network(s) 10 and may send the outgoing audio data using the phone network 20 and/or the adapter 108 may receive the incoming audio data using the phone network 20 and may send the incoming audio data to the device 110 via the server(s) 120*b* using the network(s) 10.

For ease of explanation, the disclosure distinguishes between an instruction and a command (e.g., voice command), although the disclosure is not limited thereto and the terms may be used interchangeably without departing from the disclosure. As used herein, an instruction refers to a directive sent between devices, whereas a command refers to a directive received from a user (e.g., voice command). For example, the system 100 may receive a command from the user requesting that the system 100 perform an action (e.g., initiate a telephone call, accept a telephone call, etc.). In order to execute the command, the server(s) 120*a* may send an instruction to the device 110 and/or the adapter 108 to perform an action (e.g., initiate a telephone call, accept a telephone call, etc.), and/or the device 110 may send an instruction to the adapter 108 to perform the action.

While FIG. 1 and other figures and descriptions below illustrate and discuss the system 100 communicating via the phone network 20, the disclosure is not limited thereto. Instead, the system 100 may support a mobile-only household use case such that users could place and receive calls via devices 110 using their existing mobile phone and service (e.g., PLMN 60), or other phone networks (such as a cable phone system, etc.) without departing from the disclosure.

The adapter 108 may connect to the phone network 20 during an initialization step. For example, after powering on the adapter 108 and connecting the adapter 108 to the phone network 20 (e.g., using a phone port such as an RJ11 jack), a user may configure the adapter 108 to connect to the AP 12 via a WLAN and/or an Ethernet port (e.g., RJ45 jack or the like). The user's home telephone circuit 28 may still be connected to the existing landline service (e.g. telephone provider with phone number (555) 555-5555), such that the user may place a telephone call using the wired telephone 24 and/or the wireless telephone 26. In addition, the existing landline service may also be accessible to the user via the devices 110. Thus, the user may initiate telephone calls using the devices 110 and/or may receive incoming telephone calls using the devices 110.

To illustrate an example of initiating an outgoing call using the device 110, the user may say "Alexa, call Bob" and the device 110 may capture audio data corresponding to this utterance. The device 110 may send the audio data to the server(s) 120*a* and the server(s) 120*a* may perform speech processing to understand the utterance and determine a command. For example, the server(s) 120*a* may determine that the utterance corresponds to a command to initiate a telephone call to a particular contact (e.g., "Bob") included in a user profile associated with the device 110 and may determine a phone number associated with the contact. If the selected phone number is associated with a landline (e.g., accessible via the phone network 20), the system 100 may determine to initiate the telephone call using the existing landline (e.g., phone network 20). For example, the system 100 may send a first instruction from the server(s) 120*a* to the server(s) 120*b* to initiate the telephone call, the first instruction indicating call information such as a number from which to call, a recipient number to call, a data source name (DSN), the device 110 from which to call and/or additional information. The server(s) 120*b* may send a second instruction to the adapter 108 to initiate the telephone call using the phone network 20 and may initiate a communication session between the device 110 and the adapter 108 to send and receive audio data between the device 110 and the adapter 108. The recipient (e.g., "Bob") would recognize the user since the caller identification would indicate that the telephone call is associated with the existing landline home phone number (e.g., (555) 555-5555), which is associated with the user and may already be in the recipient's address book for the user.

The contact may be associated with multiple phone numbers. In some examples, to identify which phone number with which to initiate the telephone call, the server(s) 120*a* may request clarification from the user by sending a notification to the device 110. However, the disclosure is not limited thereto and the server(s) 120*a* may select a default phone number associated with the contact and/or may select from the multiple phone numbers (for example in a contact list associated with the caller/callee's user profile) based on the utterance. Thus, the server(s) 120*a* may attempt to determine the intent of the user based on the utterance. For example, the server(s) 120*a* may differentiate between "Alexa, call Mom's house" and "Alexa, call Mom's mobile" when initiating the call. Additionally or alternatively, the server(s) 120*a* may attempt to determine the intent of the user based on characteristics of the multiple phone numbers associated with the contact. For example, if the user requests to initiate a telephone call using the device 110 associated with the server(s) 120*b* and a first phone number of the multiple phone numbers is also associated with the server(s) 120*b*, the server(s) 120*b* may initiate the telephone call to the first phone number without using the phone network 20 (e.g., using software running on the device 110, voice over internet protocol (VoIP) or the like).

Similarly, the server(s) 120*a* may determine from which phone number the user would like to initiate the telephone call. For example, the server(s) 120*a* may differentiate between "Alexa, call Mom on my home line" and "Alexa, call Mom with video" or the like. In addition, if the user requests to initiate the telephone call to a landline phone number, the server(s) 120*a* may determine to initiate the telephone call using the phone network 20, whereas if the telephone call is to a phone number associated with the remote server(s) 120*b*, the server(s) 120*a* may determine to initiate the telephone call without using the phone network 20.

To illustrate an example of receiving an incoming telephone call, a caller (e.g. "Bob") may dial the home phone number associated with the user (e.g., (555) 555-5555), causing each of the devices (e.g., 24, 26, 108) connected to the home telephone circuit 28 to ring. The adapter 108 may detect the incoming telephone call and send a signal to the server(s) 120*b* indicating the incoming telephone call and/or a phone number associated with the caller. The server(s) 120*b* may communicate with the server(s) 120*a* and the server(s) 120*a* may then notify the user of the incoming telephone call by sending a notification to the devices 110. Thus, the wired telephone 24, the wireless telephone 26 and/or the devices 110 would ring and the user may choose whether or not to answer the incoming telephone call from the wired telephone 24, the wireless telephone 26 and/or the devices 110. If the user elects to answer the incoming telephone call using one of a device 110 (for example by speaking to the device 110 "Alexa, answer the call"), the device 110 may send a signal (e.g., data corresponding to the answer request) to the server(s) 120*a* (which will then perform speech processing to determine the command), the server(s) 120*a* may communicate with the server(s) 120*b* and the server(s) 120*b* may send a signal to the adapter 108 that instructs the adapter 108 to answer the incoming telephone call. Thus, the adapter 108 may answer the incoming telephone call, causing the wired telephone 24 and/or the wireless telephone 26 to stop ringing, and may forward audio data between the phone network 20 and the device 110 via the server(s) 120*b* to facilitate the call.

If the user is away from home and the device 110 is a mobile device connected to the internet, the user can also place and receive calls using the adapter 108 over the existing landline (e.g., phone network 20) despite being away from home. Once again, the recipient of the user's calls can identify the user because the caller ID would be shown as the home phone number (e.g., (555) 555-5555). In the case of a multi-person household, calls initiated by any family member via the devices 110 may be sent over the existing landline service using the home phone number (e.g., (555) 555-5555).

In some examples, the phone network 20 may be unavailable. For example, a second user may be engaged in a telephone call using the phone network 20 via the wired telephone 24 and/or the wireless telephone 26. If the phone network 20 is in use by another telephone, the adapter 108 may be unable to initiate a telephone call using the phone network 20. For example, the device 110 may send a command to initiate a telephone call using the adapter 108, but the adapter 108 may send a notification to the device 110 that the phone network 20 is currently busy. If the user wants to initiate a telephone call immediately, the device 110 may initiate the telephone call using VoIP instead of using the phone network 20. Alternatively, the user may request a notification when the phone network 20 becomes available. Thus, the adapter 108 may detect when the phone network 20 is available and may send an indication to the server(s) 120*b*, which may communicate with the server(s) 120*a* and the server(s) 120*a* may send a notification to the user. In some examples, the user may request a call back when the phone network 20 becomes available. Thus, the adapter 108 may detect when the phone network 20 is available and may send an indication to the server(s) 120*b*, which may send an instruction to the adapter 108 to initiate the telephone call. If the recipient answers the telephone call, the server(s) 120*b* may treat it similarly to an incoming call and may send a notification to the device 110.

Using the adapter 108, the landline telephones connected to the home telephone circuit 28 (e.g., connected to the phone network 20 via the panel 22) may also initiate a telephone call using VoIP. In some examples, the user may prefer to initiate a telephone call using VoIP from a landline telephone (e.g., wired telephone 24 or wireless telephone 26) instead of using the phone network 20. For example, a long distance telephone call may result in charges when using the phone network 20 but may not cost money when using VoIP. Therefore, the adapter 108 may enable the landline telephone connected to the home telephone circuit 28 to send audio data to the server(s) 120*a*/120*b* and initiate a telephone call using VoIP.

In addition to enabling VoIP, the adapter 108 may enable voice commands for landline telephones connected to the home telephone circuit 28. For example, the user may pick up the landline telephone, hear a dial tone and speak an utterance (e.g., "Alexa, call Mom"). The landline telephone may capture audio data corresponding to the utterance and may send the audio data to the home telephone circuit 28, which may be received by the adapter 108 and sent to the server(s) 120*a*, even though a call through the phone network 20 may not be active (hence the dial tone). The server(s) 120*a* may perform speech processing on the audio data to determine a voice command and may execute the voice command (e.g., initiate a telephone call to a contact named "Mom") through the adapter 108. Thus, the landline telephone may be used to issue voice commands to the server(s) 120*a*, which may control the devices 110, other devices associated with a user profile or the like. For example, the voice commands may control the devices 110 and/or the adapter 108 (e.g., initiate or receive a telephone call using the phone network 20), audio devices (e.g., play music over speakers, capture audio using microphones, or the like), multimedia devices (e.g., play videos using a display, such as a television, computer, tablet or the like), smart home devices (e.g., change temperature controls, turn on/off lights, lock/unlock doors, etc.) or the like. Thus, the adapter 108 may enable the landline telephone to control any device or services controlled by the server(s) 120*a* using voice commands.

The adapter 108 may be configured to provide additional functionality to the user. For example, the adapter 108 may be configured to monitor call statistics during a telephone call and to send the call statistics to the server(s) 120*a*. For example, the adapter 108 may identify a phone number associated with the recipient, a contact name associated with the phone number, a number of devices connected to the home telephone circuit 28 during the telephone call, a duration of the telephone call and the like. The server(s) 120*a* may store the call statistics and provide individual call statistics (e.g., duration of a current telephone call) or aggregate call statistics (e.g., amount of time spent on the phone). For example, the server(s) 120*a* may perform voice recognition on the audio data to determine identities associated with the telephone call and may track the call statistics based on the identities.

The adapter 108 may be configured to identify that the phone network 20 is busy or unavailable. For example, the adapter 108 may detect whenever the home telephone circuit 28 is connected to the phone network 20 during a telephone call and may send the indication to the server(s) 120*b* indicating that the phone network 20 is unavailable. Additionally or alternatively, the adapter 108 may receive an instruction to initiate a telephone call using the phone network 20 from the server(s) 120*b*, may detect that that phone network 20 is unavailable and may send the indication to the server(s) 120*b* indicating that the phone network 20 is unavailable. When the user 10 inputs a command to initiate the telephone call while the phone network 20 is unavailable, the server(s) 120*a* may provide additional options to the user 10 to complete the telephone call.

During a telephone conversation, the adapter 108 may be configured to detect that an additional telephone connected to the home telephone circuit 28 is active (e.g., picked up) and the system 100 may send a notification to the user that the telephone call is not secure. For example, the user 10 may not wish for anyone to listen to the telephone call and the adapter 108 may detect a change in voltage on the home telephone circuit 28 when the wired telephone 24 is active and listening to the telephone call. Thus, the adapter 108 may send the indication that the telephone call is not secure to the server(s) 120*b*, the server(s) 120*b* may communicate with the server(s) 120*a* and the server(s) 120*a* may send a notification to the user 10 indicating that the telephone call is not secure.

The adapter 108 may be configured to detect a charge call on the phone network 20 and to terminate the charge call. For example, the adapter 108 may detect a phone number input to the home telephone circuit 28 that is associated with charges, such as a long distance number, a premium-rate telephone number or the like. Upon detecting the phone number, the adapter 108 may automatically hang up to end the telephone call.

In some examples, the adapter 108 may be configured to hang up the telephone call associated with the charges using the phone network 20 and to initiate a second telephone call using VoIP via the server(s) 120*b*. For example, the adapter 108 may determine that the phone number is a long distance number, may reset the phone network 20 to end the telephone call and may send a request to the server(s) 120*b* to initiate the second telephone call to the phone number using VoIP. Thus, the adapter 108 enables the user 10 to avoid charges associated with long distance calling while still making the long distance call.

The adapter 108 may be configured to intercept a signal to an alarm company that is sent over the phone network 20 by an alarm system and to send an indication of the alarm to the server(s) 120*b*. For example, the alarm system may send a notification of the alarm being triggered to a phone number associated with the alarm company using the phone network 20. The adapter 108 may identify the phone number and/or identify that the phone number is associated with the alarm company and may send the indication of the alarm to the server(s) 120*b*.

Due to the adapter 108 intercepting the alarm signal, the system 100 may be enabled to offer multiple services to the user 10 in response to the alarm being triggered. For example, the server(s) 120*a* may send a notification to the user 10, via email, text message or the like, enabling the user 10 to learn of the alarm being triggered and to respond more quickly. In some examples, the server(s) 120*a* may send an instruction to a speaker-enabled device in proximity to the adapter 108 (e.g., located within the home associated with the home telephone circuit 28) instructing the speaker-enabled device to blast audio at high volumes (e.g., generate a siren or audio alarm). Additionally or alternatively, the server(s) 120*a* may send an instruction to a microphone-enabled device in proximity to the adapter 108 (e.g., located within the home associated with the home telephone circuit 28) instructing the microphone-enabled device to capture audio data. The audio data may be stored locally on the microphone-enabled device, sent to the server(s) 120*a*, stored on the server(s) 120*a*, and/or sent to the devices 110 or other devices associated with the user profile. Thus, the server(s) 120*a* may generate audio at high volume to deter a potential intruder and/or may capture audio data to potentially identify the potential intruder.

The adapter 108 may be configured to perform intercom functionality. For example, the adapter 108 may send audio data to the wireless telephone 26 using wireless signals, such as very high frequency (VHF) (e.g., radio frequencies in the range between 30 MHz and 300 MHz) and/or ultra-high frequency (UHF) signals (e.g., radio frequencies in the range between 300 MHz and 3 GHz). Thus, the user 10 may speak an utterance that is captured by the devices 110 as audio data and sent from the device 110 to the server(s) 120*a* and then to the adapter 108 via the network(s) 10 (e.g., with or without using the server(s) 120*b*). The adapter 108 may then send the audio data to the wireless telephone 26 using the wireless signals, and the wireless telephone 26 may generate output audio corresponding to the audio data. Thus, the adapter 108 may enable the devices 110 and/or other devices to perform intercom functionality with the wireless telephone 26 despite not being in proximity to the wireless telephone 26 and/or capable of sending the wireless signals.

Figure 2:
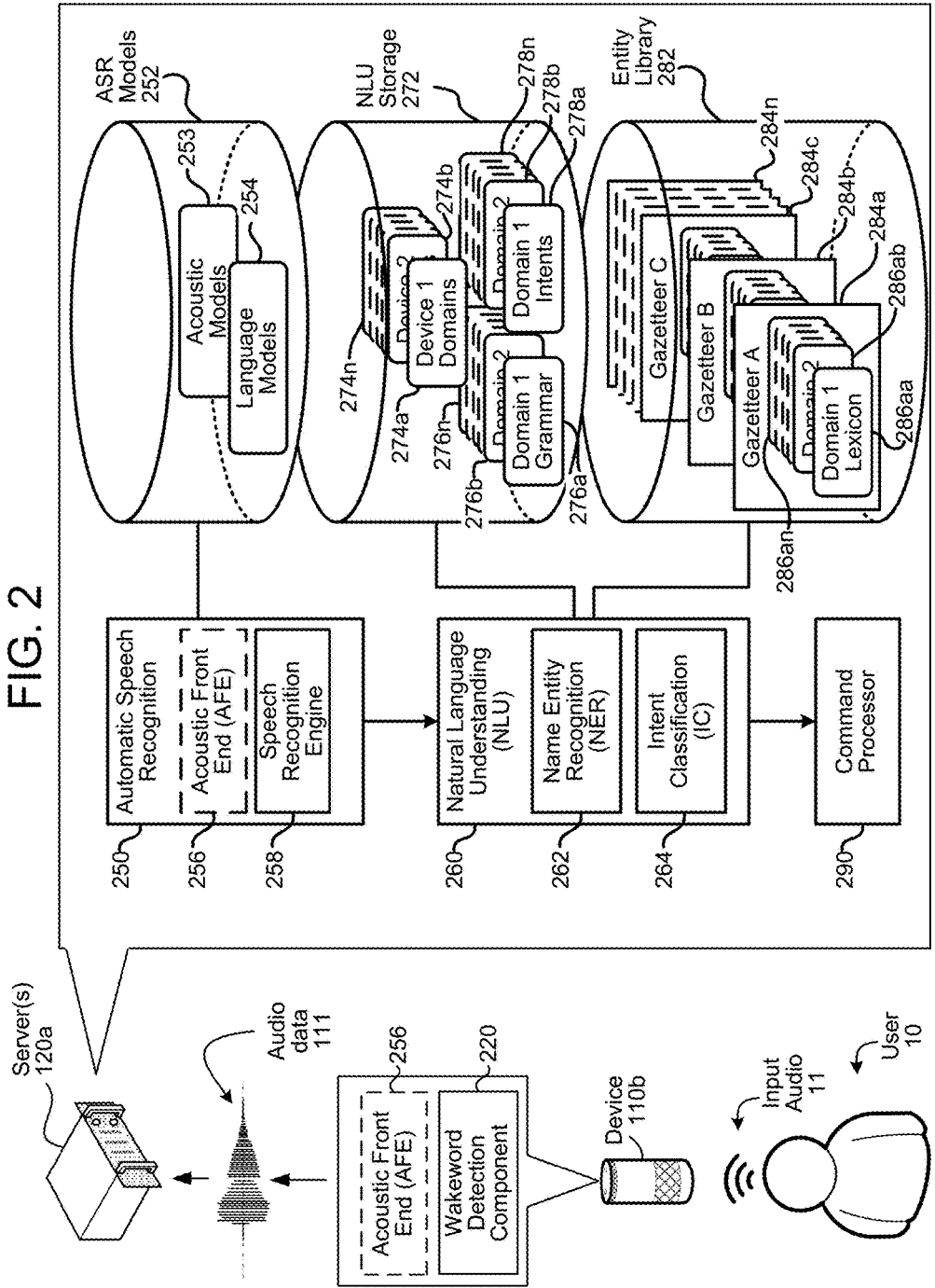
FIG. 2 is a conceptual diagram of how a spoken utterance is processed according to examples of the present disclosure.

The system 100 of FIG. 1 may operate using various speech processing components as described in FIG. 2. FIG. 2 is a conceptual diagram of how a spoken utterance is processed, allowing a system to capture and execute commands spoken by a user, such as spoken commands that may follow a wakeword. The various components illustrated may be located on a same or different physical devices. Communication between various components illustrated in FIG. 2 may occur directly or across network(s) 10. An audio capture component, such as microphone(s) 112 of device 110, captures audio 11 corresponding to a spoken utterance.

The device 110, using a wakeword detection component 220, then processes the audio 11, or audio data 111 corresponding to the audio 11, to determine if a keyword (such as a wakeword) is detected in the audio 11. Following detection of a wakeword, the device sends audio data 111 corresponding to the utterance, to a server(s) 120a that includes an ASR component 250. The audio data 111 may be output from an acoustic front end (AFE) 256 located on the device 110 prior to transmission. Or the audio data 111 may be in a different form for processing by a remote AFE 256.

The wakeword detection component 220 works in conjunction with other components of the device, for example microphone(s) 112 to detect keywords in audio 11. For example, the device 110 may convert audio 11 into audio data 111, and process the audio data 111 with the wakeword detection component 220 to determine whether speech is detected, and if so, if the audio data 111 comprising speech matches an audio signature and/or model corresponding to a particular keyword.

The device 110 may use various techniques to determine whether audio data includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the device 110 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio 11 received by the device 110 (or separately from speech detection), the device 110 may use the wakeword detection component 220 to perform wakeword detection to determine when a user intends to speak a command to the device 110. This process may also be referred to as keyword detection, with the wakeword being a specific example of a keyword. Specifically, keyword detection is typically performed without performing linguistic analysis, textual analysis or semantic analysis. Instead, incoming audio (or audio data) is analyzed to determine if specific characteristics of the audio match preconfigured acoustic waveforms, audio signatures, or other data to determine if the incoming audio "matches" stored audio data corresponding to a keyword.

Thus, the wakeword detection component 220 may compare audio data 111 to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 110 may "wake" and begin transmitting audio data 111 corresponding to input audio 11 to the server(s) 120a for speech processing. Audio data 111 corresponding to that audio 11 may be sent to a server(s) 120b for routing to a recipient device or may be sent to the server(s) 120a for speech processing for interpretation of the included speech (either for purposes of enabling voice-communications and/or for purposes of executing a command in the speech). The audio data 111 may include data corresponding to the wakeword, or the portion of the audio data 111 corresponding to the wakeword may be removed by the local device 110 prior to sending. Further, a local device 110 may "wake" upon detection of speech/spoken audio above a threshold, as described herein. Upon receipt by the server(s) 120a, an ASR component 250 may convert the audio data 111 into text. The ASR transcribes audio data 111 into text data representing the words of the speech contained in the audio data 111. The text data may then be used by other components for various purposes, such as executing system commands, inputting data, etc. A spoken utterance in the audio data 111 is input to a processor configured to perform ASR which then interprets the utterance based on the similarity between the utterance and pre-established language models 254 stored in an ASR model knowledge base (ASR Models Storage 252). For example, the ASR process may compare the input audio data 111 with models for sounds (e.g., subword units, phonemes, etc.) and sequences of sounds to identify words that match the sequence of sounds spoken in the utterance of the audio data 111.

An ASR process 250 converts the audio data 111 into text. The ASR transcribes audio data 111 into text data representing the words of the speech contained in the audio data 111. The text data may then be used by other components for various purposes, such as executing system commands, inputting data, etc. A spoken utterance in the audio data 111 is input to a processor configured to perform ASR which then interprets the utterance based on the similarity between the utterance and pre-established language models 254 stored in an ASR model knowledge base (ASR Models Storage 252). For example, the ASR process may compare the input audio data 111 with models for sounds (e.g., subword units or phonemes) and sequences of sounds to identify words that match the sequence of sounds spoken in the utterance of the audio data 111.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 253 stored in an ASR Models Storage 252), and the likelihood that a particular word which matches the sounds would be included in the sentence at the specific location (e.g., using a language or grammar model). Thus each potential textual interpretation of the spoken utterance (hypothesis) is associated with a confidence score. Based on the considered factors and the assigned confidence score, the ASR process 250 outputs the most likely text recognized in the audio data 111. The ASR process may also output multiple hypotheses in the form of a lattice or an N-best list with each hypothesis corresponding to a confidence score or other score (such as probability scores, etc.).

The device or devices performing the ASR process 250 may include an acoustic front end (AFE) 256 and a speech recognition engine 258. The acoustic front end (AFE) 256 transforms the audio data 111 from the microphone(s) 112 into data for processing by the speech recognition engine 258. The speech recognition engine 258 compares the speech recognition data with acoustic models 253, language models 254, and other data models and information for recognizing the speech conveyed in the audio data 111. The AFE 256 may reduce noise in the audio data 111 and divide the digitized audio data 111 into frames representing time intervals for which the AFE 256 determines a number of values, called features, representing the qualities of the audio data 111, along with a set of those values, called a feature vector or audio feature vector, representing the features/qualities of the audio data 111 within the frame. Many different features may be determined, as known in the art, and each feature represents some quality of the audio 11 that may be useful for ASR processing. A number of approaches may be used by the AFE 256 to process the audio data 111, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 258 may process the output from the AFE 256 with reference to information stored in speech/model storage 252. Alternatively, post front-end processed data (such as feature vectors) may be received by the device executing ASR processing from another source besides the internal AFE 256. For example, the device 110 may process audio data 111 into feature vectors (for example using an on-device AFE 256) and transmit that information to a server across network(s) 10 for ASR processing. Feature vectors may arrive at the server encoded, in which case they may be decoded prior to processing by the processor executing the speech recognition engine 258.

The speech recognition engine 258 attempts to match received feature vectors to language phonemes and words as known in the stored acoustic models 253 and language models 254. The speech recognition engine 258 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically.

The speech recognition engine 258 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 258 to other processing components, which may be local to the device performing ASR and/or distributed across the network(s) 10. For example, ASR results in the form of a single textual representation of the speech, an N-best list including multiple hypotheses and respective scores, lattice, etc. may be sent to a server, such as the server(s) 120*a*, for natural language understanding (NLU) processing, such as conversion of the text into commands for execution, either by the device 110, by the server(s) 120*a*, or by another device (such as a server running a search engine, etc.).

The device performing NLU processing 260 (e.g., server(s) 120*a*) may include various components, including potentially dedicated processor(s), memory, storage, etc. A device configured for NLU processing 260 may include a named entity recognition (NER) component 252, intent classification (IC) component 264, NLU storage 272 and a and knowledge base (not shown). The knowledge base is a database or other information storage that may include information about entities that may be used in resolving user queries. The NLU process may also utilize gazetteer information (284*a*-284*n*) stored in entity library storage 282. The knowledge base and/or gazetteer information may be used for entity resolution, for example matching ASR results with different entities (such as song titles, contact names, etc.) Gazetteers may be linked to users (for example a particular gazetteer may be associated with a specific user's music collection), may be linked to certain domains (such as shopping), or may be organized in a variety of other ways.

The NLU process 260 takes textual input (such as processed from ASR 250 based on the utterance 11) and attempts to make a semantic interpretation of the text. That is, the NLU process 260 determines the meaning behind the text based on the individual words and then implements that meaning. NLU processing 260 interprets a text string to derive an intent or a desired action from the user as well as the pertinent pieces of information in the text that allow a device (e.g., device 110) to complete that action. For example, if a spoken utterance is processed using ASR 250 and outputs the text "call mom" the NLU process may determine that the user intended to activate a telephone in his/her device and to initiate a call with a contact matching the entity "mom."

The NLU may process several textual inputs related to the same utterance. For example, if the ASR 250 outputs N text segments (as part of an N-best list), the NLU may process all N outputs to obtain NLU results.

As will be discussed further below, the NLU process 260 may be configured to parse and tag to annotate text as part of NLU processing. For example, for the text "call mom," "call" may be tagged as a command (to execute a phone call) and "mom" may be tagged as a specific entity and target of the command (and the telephone number for the entity corresponding to "mom" stored in a contact list may be included in the annotated result).

To correctly perform NLU processing of speech input, the NLU process 260 may be configured to determine a "domain" of the utterance so as to determine and narrow down which services offered by the endpoint device (e.g., server(s) 120a or device 110) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The name entity recognition component 262 receives a query in the form of ASR results and attempts to identify relevant grammars and lexical information that may be used to construe meaning. To do so, a name entity recognition component 262 may begin by identifying potential domains that may relate to the received query. The NLU storage 272 includes a database of devices (274a-274n) identifying domains associated with specific devices. For example, the device 110 may be associated with domains for music, telephony, calendaring, contact lists, and device-specific communications, but not video. In addition, the entity library may include database entries about specific services on a specific device, either indexed by Device ID, User ID, or Household ID, or some other indicator.

In NLU processing, a domain may represent a discrete set of activities having a common theme, such as "shopping," "music," "calendaring," etc. As such, each domain may be associated with a particular language model and/or grammar database (276a-276n), a particular set of intents/actions (278a-278n), and a particular personalized lexicon (286). Each gazetteer (284a-284n) may include domain-indexed lexical information associated with a particular user and/or device. For example, the Gazetteer A (284a) includes domain-index lexical information 286aa to 286an. A user's music-domain lexical information might include album titles, artist names, and song names, for example, whereas a user's contact-list lexical information might include the names of contacts. Since every user's music collection and contact list is presumably different, this personalized information improves entity resolution.

In some examples, the device 110 may determine contextual information to assist with performing speech processing, such as a domain, based on the process operating when a voice command is received. For example, the device 110 may associate a first domain with a first feature group. When the device 110 receives a voice command while operating a first process corresponding to the first feature group, the device 110 may generate contextual information that indicates the first domain and/or other information and may associate the contextual information with the voice command.

A query may be processed applying the rules, models, and information applicable to each identified domain. For example, if a query potentially implicates both communications and music, the query will be NLU processed using the grammar models and lexical information for communications, and will be processed using the grammar models and lexical information for music. The responses based on the query produced by each set of models is scored (discussed further below), with the overall highest ranked result from all applied domains being ordinarily selected to be the correct result.

An intent classification (IC) component 264 parses the query to determine an intent or intents for each identified domain, where the intent corresponds to the action to be performed that is responsive to the query. Each domain is associated with a database (278a-278n) of words linked to intents. For example, a music intent database may link words and phrases such as "quiet," "volume off," and "mute" to a "mute" intent. The IC component 264 identifies potential intents for each identified domain by comparing words in the query to the words and phrases in the intents database 278.

In order to generate a particular interpreted response, the NER 262 applies the grammar models and lexical information associated with the respective domain. Each grammar model 276 includes the names of entities (i.e., nouns) commonly found in speech about the particular domain (i.e., generic terms), whereas the lexical information 286 from the gazetteer 284 is personalized to the user(s) and/or the device. For instance, a grammar model associated with the shopping domain may include a database of words commonly used when people discuss shopping.

The intents identified by the IC component 264 are linked to domain-specific grammar frameworks (included in 276) with "slots" or "fields" to be filled. For example, if "play music" is an identified intent, a grammar (276) framework or frameworks may correspond to sentence structures such as "Play {Artist Name}," "Play {Album Name}," "Play {Song name}," "Play {Song name} by {Artist Name}," etc. However, to make recognition more flexible, these frameworks would ordinarily not be structured as sentences, but rather based on associating slots with grammatical tags.

For example, the NER component 262 may parse the query to identify words as subject, object, verb, preposition, etc., based on grammar rules and models, prior to recognizing named entities. The identified verb may be used by the IC component 264 to identify intent, which is then used by the NER component 262 to identify frameworks. A framework for an intent of "play" may specify a list of slots/fields applicable to play the identified "object" and any object modifier (e.g., a prepositional phrase), such as {Artist Name}, {Album Name}, {Song name}, etc. The NER component 260 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

For instance, a query of "play mother's little helper by the rolling stones" might be parsed and tagged as {Verb}: "Play," {Object}: "mother's little helper," {Object Preposition}: "by," and {Object Modifier}: "the rolling stones." At this point in the process, "Play" is identified as a verb based on a word database associated with the music domain, which the IC component 264 will determine corresponds to the "play music" intent. No determination has been made as to the meaning of "mother's little helper" and "the rolling stones," but based on grammar rules and models, it is determined that these phrases relate to the grammatical object of the query.

The frameworks linked to the intent are then used to determine what database fields should be searched to determine the meaning of these phrases, such as searching a user's gazette for similarity with the framework slots. So a framework for "play music intent" might indicate to attempt to resolve the identified object based on {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer does not resolve the slot/field using gazetteer information, the NER component 262 may search the database of generic words associated with the domain (in the NLU's storage 272). For instance, if the query was "play songs by the rolling stones," after failing to determine an album name or song name called "songs" by "the rolling stones," the NER 262 may search the domain vocabulary for the word "songs." In the alternative, generic words may be checked before the gazetteer information, or both may be tried, potentially producing two different results.

The comparison process used by the NER component 262 may classify (i.e., score) how closely a database entry compares to a tagged query word or phrase, how closely the grammatical structure of the query corresponds to the applied grammatical framework, and based on whether the database indicates a relationship between an entry and information identified to fill other slots of the framework.

The NER component 262 may also use contextual operational rules to fill slots. For example, if a user had previously requested to pause a particular song and thereafter requested that the voice-controlled device "please un-pause my music," the NER component 262 may apply an inference-based rule to fill a slot associated with the name of the song that the user currently wishes to play—namely the song that was playing at the time the user requested to pause the music.

The results of NLU processing may be tagged to attribute meaning to the query. So, for instance, "play mother's little helper by the rolling stones" might produce a result of: {domain} Music, {intent} Play Music, {artist name} "rolling stones," {media type} SONG, and {song title} "mother's little helper." As another example, "play songs by the rolling stones" might produce: {domain} Music, {intent} Play Music, {artist name} "rolling stones," and {media type}SONG.

The output from the NLU processing (which may include tagged text, commands, etc.) may then be sent to a command processor 290, which may be located on a same or separate server(s) 120*a* as part of the system 100. The destination command processor 290 may be determined based on the NLU output. For example, if the NLU output includes a command to play music, the destination command processor 290 may be a music playing application, such as one located on device 110 or in a music playing appliance, configured to execute a music playing command. If the NLU output includes a search query (for example, requesting the return of search results), the destination command processor 290 may include a search engine processor, such as one located on a search server, configured to execute a search command and determine search results, which may include output text to be processed by a TTS engine and output from a device as synthesized speech, such as announcements made with the pages described above.

In some examples, a contact may be available via different communication paths (e.g., PSTN 30, VoIP 40, etc.), which may be associated with different applications. For example, the contact may be available via a landline number, via a first application associated with the server(s) 120*b* and via a second application that is not associated with the server(s) 120*b*. As part of performing the NLU, the server(s) 120*a* may determine which way to route the telephone call (e.g., which communication path to select) based on a cost (e.g., avoid charges), a phone quality (e.g., throughput associated with the communication path), whether presence information is available (e.g., server(s) 120*b* receives an indication that the contact is available via the first application), and/or the like. Thus, the server(s) 120*a* may determine how to route the telephone call based on the intent or based on other user preferences without departing from the disclosure.

Figure 3:
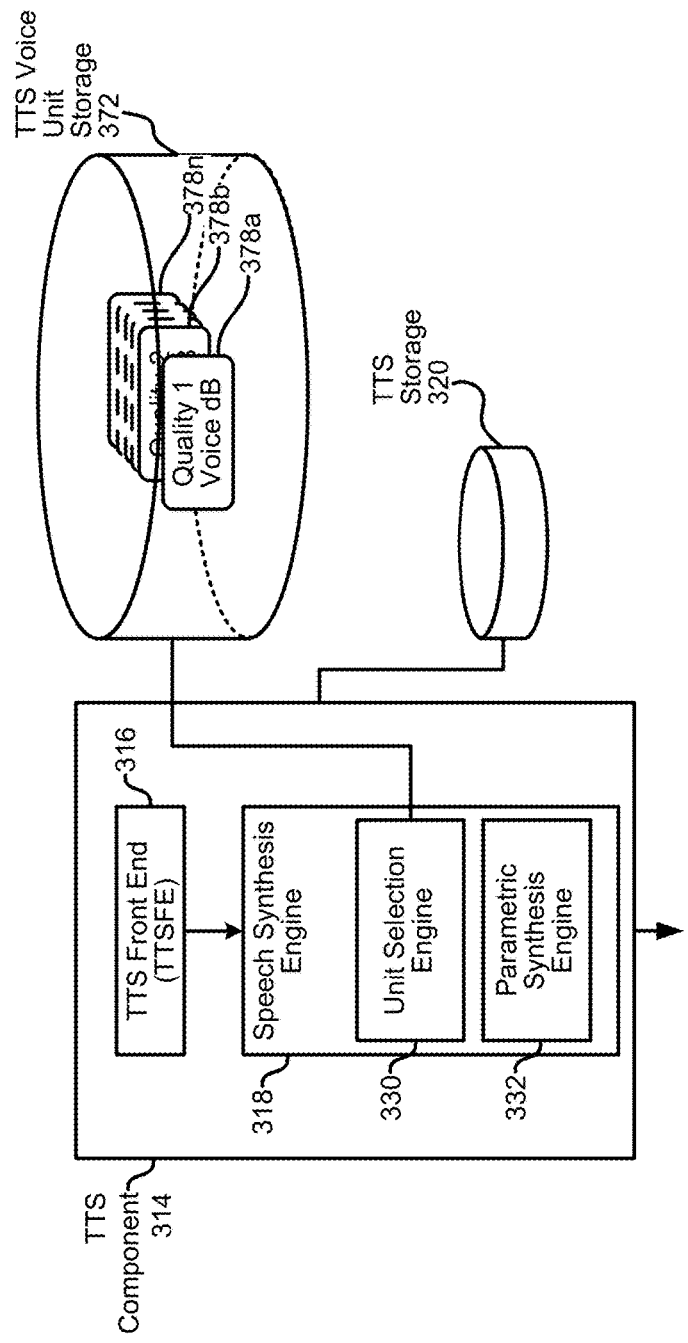
FIG. 3 illustrates an example of generating text-to-speech (TTS) or synthesized speech according to examples of the present disclosure.

FIG. 3 illustrates an example of generating text-to-speech (TTS) or synthesized speech according to examples of the present disclosure. The TTS component/processor 314 includes a TTS front end (TTSFE) 316, a speech synthesis engine 318, and TTS storage 320. The TTSFE 316 transforms input text data (for example from command processor 290) into a symbolic linguistic representation for processing by the speech synthesis engine 318. The TTSFE 316 may also process tags or other data input to the TTS component that indicate how specific words should be pronounced (e.g., an indication that a word is an interjection). The speech synthesis engine 318 compares the annotated phonetic units models and information stored in the TTS storage 320 for converting the input text into speech. The TTSFE 316 and speech synthesis engine 318 may include their own controller(s)/processor(s) and memory or they may use the controller/processor and memory 310 of the server(s) 120*a*, device 110, or other device, for example. Similarly, the instructions for operating the TTSFE 316 and speech synthesis engine 318 may be located within the TTS component 314, within the memory and/or storage of the server(s) 120*a*, device 110, or within an external device.

Text input into a TTS component 314 may be sent to the TTSFE 316 for processing. The front-end may include components for performing text normalization, linguistic analysis, and linguistic prosody generation. During text normalization, the TTSFE processes the text input and generates standard text, converting such things as numbers, abbreviations (such as Apt., St., etc.), symbols ($, %, etc.) into the equivalent of written out words.

During linguistic analysis the TTSFE 316 analyzes the language in the normalized text to generate a sequence of phonetic units corresponding to the input text. This process may be referred to as phonetic transcription. Phonetic units include symbolic representations of sound units to be eventually combined and output by the system as speech. Various sound units may be used for dividing text for purposes of speech synthesis. A TTS component 314 may process speech based on phonemes (individual sounds), half-phonemes, di-phones (the last half of one phoneme coupled with the first half of the adjacent phoneme), bi-phones (two consecutive phonemes), syllables, words, phrases, sentences, or other units. Each word may be mapped to one or more phonetic units. Such mapping may be performed using a language dictionary stored by the system, for example in the TTS storage component 320. The linguistic analysis performed by the TTSFE 316 may also identify different grammatical components such as prefixes, suffixes, phrases, punctuation, syntactic boundaries, or the like. Such grammatical components may be used by the TTS component 314 to craft a natural sounding audio waveform output. The language dictionary may also include letter-to-sound rules and other tools that may be used to pronounce previously unidentified words or letter combinations that may be encountered by the TTS component 314. Generally, the more information included in the language dictionary, the higher quality the speech output.

Based on the linguistic analysis the TTSFE 316 may then perform linguistic prosody generation where the phonetic units are annotated with desired prosodic characteristics, also called acoustic features, which indicate how the desired phonetic units are to be pronounced in the eventual output speech. During this stage the TTSFE 316 may consider and incorporate any prosodic annotations that accompanied the text input to the TTS component 314. Such acoustic features may include pitch, energy, duration, and the like. Application of acoustic features may be based on prosodic models available to the TTS component 314. Such prosodic models indicate how specific phonetic units are to be pronounced in certain circumstances. A prosodic model may consider, for example, a phoneme's position in a syllable, a syllable's position in a word, a word's position in a sentence or phrase, neighboring phonetic units, etc. As with the language dictionary, prosodic model with more information may result in higher quality speech output than prosodic models with less information.

The output of the TTSFE 316, referred to as a symbolic linguistic representation, may include a sequence of phonetic units annotated with prosodic characteristics. This symbolic linguistic representation may be sent to a speech synthesis engine 318, also known as a synthesizer, for conversion into an audio waveform of speech for output to an audio output device and eventually to a user. The speech synthesis engine 318 may be configured to convert the input text into high-quality natural-sounding speech in an efficient manner. Such high-quality speech may be configured to sound as much like a human speaker as possible, or may be configured to be understandable to a listener without attempts to mimic a precise human voice.

A speech synthesis engine 318 may perform speech synthesis using one or more different methods. In one method of synthesis called unit selection, described further below, a unit selection engine 330 matches the symbolic linguistic representation created by the TTSFE 316 against a database of recorded speech, such as a database of a voice corpus. The unit selection engine 330 matches the symbolic linguistic representation against spoken audio units in the database. Matching units are selected and concatenated together to form a speech output. Each unit includes an audio waveform corresponding with a phonetic unit, such as a short .wav file of the specific sound, along with a description of the various acoustic features associated with the .wav file (such as its pitch, energy, etc.), as well as other information, such as where the phonetic unit appears in a word, sentence, or phrase, the neighboring phonetic units, etc. Using all the information in the unit database, a unit selection engine 330 may match units to the input text to create a natural sounding waveform. The unit database may include multiple examples of phonetic units to provide the system with many different options for concatenating units into speech. One benefit of unit selection is that, depending on the size of the database, a natural sounding speech output may be generated. As described above, the larger the unit database of the voice corpus, the more likely the system will be able to construct natural sounding speech.

In another method of synthesis called parametric synthesis parameters such as frequency, volume, noise, are varied by a parametric synthesis engine 332, digital signal processor or other audio generation device to create an artificial speech waveform output. Parametric synthesis uses a computerized voice generator, sometimes called a vocoder. Parametric synthesis may use an acoustic model and various statistical techniques to match a symbolic linguistic representation with desired output speech parameters. Parametric synthesis may include the ability to be accurate at high processing speeds, as well as the ability to process speech without large databases associated with unit selection, but also typically produces an output speech quality that may not match that of unit selection. Unit selection and parametric techniques may be performed individually or combined together and/or combined with other synthesis techniques to produce speech audio output.

Parametric speech synthesis may be performed as follows. A TTS component 314 may include an acoustic model, or other models, which may convert a symbolic linguistic representation into a synthetic acoustic waveform of the text input based on audio signal manipulation. The acoustic model includes rules which may be used by the parametric synthesis engine 332 to assign specific audio waveform parameters to input phonetic units and/or prosodic annotations. The rules may be used to calculate a score representing a likelihood that a particular audio output parameter(s) (such as frequency, volume, etc.) corresponds to the portion of the input symbolic linguistic representation from the TTSFE 316.

The parametric synthesis engine 332 may use a number of techniques to match speech to be synthesized with input phonetic units and/or prosodic annotations. One common technique is using Hidden Markov Models (HMMs). HMMs may be used to determine probabilities that audio output should match textual input. HMMs may be used to translate from parameters from the linguistic and acoustic space to the parameters to be used by a vocoder (the digital voice encoder) to artificially synthesize the desired speech. Using HMMs, a number of states are presented, in which the states together represent one or more potential acoustic parameters to be output to the vocoder and each state is associated with a model, such as a Gaussian mixture model. Transitions between states may also have an associated probability, representing a likelihood that a current state may be reached from a previous state. Sounds to be output may be represented as paths between states of the HMM and multiple paths may represent multiple possible audio matches for the same input text. Each portion of text may be represented by multiple potential states corresponding to different known pronunciations of phonemes and their parts (such as the phoneme identity, stress, accent, position, etc.). An initial determination of a probability of a potential phoneme may be associated with one state. As new text is processed by the speech synthesis engine 318, the state may change or stay the same, based on the processing of the new text. For example, the pronunciation of a previously processed word might change based on later processed words. A Viterbi algorithm may be used to find the most likely sequence of states based on the processed text. The HMMs may generate speech in parameterized form including parameters such as fundamental frequency (f0), noise envelope, spectral envelope, etc. that are translated by a vocoder into audio segments. The output parameters may be configured for particular vocoders such as a STRAIGHT vocoder, TANDEM-STRAIGHT vocoder, HNM (harmonic plus noise) based vocoders, CELP (code-excited linear prediction) vocoders, GlottHMM vocoders, HSM (harmonic/stochastic model) vocoders, or others.

Unit selection speech synthesis may be performed as follows. Unit selection includes a two-step process. First a unit selection engine 330 determines what speech units to use and then it combines them so that the particular combined units match the desired phonemes and acoustic features and create the desired speech output. Units may be selected based on a cost function which represents how well particular units fit the speech segments to be synthesized. The cost function may represent a combination of different costs representing different aspects of how well a particular speech unit may work for a particular speech segment. For example, a target cost indicates how well a given speech unit matches the features of a desired speech output (e.g., pitch, prosody, etc.). A join cost represents how well a speech unit matches a consecutive speech unit for purposes of concatenating the speech units together in the eventual synthesized speech. The overall cost function is a combination of target cost, join cost, and other costs that may be determined by the unit selection engine 330. As part of unit selection, the unit selection engine 330 chooses the speech unit with the lowest overall combined cost. For example, a speech unit with a very low target cost may not necessarily be selected if its join cost is high.

The system may be configured with one or more voice corpuses for unit selection. Each voice corpus may include a speech unit database. The speech unit database may be stored in TTS storage 320, in storage 312, or in another storage component. For example, different unit selection databases may be stored in TTS voice unit storage 372. Each speech unit database includes recorded speech utterances with the utterances' corresponding text aligned to the utterances. A speech unit database may include many hours of recorded speech (in the form of audio waveforms, feature vectors, or other formats), which may occupy a significant amount of storage. The unit samples in the speech unit database may be classified in a variety of ways including by phonetic unit (phoneme, diphone, word, etc.), linguistic prosodic label, acoustic feature sequence, speaker identity, etc. The sample utterances may be used to create mathematical models corresponding to desired audio output for particular speech units. When matching a symbolic linguistic representation the speech synthesis engine 318 may attempt to select a unit in the speech unit database that most closely matches the input text (including both phonetic units and prosodic annotations). Generally the larger the voice corpus/speech unit database the better the speech synthesis may be achieved by virtue of the greater number of unit samples that may be selected to form the precise desired speech output.

Audio waveforms including the speech output from the TTS component 314 may be sent to an audio output component, such as a speaker for playback to a user or may be sent for transmission to another device, such as another server(s) 120a/120b, for further processing or output to a user. Audio waveforms including the speech may be sent in a number of different formats such as a series of feature vectors, uncompressed audio data, or compressed audio data. For example, audio speech output may be encoded and/or compressed by an encoder/decoder (not shown) prior to transmission. The encoder/decoder may be customized for encoding and decoding speech data, such as digitized audio data, feature vectors, etc. The encoder/decoder may also encode non-TTS data of the system, for example using a general encoding scheme such as .zip, etc.

A TTS component 314 may be configured to perform TTS processing in multiple languages. For each language, the TTS component 314 may include specially configured data, instructions and/or components to synthesize speech in the desired language(s). To improve performance, the TTS component 314 may revise/update the contents of the TTS storage 320 based on feedback of the results of TTS processing, thus enabling the TTS component 314 to improve speech recognition.

Other information may also be stored in the TTS storage 320 for use in speech recognition. The contents of the TTS storage 320 may be prepared for general TTS use or may be customized to include sounds and words that are likely to be used in a particular application. For example, for TTS processing by a global positioning system (GPS) device, the TTS storage 320 may include customized speech specific to location and navigation. In certain instances the TTS storage 320 may be customized for an individual user based on his/her individualized desired speech output. For example a user may prefer a speech output voice to be a specific gender, have a specific accent, speak at a specific speed, have a distinct emotive quality (e.g., a happy voice), or other customizable characteristic(s) (such as speaking an interjection in an enthusiastic manner) as explained in other sections herein. The speech synthesis engine 318 may include specialized databases or models to account for such user preferences.

For example, to create the customized speech output of the system, the system may be configured with multiple voice corpuses/unit databases 378a-378n, where each unit database is configured with a different "voice" to match desired speech qualities. The voice selected by the TTS component 314 to synthesize the speech. For example, one voice corpus may be stored to be used to synthesize whispered speech (or speech approximating whispered speech), another may be stored to be used to synthesize excited speech (or speech approximating excited speech), and so on. To create the different voice corpuses a multitude of TTS training utterance may be spoken by an individual and recorded by the system. The TTS training utterances used to train a TTS voice corpus may be different from the training utterances used to train an ASR system or the models used by the speech quality detector. The audio associated with the TTS training utterances may then be split into small audio segments and stored as part of a voice corpus. The individual speaking the TTS training utterances may speak in different voice qualities to create the customized voice corpuses, for example the individual may whisper the training utterances, say them in an excited voice, and so on. Thus the audio of each customized voice corpus may match the respective desired speech quality. The customized voice corpuses 378 may then be used during runtime to perform unit selection to synthesize speech having a speech quality corresponding to the input speech quality.

Figure 4:
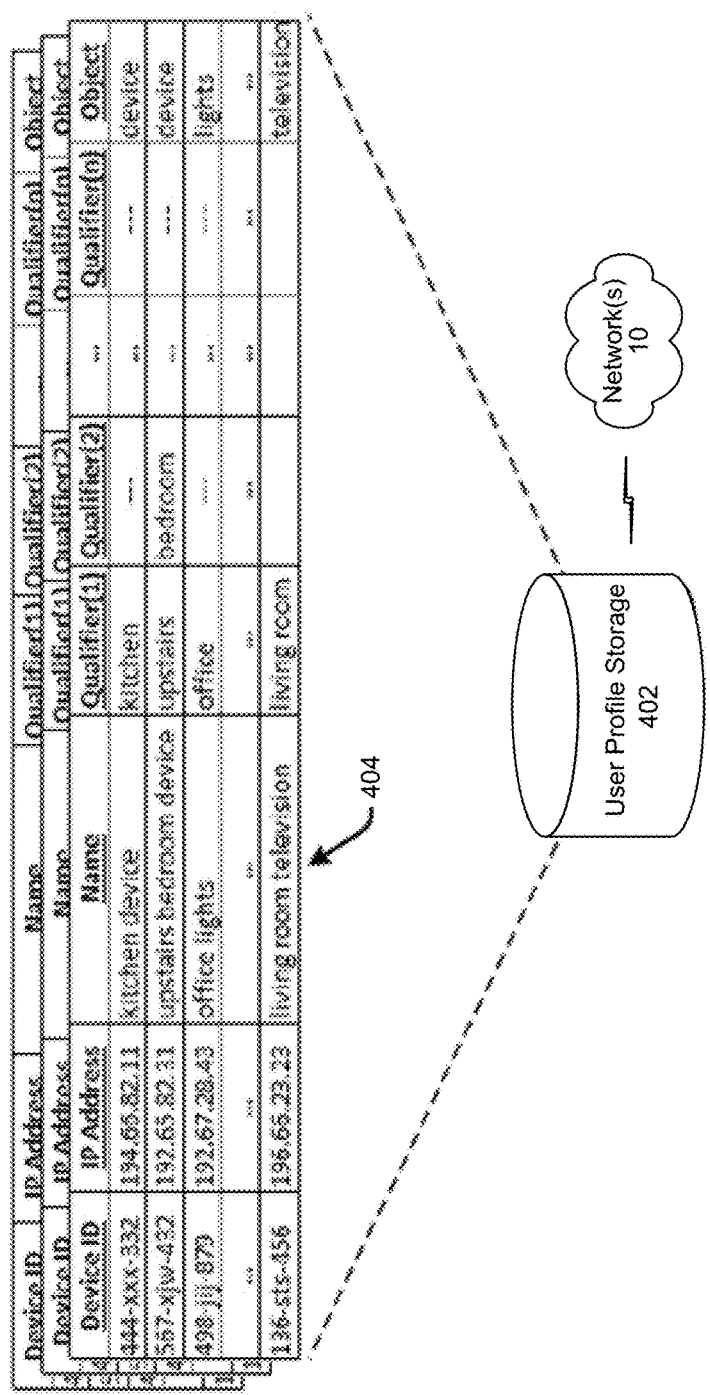
FIG. 4 illustrates data stored and associated with user profiles according to embodiments of the present disclosure.

The server(s) 120a/120b may include or refer to data regarding user accounts, shown by the user profile storage 402 illustrated in FIG. 4. The user profile storage 402 may be located proximate to server(s) 120a/120b, or may otherwise be in communication with various components, for example over network(s) 10. The user profile storage 402 may include a variety of information related to individual users, households, accounts, etc. that interact with the system 100. For illustration, as shown in FIG. 4, the user profile storage 402 may include data regarding the devices associated with particular individual user accounts 404. In an example, the user profile storage 402 is a cloud-based storage. Such data may include device identifier (ID) and internet protocol (IP) address information for different devices as well as names by which the devices may be referred to by a user. Further qualifiers describing the devices may also be listed along with a description of the type of object of the device.

FIG. 5 illustrates an example of signaling to initiate a communication session according to examples of the present disclosure. In one example configuration, the server(s) 120a are configured to enable voice commands (e.g., perform ASR, NLU, etc. to identify a voice command included in audio data), whereas the server(s) 120b are configured to enable communication sessions (e.g., using session initiation protocol (SIP)). For example, the server(s) 120b may send SIP messages to endpoints (e.g., adapter 108, device 110, remote devices, etc.) in order to establish a communication session for sending and receiving audio data and/or video data. The communication session may use network protocols such as real-time transport protocol (RTP), RTP Control Protocol (RTCP), Web Real-Time communication (WebRTC) and/or the like. For example, the server(s) 120b may send SIP messages to initiate a single RTP media stream between two endpoints (e.g., direct RTP media stream between the device 110 and the adapter 108) and/or to initiate and facilitate RTP media streams between the two endpoints (e.g., RTP media streams between the device 110 and the server(s) 120b and between the server(s) 120b and the adapter 108). During a communication session, the server(s) 120b may initiate two media streams, with a first media stream corresponding to incoming audio data from the device 110 to the adapter 108 and a second media stream corresponding to outgoing audio data from the adapter 108 to the device 110, although for ease of explanation this may be illustrated as a single RTP media stream.

As illustrated in FIG. 5, the device 110 may send (502) audio data to the server(s) 120a and the server(s) 120a may determine (504) call information using the audio data and may send (506) the call information to the server(s) 120b. The server(s) 120a may determine the call information by performing ASR, NLU, etc., as discussed above with regard to FIGS. 2-3, and the call information may include a data source name (DSN), a number from which to call, a number to which to call, encodings and/or additional information. For example, the server(s) 120a may identify from which phone number the user would like to initiate the telephone call, to which phone number the user would like to initiate the telephone call, from which device 110 the user would like to perform the telephone call, etc.

While FIG. 5 illustrates the server(s) 120a sending the call information to the server(s) 120b in a single step (e.g., 506), the disclosure is not limited thereto. Instead, the server(s) 120a may send the call information to the device 110 and the device 110 may send the call information to the server(s) 120b in order to initiate the telephone call without departing from the disclosure. Thus, the server(s) 120a may not communicate directly with the server(s) 120b in step 506, but may instead instruct the device 110 to connect to the server(s) 120b in order to initiate the telephone call.

The server(s) 120b may include an outbound SIP translator 532, an inbound SIP translator 534 and a call state database 540. The outbound SIP translator 532 may include logic to convert commands received from the server(s) 120a into SIP requests/responses and may handle sending outgoing SIP requests and sending responses to incoming SIP requests. After receiving the call information by the outbound SIP translator 532, the outbound SIP translator 532 may persist (508) a SIP dialog using the call state database 540. For example, the DSN may include information such as the name, location and driver associated with the call state database 540 (and, in some examples, a user identifier (ID) and password of the user) and the outbound SIP translator 532 may send a SIP dialog to the call state database 540 regarding the communication session. The call state database 540 may persist the call state if provided a device ID and one of a call ID or a dialog ID. The outbound SIP translator 532 may send (510) a SIP Invite to a SIP Endpoint 550, which may be the adapter 108, a remote device, a Session Border Controller (SBC) or the like.

The inbound SIP translator 534 may include logic to convert SIP requests/responses into commands to send to the server(s) 120a and may handle receiving incoming SIP requests and incoming SIP responses. The SIP endpoint 550 may send (512) a 100 TRYING message to the inbound SIP translator 534 and may send (514) a 183 RINGING message to the inbound SIP translator 534. The inbound SIP translator 534 may update (516) the SIP dialog using the call state database 540 and may send (518) a RINGING message to the server(s) 120a, which may send (520) the RINGING message to the device 110.

When the communication session is accepted by the SIP endpoint 550, the SIP endpoint 550 may send (522) a 200 OK message to the inbound SIP translator 534, the inbound SIP translator 545 may send (524) a startSending message to the server(s) 120a and the server(s) 120a may send (526) the startSending message to the device 110. The startSending message may include information associated with an internet protocol (IP) address, a port, encoding or the like required to initiate the communication session. Using the startSending message, the device 110 may establish (528) an RTP communication session with the SIP endpoint 550 via the server(s) 120b.

While FIG. 5 illustrates the server(s) 120b sending the RINGING message and the StartSending message to the device 110 via the server(s) 120a, the disclosure is not limited thereto. Instead, steps 518 and 520 may be combined into a single step and the server(s) 120b may send the RINGING message directly to the device 110 without departing from the disclosure. Similarly, steps 524 and 526 may be combined into a single step and the server(s) 120b may send the StartSending message directly to the device 110 without departing from the disclosure. Thus, the server(s) 120b may communicate with the device 110 directly without using the server(s) 120a as an intermediary.

For ease of explanation, the disclosure illustrates the system 100 using SIP. However, the disclosure is not limited thereto and the system 100 may use any communication protocol for signaling and/or controlling communication sessions without departing from the disclosure. Similarly, while some descriptions of the communication sessions refer only to audio data, the disclosure is not limited thereto and the communication sessions may include audio data, video data and/or any other multimedia data without departing from the disclosure.

FIG. 6A-6B illustrate examples of signaling to end a communication session according to examples of the present disclosure. After establishing the RTP communication session 528 between the device 110 and the SIP endpoint 550, the RTP communication session may be ended by the user inputting a command to end the telephone call to the device 110, as illustrated in FIG. 6A, or a remote party inputting a command to end the telephone call to the SIP endpoint 550, as illustrated in FIG. 6B.

As illustrated in FIG. 6A, the device 110 may send (602) a state change message to the server(s) 120a and the server(s) 120a may send (604) an end message to the server(s) 120b. The outbound SIP translator 532 may update (606) the session using the call state database 540 and may send (608) a SIP BYE message to the SIP endpoint 550. The SIP endpoint 550 may send (610) a 200 OK message to the inbound SIP translator 534 and the inbound SIP translator 534 may update (612) the session using the call state database 540. Thus, the RTP communication session 528 may be ended between the device 110 and the SIP endpoint 550.

As illustrated in FIG. 6B, the SIP endpoint 550 may send (652) a SIP BYE message to the inbound SIP translator 534 and the inbound SIP translator 534 may update (654) the session using the call state database 540. The inbound SIP translator 534 may send (656) a stopSending message to the server(s) 120a and the server(s) 120a may send (658) the stopSending message to the device 110. The device 110 may send (660) a state change message to the server(s) 120a and the server(s) 120a may send (662) an End message to the outbound SIP translator 532, the End message including a DSN. The outbound SIP translator 532 may then update (664) the session using the call state database 540. Thus, the RTP communication session 528 may be ended between the device 110 and the SIP endpoint 550.

While FIGS. 6A and 6B illustrate the server(s) 120a acting as an intermediary between the device 110 and the server(s) 120b, the disclosure is not limited thereto. Instead, steps 602 and 604 may be combined into a single step and the device 110 may directly send the state change message and/or the End message to the server(s) 120b without departing from the disclosure. Similarly, steps 656 and 658 may be combined into a single step and the server(s) 120b may send the StopSending message directly to the device 110 without departing from the disclosure, and/or steps 660 and 662 may be combined into a single step and the device 110 may directly send the state change message and/or the End message to the server(s) 120b without departing from the disclosure.

While FIGS. 5, 6A and 6B illustrate the RTP communication session 528 being established between the device 110 and the SIP endpoint 550, the disclosure is not limited thereto and the RTP communication session 528 may be established between the adapter 108 and the SIP endpoint 550 without departing from the disclosure. Additionally or alternatively, the adapter 108 may be the SIP endpoint 550 and the RTP communication session 528 may be established between the device 110 and the adapter 108, such as when the device 110 is part of a telephone call using the phone network 20.

Figure 7A:
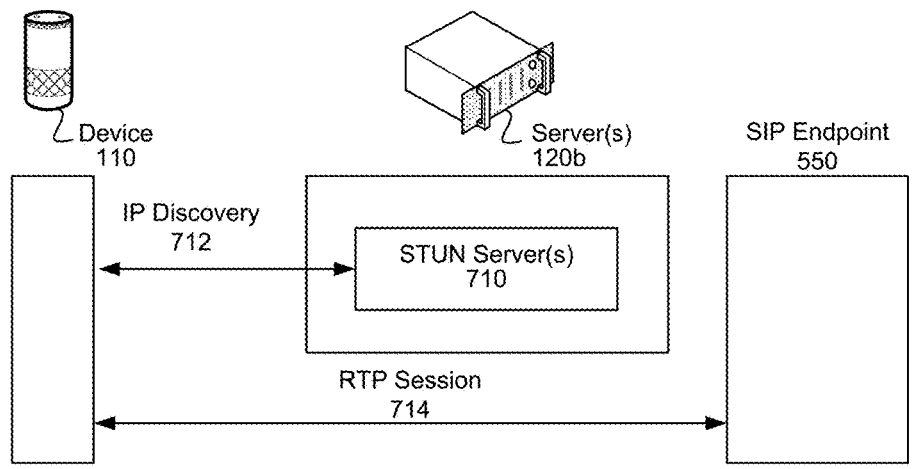
FIG. 7A-7B illustrate examples of establishing media streams between devices according to examples of the present disclosure.
Figure 7B:
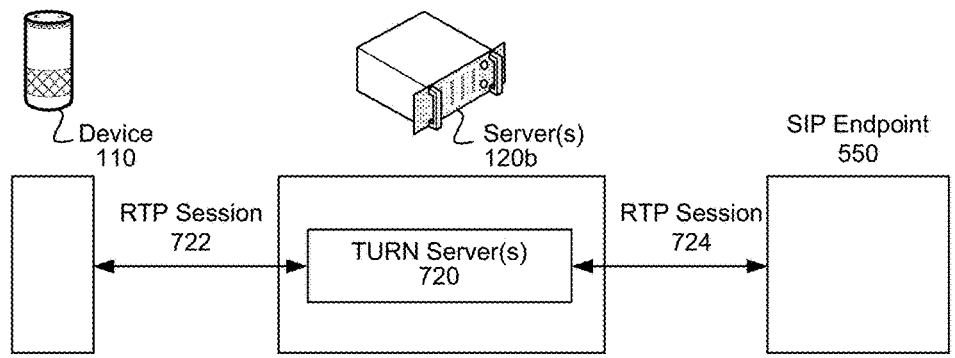

FIG. 7A-7B illustrate examples of establishing media streams between devices according to examples of the present disclosure. In some examples, the device 110 may have a publicly accessible IP address and may be configured to establish the RTP communication session directly with the SIP endpoint 550. To enable the device 110 to establish the RTP communication session, the server(s) 120b may include Session Traversal of User Datagram Protocol (UDP) Through Network Address Translators (NATs) server(s) (e.g., STUN server(s) 710). The STUN server(s) 710 may be configured to allow NAT clients (e.g., device 110 behind a firewall) to setup telephone calls to a VoIP provider hosted outside of the local network by providing a public IP address, the type of NAT they are behind and a port identifier associated by the NAT with a particular local port. As illustrated in FIG. 7A, the device 110 may perform (712) IP discovery using the STUN server(s) 710 and may use this information to set up an RTP communication session 714 (e.g., UDP communication) between the device 110 and the SIP endpoint 550 to establish a telephone call.

In some examples, the device 110 may not have a publicly accessible IP address. For example, in some types of NAT the device 110 cannot route outside of the local network. To enable the device 110 to establish an RTP communication session, the server(s) 120b may include Traversal Using relays around NAT (TURN) server(s) 720. The TURN server(s) 720 may be configured to connect the device 110 to the SIP endpoint 550 when the client 110 is behind a NAt. As illustrated in FIG. 7B, the device 110 may establish (722) an RTP session with the TURN server(s) 720 and the TURN server(s) 720 may establish an RTP session with the SIP endpoint 550. Thus, the device 110 may communicate with the SIP endpoint 550 via the TURN server(s) 720. For example, the device 110 may send outgoing audio data to the server(s) 120b and the server(s) 120b may send the outgoing audio data to the SIP endpoint 550. Similarly, the SIP endpoint 550 may send incoming audio data to the server(s) 120b and the server(s) 120b may send the incoming audio data to the device 110.

In some examples, the system 100 may establish communication sessions using a combination of the STUN server(s) 710 and the TURN server(s) 720. For example, a communication session may be more easily established/configured using the TURN server(s) 720, but may benefit from latency improvements using the STUN server(s) 710. Thus, the system 100 may use the STUN server(s) 710 when the communication session may be routed directly between two devices and may use the TURN server(s) 720 for all other communication sessions. Additionally or alternatively, the system 100 may use the STUN server(s) 710 and/or the TURN server(s) 720 selectively based on the communication session being established. For example, the system 100 may use the STUN server(s) 710 when establishing a communication session between two devices (e.g., point to point) within a single network (e.g., corporate LAN and/or WLAN), but may use the TURN server(s) 720 when establishing a communication session between two devices on separate networks and/or three or more devices regardless of network(s). When the communication session goes from only two devices to three or more devices, the system 100 may need to transition from the STUN server(s) 710 to the TURN server(s) 720. Thus, the system 100 may anticipate three or more devices being included in the communication session and may establish the communication session using the TURN server(s) 720.

As illustrated in FIG. 8, devices 110 may contain components of the system 100 and may be connected over network(s) 10. The network(s) 10 may be a local or private network or may be part of a wider network. For example, the network(s) 10 may include a wired local area network (LAN), a wireless local area network (WLAN) (such as WiFi), Bluetooth, and/or wireless network, such as a Long Term Evolution (LTE) network, WiMAX network, 3G network, etc.

Devices 110 may be connected to the network(s) 10 through either wired or wireless connections. For example, a speech controlled device 110a, a smartphone 110b, a media device 110c, a headless device 110d connected to a television 810, a laptop computer 110e, a tablet computer 110f and/or a smart television 110g, may be connected to the network(s) 10 through a wired and/or wireless connection. Thus, while the examples illustrated above are directed to the speech controlled device 110*a*, the disclosure is not limited thereto and the device 110 may be any device capable of capturing audio from and/or outputting audio to a user. In addition, the server(s) 120*a* and the server(s) 120*b* may communicate with the device 110 via the network(s) 10.

While the examples described herein illustrate the device 110 performing multiple functions, the disclosure is not limited thereto. Instead, the server(s) 120*a* may perform any of the functions described herein without departing from the disclosure. For example, the server(s) 120*a* may assist the device 110 with ASR processing, NLU processing, command processing, and/or generating synthesized speech. A single server 120*a* may be capable of performing all speech processing or multiple server(s) 120*a* may combine to perform the speech processing. In addition, certain speech detection or command execution functions may be performed by device 110. Thus, the device 110 and/or the server(s) 120*a* may perform the functions described herein without departing from the disclosure.

FIG. 9 illustrates an example of an existing voice over internet protocol (VoIP) solution. As illustrated in FIG. 9, a VoIP provider adapter 41 may be connected to the AP 12 using a category 5 cable (e.g., Cat 5), which is a twisted pair cable for carrying signals (e.g., Ethernet cable). The AP 12 may be connected to the network(s) 10 via an internet provider, enabling the VoIP provider adapter 41 to send and receive data using the network(s) 10. The VoIP provider adapter 41 may also be connected to the wireless telephone 26 using an RJ11 connector (e.g., phone jack), thus enabling the wireless telephone 26 to send and receive audio data using the VoIP provider adapter 41. For example, an incoming signal from the VoIP provider may be received by the AP 12 and send to the wireless telephone 26 via the VoIP provider adapter 41. If the wireless telephone 26 answers the incoming signal, the wireless telephone 26 may send an answer request to the VoIP provider adapter 41 via the answer path (3).

As illustrated in FIG. 9, VoIP Provider adapters are seeking to provide telephone service to the home. For example, a VoIP provider adapter 41 is a Foreign Exchange Subscriber (FXS) device because it delivers an analog line. In other words, it delivers a dial tone, battery current and ring voltage. The majority of analog telephone adapter (ATA) devices in the marketplace today are Foreign Exchange Subscriber Devices because they are designed to replace a user's existing home phone service thereby generating revenue for the new VoIP provider. As illustrated in FIG. 9, the wireless telephone 26 is not connected to the phone network 20 and only sends and receives audio data using the VoIP provider adapter 41 via the network(s) 10.

In contrast, the adapter 108 extends the existing home telephone service and acts more similarly to a cordless home phone base station. It can seize the telephone line to place a call and receive ring voltage from the home network for an incoming call. Like a cordless home phone base station, the adapter 108 signals the devices (e.g., devices 110) tethered to it, the difference being that the adapter 108 will signal devices over the internet. The adapter 108 is therefore a Foreign Exchange Office (FXO) Device as it plugs into an existing Foreign Exchange Subscriber (FXS) port to receive on/off hook indications from the user's landline provider.

Figure 10A:
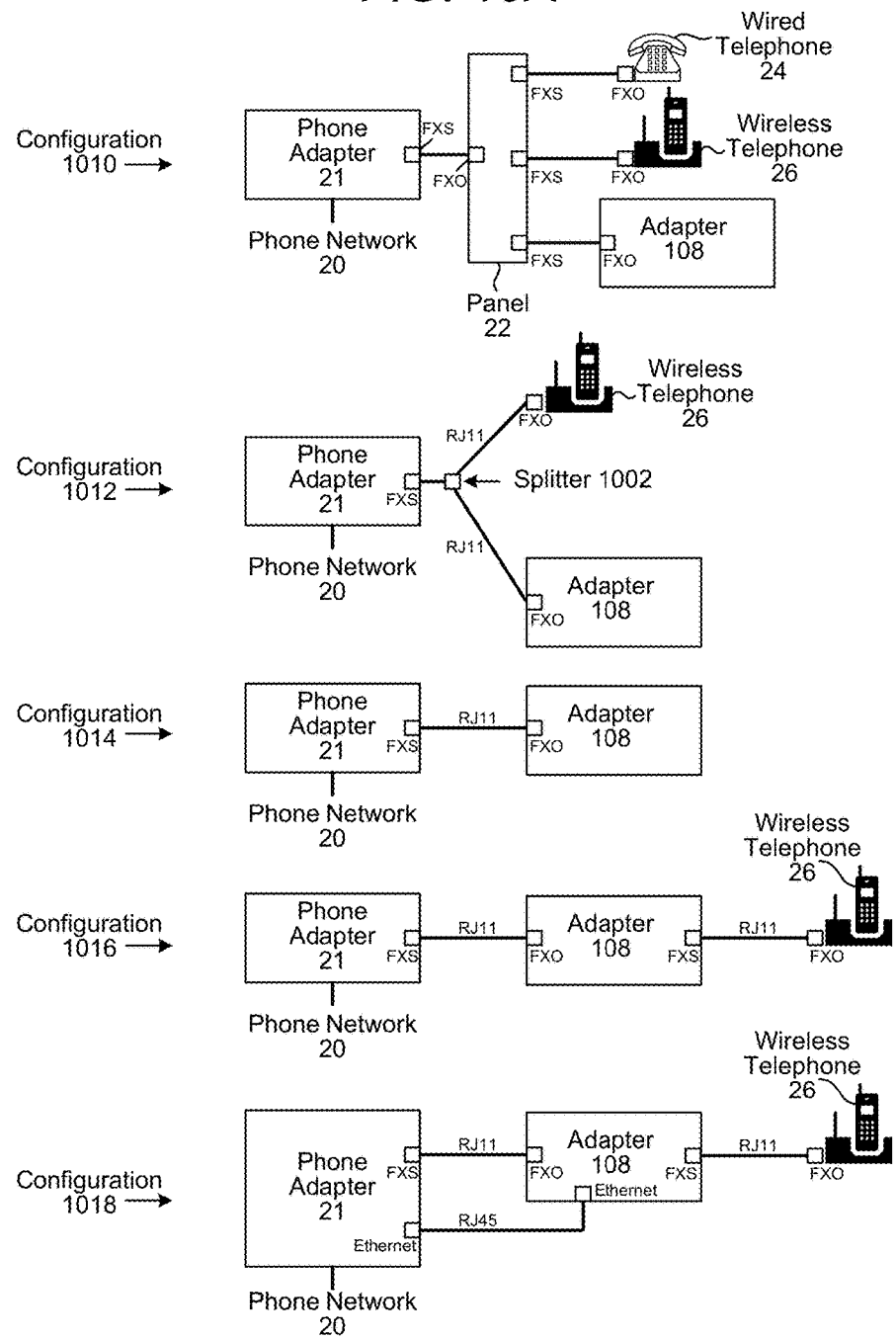
FIG. 10A-10B illustrate examples of different configurations for connecting different types of phone networks to an adapter according to examples of the present disclosure.
Figure 10B:
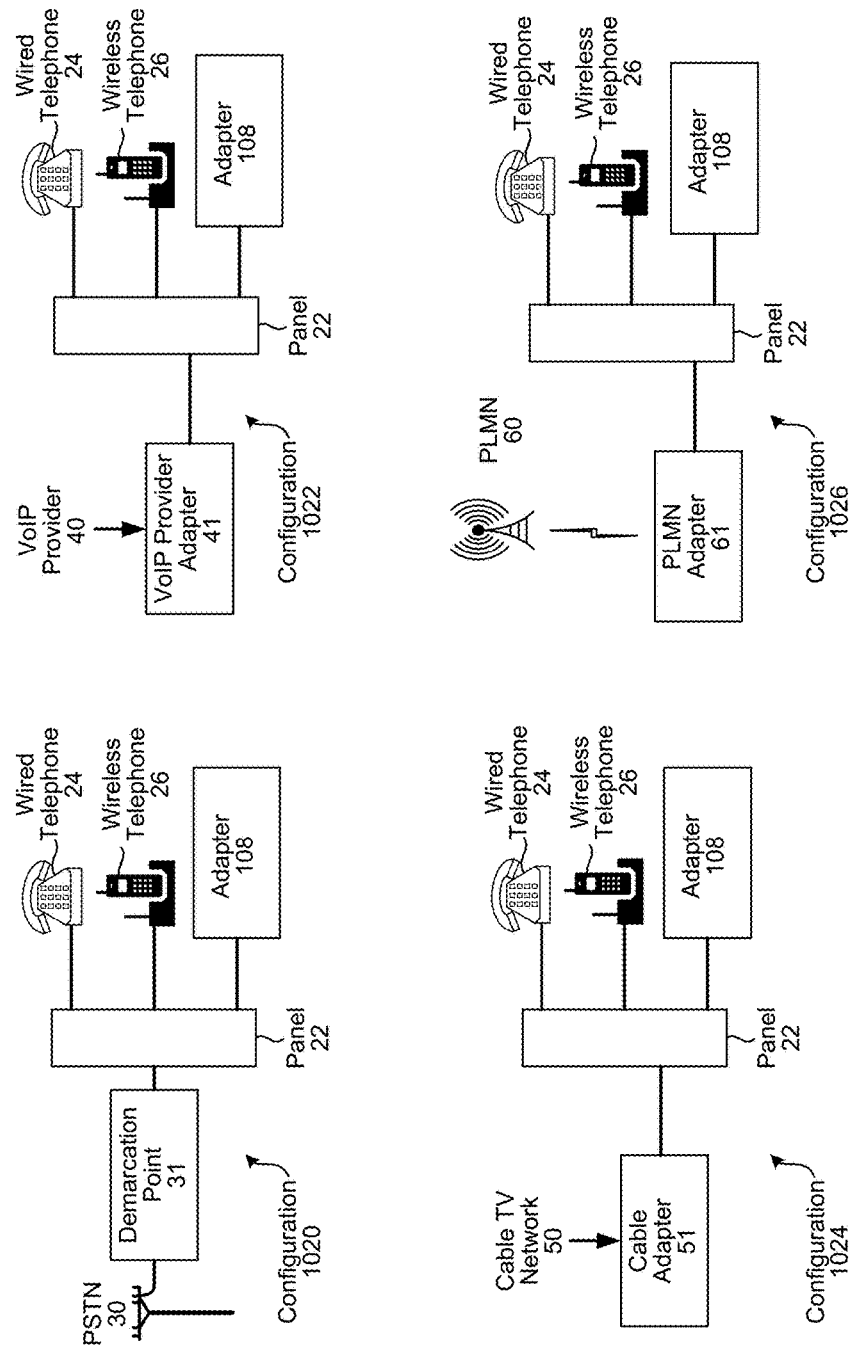

FIG. 10A-10B illustrate examples of different configurations for connecting different types of phone networks to an adapter according to examples of the present disclosure. As illustrated in FIG. 10A, the phone network 20 may be connected to the landline telephones (e.g., wired telephone 24 and wireless telephone 26) and the adapter 108 either directly via a phone adapter 21 or via the home telephone circuit 28. For example, a first configuration 1010 includes the phone adapter 21 connected to the panel 22, enabling any device connected to the panel 22 to be connected to the phone network 20 via the phone adapter 21. As illustrated in FIG. 10A, the phone adapter 21 includes a Foreign Exchange Subscriber (FXS) interface that is connected to a Foreign Exchange Office (FXO) interface on the panel 22. The FXS interface is a port that delivers an analog line to the user, such as a dial tone, battery current and ring voltage, whereas the FXO interface is a port that receives the analog line, such as a plug on the landline telephones and the adapter 108 that delivers an on-hook/off-hook indication (e.g., loop closure). For example, the panel 22 includes multiple FXS interfaces connected to FXOs of the landline telephones (e.g., 24, 26) and the adapter 108.

As illustrated in FIG. 10A, a second configuration 1012 includes the phone adapter 21 connected to the wireless telephone 26 and the adapter 108 via a splitter 1002. Thus, the FXS interface on the phone adapter 21 is connected to the splitter 1002 and to both the FXO interface on the wireless telephone 26 and the adapter 108. In both the first configuration 1010 and the second configuration 1012, the landline telephones will ring at the same time as the adapter 108 notifies the server(s) 120*b* of an incoming call. While the second configuration 1012 is similar to the first configuration 1010, the phone adapter 21 may not be connected to the panel 22 in the second configuration 1012 and therefore any telephones need to be directly connected to the phone adapter 21 in order to communicate via the phone network 20.

As illustrated in FIG. 10A, a third configuration 1014 includes the phone adapter 21 connected only to the adapter 108. Thus, there are no landline telephones connected to the phone network 20, but the adapter 108 may enable the devices 110 and any remote devices via the server(s) 120*b* to communicate via the phone network 20.

As illustrated in FIG. 10A, a fourth configuration 1016 includes the phone adapter 21 connected to the adapter 108 and a landline telephone (e.g., 26) connected to the adapter 108. Similarly, a fifth configuration 1018 includes the phone adapter 21 connected to the adapter 108 and the landline telephone 26 connected to the adapter 108. In contrast to the first configuration 1010 and the second configuration 1012, the adapter 108 is closer to the phone network 20 and therefore the adapter 108 may control when the wireless telephone 26 rings to indicate an incoming call. Thus, the adapter 108 may prevent the wireless telephone 26 from ringing entirely or may delay the ringing until the adapter 108 has sent a notification to the server(s) 120*b*, received caller identification information, and/or the like. The fourth configuration 1016 illustrates the adapter 108 connected to the phone adapter 21 using an RJ11 port, whereas the fifth configuration 1018 illustrates the adapter 108 connected to the phone adapter 21 using an RJ11 port and an RJ45 (e.g., Ethernet) port. Thus, in the fourth configuration 1016 the adapter 108 would need to connect to the AP 12 to send and receive data via the network(s) 10, whereas in the fifth configuration 1018 the adapter 108 may send and receive data via the network(s) 10 using the phone adapter 21.

As discussed above, the phone network 20 may include one or more different networks, such as the PSTN 30, the VoIP provider 40, the cable TV network 50 and/or the PLMN 60. FIG. 10B illustrates examples of connecting the adapter 108 to each of the different phone networks 20. For example, a first configuration 1020 corresponds to the PSTN 30 connecting to the panel 22 via a Demarcation Point 31, a second configuration 1022 corresponds to the VoIP provider 40 connecting to the panel 22 via a VoIP provider adapter 41, a third configuration 1024 corresponds to the cable TV network 50 connecting to the panel 22 via a cable adapter 51, and a fourth configuration 1026 corresponds to the PLMN 60 connecting to the panel 22 via a PLMN adapter 61.

As illustrated in FIG. 10B, the phone adapter 21 corresponds to the demarcation point 31, the VoIP provider adapter 42, the cable adapter 52 and/or the PLMN adapter 62, depending on the type of the phone network 20. Thus, while FIG. 10B illustrates the phone networks 20 connecting to the adapter 108 via the panel 22, this is intended for ease of illustration and the disclosure is not limited thereto. Instead, the phone networks 20 may connect to the adapter 108 using any of the configurations illustrated in FIG. 10A without departing from the disclosure.

The PSTN 30 is a typical landline telephone network that may be used to communicate over telephone wires. In contrast, the VoIP provider 40 may be used to communicate over the network(s) 10 by sending and receiving audio data and/or video data using the VoIP provider adapter 41. Similarly, the cable TV network 50 may be used to communicate via cable telephony over cable TV networks. For example, a telephone interface (e.g., cable adapter 51) may convert analog signals from the home telephone circuit 28 to digital signals and send the digital signals over the cable connection to the cable provider, which may connect to the PSTN 30 and send the digital signals using the PSTN 30. The PLMN 60 may be a mobile network that may also be interconnected with the PSTN 30. For example, a telephone interface (e.g., PLMN adapter 61) may convert analog signals from the home telephone circuit 28 to digital signals and may send the digital signals via a wireless connection to the mobile network (e.g., using cellular towers or the like), which may send the digital signals using the PLMN 60 and/or the PSTN 30.

While FIG. 10B illustrates the adapter 108 connecting to the PLMN 60 via the PLMN adapter 61, the disclosure is not limited thereto and the adapter 108 may connect to the PLMN 60 via a mobile device without departing from the disclosure. In some examples, the adapter 108 may connect to the mobile device via a wireless connection (e.g., WiFi, Bluetooth or the like) and may send and/or receive audio data over the PLMN 60 via the mobile device. For example, the mobile device may be a smartphone and may receive a telephone call over the PLMN 60 (e.g., cellular network). When the telephone call is received by the mobile device, the adapter 108 may receive the telephone call via the wireless connection and may enable the wired telephone 24, the wireless telephone 26 and/or the devices 110 to connect to the telephone call. For example, the adapter 108 may send data to the sever(s) 120 and/or the devices 110 indicating that the telephone call is being received and may receive a command to answer the telephone call and forward audio data to and from a device 110 during the telephone call. Thus, a user may answer the telephone call using the wired telephone 24, the wireless telephone 26 and/or the devices 110 instead of using the mobile device. Similarly, the adapter 108 may be configured to connect the server(s) 120a to the mobile device and/or to enable any functionality disclosed herein.

To illustrate an example of receiving an incoming telephone call, a caller (e.g. "Bob") may dial the home phone number associated with the user (e.g., (555) 555-5555), causing each of the devices (e.g., 24, 26, 108) connected to the home telephone circuit 28 to ring. The adapter 108 would detect the incoming telephone call and send a signal to the server(s) 120a indicating the incoming telephone call and/or a phone number associated with the caller. The server(s) 120a would then notify the user of the incoming telephone call by sending a notification to the devices 110. Thus, the wired telephone 24, the wireless telephone 26 and/or the devices 110 would ring and the user would choose whether or not to answer the incoming telephone call from the wired telephone 24, the wireless telephone 26 and/or the devices 110. If the user elects to answer the incoming telephone call using one of the devices 110, the device 110 may send a command (e.g., answer request) to the server(s) 120a and from the server(s) 120a to the server(s) 120b to the adapter 108 that instructs the adapter 108 to answer the incoming telephone call. Thus, the adapter 108 may answer the incoming telephone call, causing the wired telephone 24 and/or the wireless telephone 26 to stop ringing, and may forward audio data between the phone network 20 and the device 110 via the remote server(s) 120b.

Figure 11:
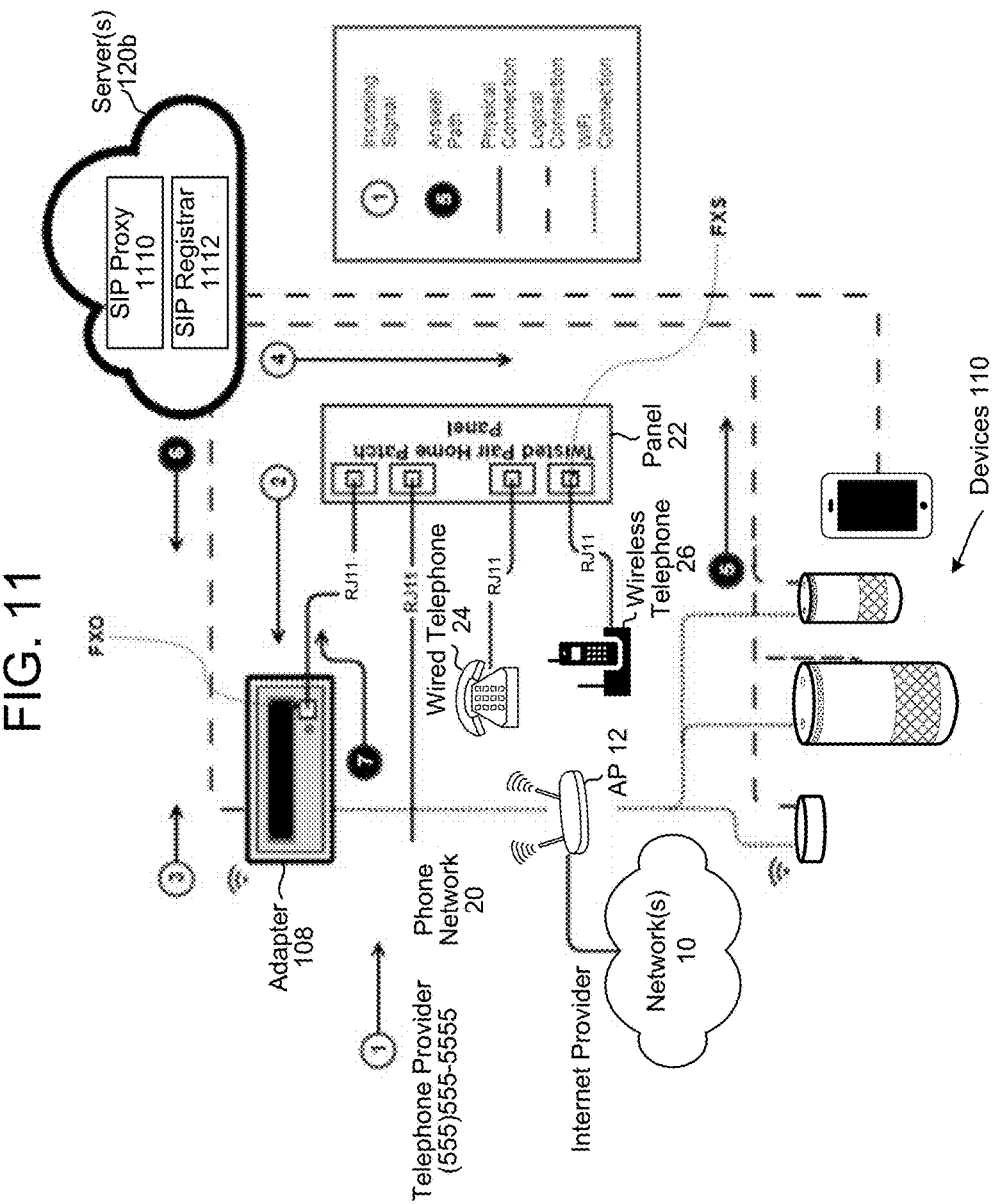
FIG. 11 illustrates an example of receiving an incoming call from a phone network according to examples of the present disclosure.

FIG. 11 illustrates an example of receiving an incoming call from a phone network 20 according to examples of the present disclosure. As illustrated in FIG. 11, an incoming call from the phone network 20 is connected to a home telephone circuit 28 corresponding to the panel 22. The panel 22 is connected to multiple devices using an RJ11 connector, including the wired telephone 24, the wireless telephone 26 and the adapter 108. When the incoming call is received by the home telephone circuit 28, the adapter 108 is notified of the incoming call. The adapter 108, via a wired and/or wireless connection (e.g., WiFi) to the home's router (e.g., AP 12), signals a Session Initiation Protocol (SIP) proxy server (e.g., SIP Proxy 1110, illustrated as part of the server(s) 120b) of the incoming call. The SIP proxy 1110 signals the Alexa communications endpoints (e.g., devices 110) including the mobile phone VoIP enabled application. When the user answers the call on one of the Alexa endpoints, the SIP proxy 1110 receives the answer request. The SIP proxy 1110 sends the answer request to the adapter 108, the adapter 108 accepts the call via the RJ11 connection and then seizes the line, which causes the landline telephones (e.g., wired telephone 24 and wireless telephone 26) to stop ringing.

In addition to the SIP proxy 1110, FIG. 11 illustrates the server(s) 120b including a SIP Registrar 1112, which is a SIP endpoint that accepts REGISTER requests and records the address and other parameters from the user agent (e.g., device 110). The SIP Registrar 1112 may provide a location service for subsequent requests. For example, the location service links one or more internet protocol (IP) addresses to the SIP uniform resource identifier (URI) of the registering agent. Multiple user agents may register for the same URI, with the result that all registered user agents receive the calls to the URI.

As illustrated in FIG. 11, an incoming signal is associated with a telephone provider for a number (e.g., (555) 555-5555). The phone network 20 sends the incoming signal to the panel 22 using a first connection (1) (e.g., physical connection), which is illustrated by a solid line. The panel 22 forwards the incoming signal to each of the devices connected to the panel 22, which includes the landline telephones (e.g., wired telephone 24 and wireless telephone 26) and the adapter 108, using a second connection (2) (e.g., physical connection). The adapter 108 communicates with the network(s) 10 via the AP 12 using a wireless connection, illustrated by a dotted line, and the adapter 108 forms a third connection (3) (e.g., logical connection) with the server(s) 120a/120b, illustrated by a dashed line, when the adapter 108 sends the incoming signal to the server(s) 120b. The devices 110 communicate with the network(s) 10 via the AP 12 using a wireless connection and the server(s) 120b form a fourth connection (e.g., logical connection) with the devices 110 when the server(s) 120a/120b forward the incoming signal to the devices 110. After receiving the incoming signal, the devices 110 may display a notification of the incoming signal to a user and may receive an input requesting the device 110 to answer the incoming signal.

While the server(s) 120b are typically in charge of communication sessions and would be used during the telephone call to send and receive audio data between the adapter 108 and the device 110, the server(s) 120a may also send the incoming signal and/or a notification of the incoming signal to the device 110. Thus, the device 110 may send a response to the server(s) 120a instead of or in addition to the server(s) 120b.

In response to receiving the input requesting the device 110 to answer the incoming signal, an answer path may be formed from the device 110 to the adapter 108. For example, the device 110 may send the answer request to the server(s) 120a using a fifth connection (e.g., logical connection) and the server(s) 120a may communicate with the server(s) 120b and the server(s) 120b may forward the answer request to the adapter 108 using a sixth connection (e.g., logical connection). The adapter 108 may receive the answer request via the AP 12 and may accept the call by connecting to the panel 22 using a seventh connection (e.g., physical connection).

Once the adapter 108 has accepted the incoming signal, incoming audio data (e.g., audio data captured by a remote telephone associated with the caller) is received by the adapter 108 from the phone network 20 via the panel 22 and is sent from the adapter 108 to the AP 12, which forwards the incoming audio data to the server(s) 120b via the network(s) 10. The server(s) 120b may forward the incoming audio data to the AP 12 via the network(s) 10 and the AP 12 may send the incoming audio data to the device 110. After receiving the incoming audio data, the device 110 may generate incoming audio corresponding to the incoming audio data using one or more speakers associated with the device 110.

Similarly, the device 110 may capture outgoing audio data corresponding to audio received from the user and may send the outgoing audio data to the AP 12, which forwards the outgoing audio data to the server(s) 120b via the network(s) 10. The server(s) 120b may send the outgoing audio data to the AP 12 via the network(s) 10 and the AP 12 may send the outgoing audio data to the adapter 108. After receiving the outgoing audio data, the adapter 108 may send the outgoing audio data to the phone network 20 via the panel 22. The caller may receive the outgoing audio data from the phone network 20 using a telephone or other device that may be configured to generate audio corresponding to the incoming audio data.

To illustrate an example of initiating an outgoing call using the device 110, the user may say "Alexa, call Bob" and the device 110 may capture audio data corresponding to this utterance. The device 110 may send the audio data to the server(s) 120a and the server(s) 120a may perform speech processing to understand the utterance and determine a command. For example, the server(s) 120a may determine that the utterance corresponds to a command to initiate a telephone call to a particular contact (e.g., "Bob") included in a user profile associated with the device 110 and may determine a phone number associated with the contact. If the selected phone number is associated with a landline (e.g., accessible via the phone network 20), the system 100 may determine to initiate the telephone call using the existing landline (e.g., phone network 20). For example, the system 100 may send a signal from the devices 110 to the server(s) 120a, the server(s) 120a may communicate with the server(s) 120b and the server(s) 120b may send a signal from the server(s) 120b to the adapter 108 to initiate the telephone call using the phone network 20. The recipient (e.g., "Bob") would recognize the user since the caller identification would indicate that the telephone call is associated with the existing landline home phone number (e.g., (555) 555-5555), which is associated with the user and may already be in the recipient's address book for the user.

The contact may be associated with multiple phone numbers. In some examples, to identify which phone number with which to initiate the telephone call, the server(s) 120a may request clarification from the user by sending a notification to the device 110. However, the disclosure is not limited thereto and the server(s) 120a may select a default phone number associated with the contact and/or may select from the multiple phone numbers based on the utterance. Thus, the server(s) 120a may attempt to determine the intent of the user based on the utterance. For example, the server(s) 120a may differentiate between "Alexa, call Mom's house" and "Alexa, call Mom's mobile" when initiating the call. Additionally or alternatively, the server(s) 120a may attempt to determine the intent of the user based on characteristics of the multiple phone numbers associated with the contact. For example, if the user requests to initiate a telephone call using the device 110 associated with the server(s) 120a and a first phone number of the multiple phone numbers is also associated with the server(s) 120a, the server(s) 120a may initiate the telephone call to the first phone number without using the phone network 20 (e.g., using software running on the device 110, voice over internet protocol (VoIP) or the like).

Similarly, the server(s) 120a may determine from which phone number the user would like to initiate the telephone call. For example, the server(s) 120a may differentiate between "Alexa, call Mom on my home line" and "Alexa, call Mom with video" or the like. In addition, if the user requests to initiate the telephone call to a landline phone number, the server(s) 120a may determine to initiate the telephone call using the phone network 20, whereas if the telephone call is to a phone number associated with the remote server(s) 120a, the server(s) 120a may determine to initiate the telephone call without using the phone network 20.

In some examples, the contact may be available via different communication paths (e.g., PSTN 30, VoIP 40, etc.), which may be associated with different applications. For example, the contact may be available via a landline number, via a first application associated with the server(s) 120b and via a second application that is not associated with the server(s) 120b. The server(s) 120a may determine which way to route the telephone call (e.g., which communication path to select) based on a cost (e.g., avoid charges), a phone quality (e.g., throughput associated with the communication path), whether presence information is available (e.g., server(s) 120b receives an indication that the contact is available via the first application), and/or the like. Thus, the server(s) 120a may determine how to route the telephone call based on the intent or based on other user preferences without departing from the disclosure.

Figure 12:
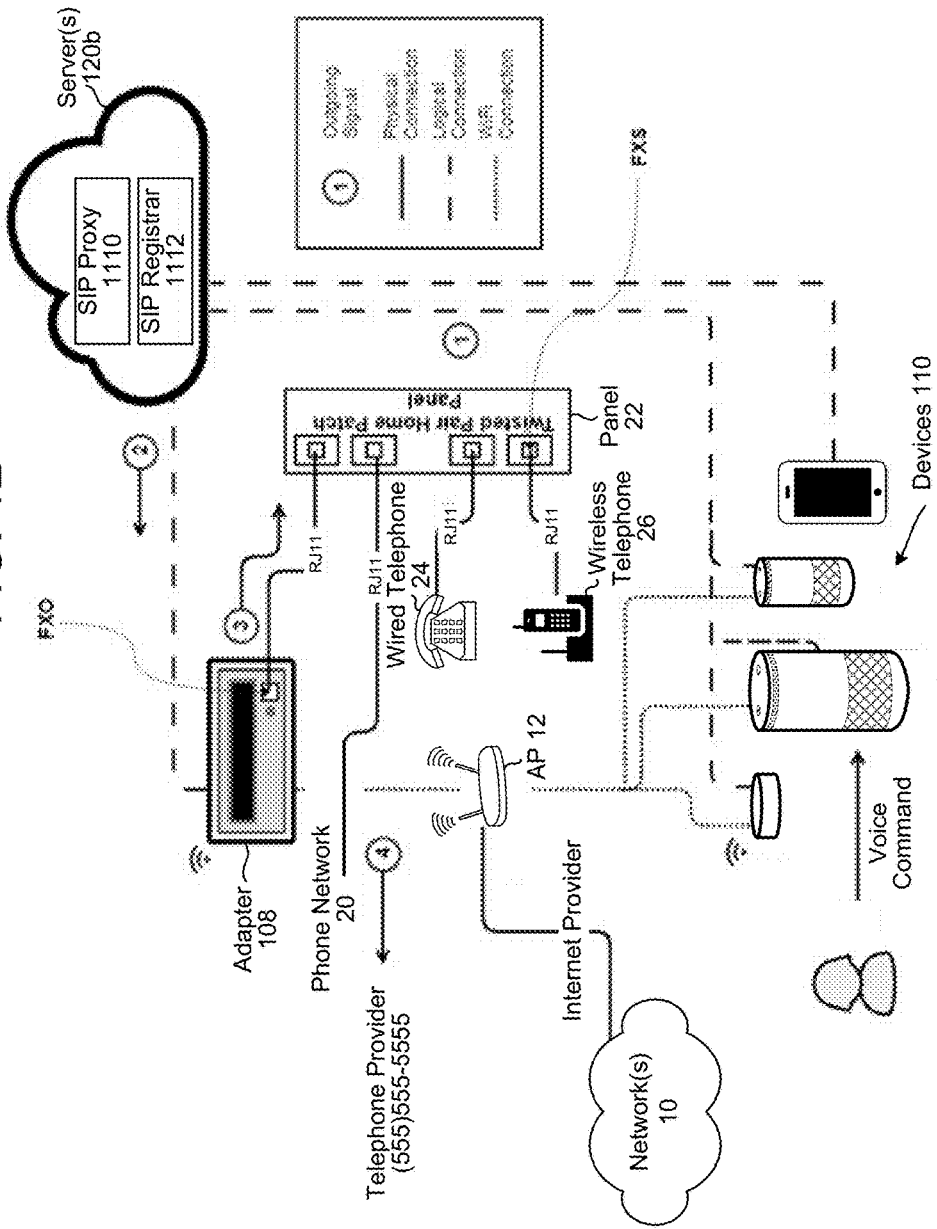
FIG. 12 illustrates an example of sending an outgoing call using a phone network according to examples of the present disclosure.

FIG. 12 illustrates an example of sending an outgoing call using a phone network 20 according to examples of the present disclosure. As illustrated in FIG. 12, the user inputs a voice command as audio to an Alexa communication endpoint (e.g., device 110 or VoIP enabled mobile application) to call a landline contact. The audio data is interpreted by the server(s) 120*a* and the call request is signaled from the server(s) 120*a* to the SIP proxy 1110 associated with the server(s) 120*b*. The SIP proxy 1110 forwards the call request to the adapter 108 and, in response to the call request, the adapter 108 goes off hook to obtain a dial tone. The call request may indicate a phone number with which to initiate the telephone call and the adapter 108 may dial the phone number using audio tones, which establishes a connection through the home telephone circuit 28 to the phone network 20. For example, each number in the phone number dialed by the adapter 108 may correspond to unique audio tones and the adapter 108, the landline telephones (e.g., wired telephone 24 and wireless telephone 26) and the phone network 20 may identify the number based on the unique audio tones.

As illustrated in FIG. 12, the outgoing signal is sent from the device 110 to the adapter 108 to call a recipient using the phone network 20. For example, the device 110 may send the outgoing signal to the server(s) 120*b* using a first connection (1) (e.g., logical connection) and the server(s) 120*b* may send the outgoing signal to the adapter using a second connection (2) (e.g., logical connection). The adapter 108 may initiate the telephone call by connecting to the panel 22 using a third connection (3) (e.g., physical connection) and dialing the phone number indicated by the outgoing signal. By dialing the phone number, the adapter 108 may form a fourth connection (4) (e.g., physical connection) with the phone network 20 via the panel 22.

During the telephone call, incoming audio data (e.g., audio data captured by a remote telephone associated with the recipient) is received by the adapter 108 from the phone network 20 via the panel 22 and is sent from the adapter 108 to the AP 12, which forwards the incoming audio data to the server(s) 120*b* via the network(s) 10. The server(s) 120*b* may forward the incoming audio data to the AP 12 via the network(s) 10 and the AP 12 may send the incoming audio data to the device 110. After receiving the incoming audio data, the device 110 may generate incoming audio corresponding to the incoming audio data using one or more speakers associated with the device 110.

Similarly, the device 110 may capture outgoing audio data corresponding to audio received from the user and may send the outgoing audio data to the AP 12, which forwards the outgoing audio data to the server(s) 120*b* via the network(s) 10. The server(s) 120*b* may send the outgoing audio data to the AP 12 via the network(s) 10 and the AP 12 may send the outgoing audio data to the adapter 108. After receiving the outgoing audio data, the adapter 108 may send the outgoing audio data to the phone network 20 via the panel 22. The recipient may receive the outgoing audio data from the phone network 20 using a telephone or other device that may be configured to generate audio corresponding to the incoming audio data.

Figure 13:
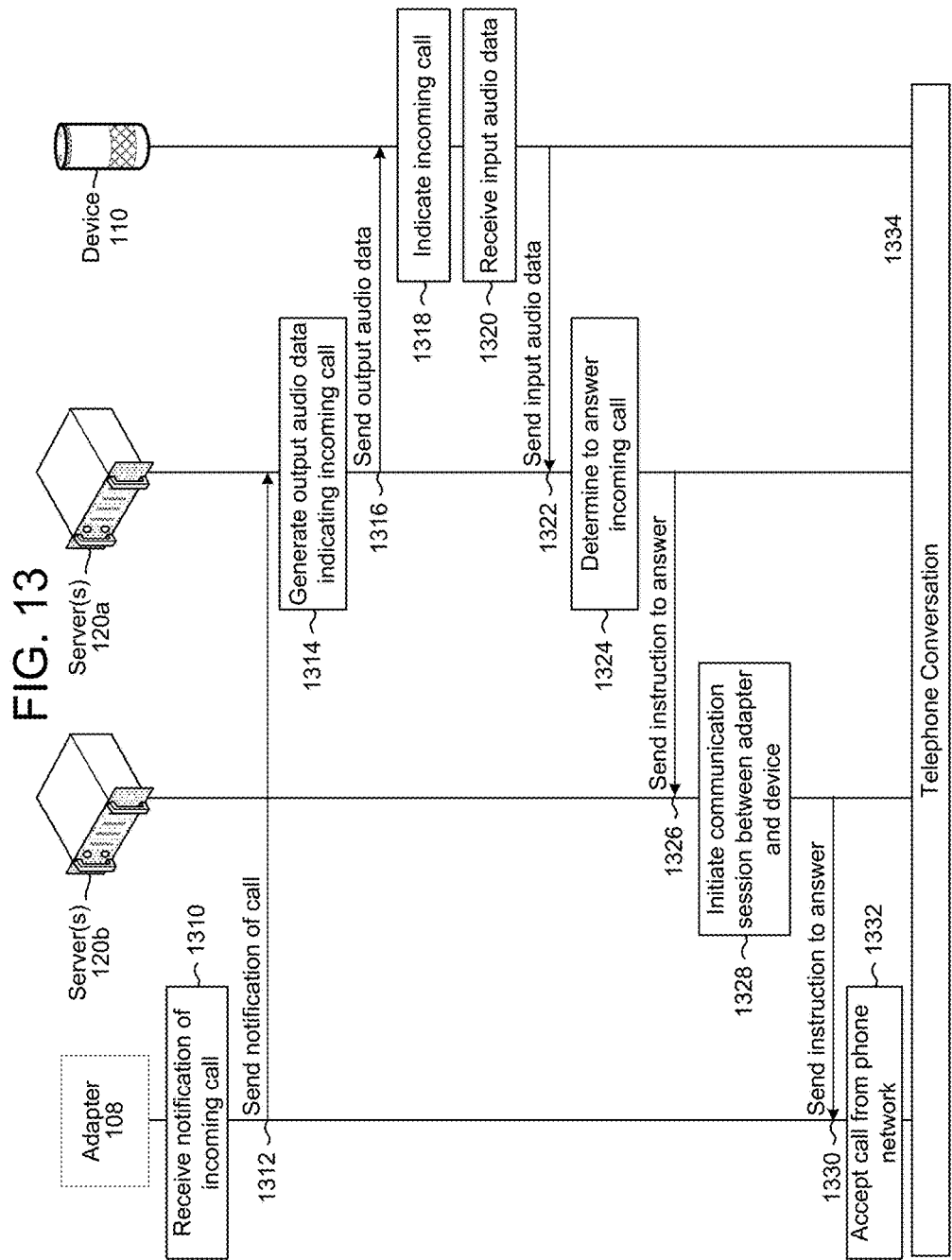
FIG. 13 is a communication diagram conceptually illustrating an example of receiving an incoming call according to embodiments of the present disclosure.

FIG. 13 is a communication diagram conceptually illustrating an example of receiving an incoming call according to embodiments of the present disclosure. As illustrated in FIG. 13, the adapter 108 may receive (1310) a notification of an incoming call from the phone network 20 and may send (1312) the notification of the incoming call to the server(s) 120*a* (e.g., directly or via the server(s) 120*b*). The server(s) 120*a* may generate (1314) output audio data indicating the incoming call and may send (1316) the output audio data to the device 110 so that the device 110 may indicate (1318) the incoming call to the user, for example by outputting audio corresponding to the output audio data. The device 110 may receive (1320) input audio data and may send (1322) the input audio data to the server(s) 120*a*, which may determine (1324) that the input audio data corresponds to an instruction to answer the incoming call.

While FIG. 13 illustrates the server(s) 120 generating output audio data and receiving input audio data, the disclosure is not limited thereto. Instead, in some examples the server(s) 120*a* may send a notification of the incoming call to the device 110 and the device 110 may indicate the incoming call to the user using other techniques, such as using a display or the like. Thus, the device 110 may receive an input command instructing the device 110 to answer the incoming call and may send an instruction to answer the incoming call (e.g., answer request) to the server(s) 120*a* without departing from the disclosure. Additionally or alternatively, the server(s) 120*b* may send the notification of the incoming call directly to the device 110 without involving the server(s) 120*a* without departing from the disclosure. For example, the device 110 may be configured to perform text-to-speech processing (e.g., using text-to-speech (TTS) component 314) without requiring the server(s) 120*a* without departing from the disclosure.

The server(s) 120*a* may send (1326) an instruction to answer the incoming call to the server(s) 120*b* and the server(s) 120*b* may initiate (1328) a communication session between the adapter 108 and the device 110 and may send (1330) the instruction to answer the incoming call to the adapter 108 and the adapter 108 may accept (1332) the incoming call from the phone network 20. Afterwards, the system 100 may conduct a telephone conversation (1334), as discussed in greater detail below with regard to FIGS. 15A-15B.

Figure 14:
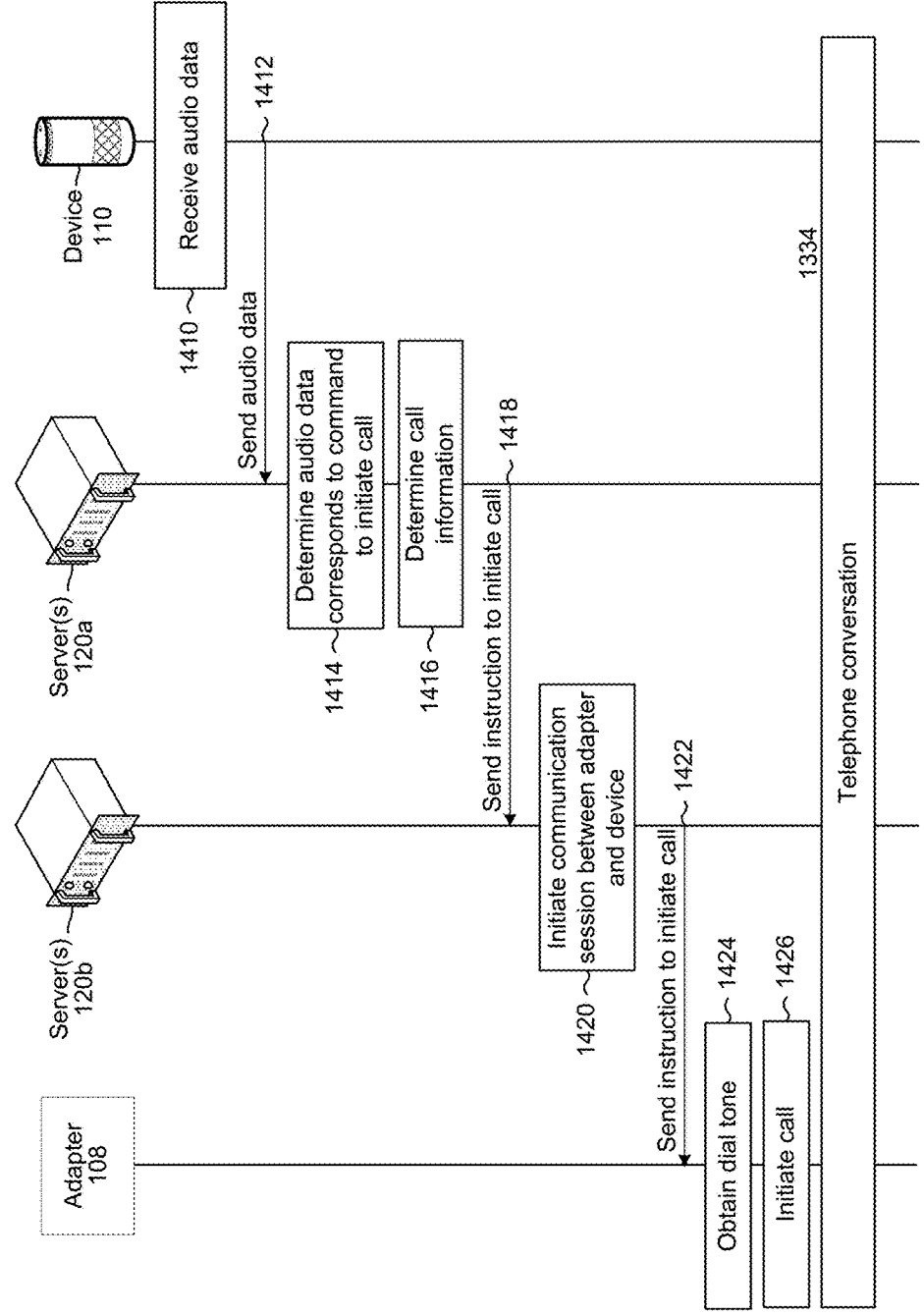
FIG. 14 is a communication diagram conceptually illustrating an example of initiating an outgoing call according to embodiments of the present disclosure.

FIG. 14 is a communication diagram conceptually illustrating an example of initiating an outgoing call according to embodiments of the present disclosure. As illustrated in FIG. 14, the device 110 may receive (1410) audio data and may send (1412) the audio data to the server(s) 120*a*. The server(s) 120*a* may determine (1414) that the audio data corresponds to a command to initiate a telephone call using the phone network 20 and may determine (1416) call information, including a number from which to call, a number to which to call and other information associated with the telephone call. For example, the server(s) 120*a* may perform speech processing on the audio data to determine text and may interpret the text to determine the command to initiate the telephone call. In some examples, the server(s) 120*a* may determine a phone number to call by identifying a contact name included in the text and identifying a phone number corresponding to the contact name using the user profile.

The server(s) 120*a* may send (1418) an instruction to initiate the telephone call (e.g., initiation request) to the server(s) 120*b*, the server(s) 120*b* may initiate (1420) a communication session between the adapter 108 and the device 110 and may send (1422) the instruction to initiate the telephone call to the adapter 108. However, the disclosure is not limited thereto and in some examples, the server(s) 120*a* may send the instruction to initiate the telephone call to the device 110 and the device 110 may send the instruction to initiate the call to the adapter 108. Thus, the server(s) 120*a* may send call information and/or the instruction to the device 110 and the device 110 may initiate the telephone call directly with the adapter 108.

The adapter 108 may obtain (1424) a dial tone and may initiate (1426) the telephone call using a phone number corresponding to the contact. For example, the adapter 108 may generate a series of audio tones corresponding to the phone number. After the adapter 108 initiates the telephone call over the phone network 20, the system 100 may conduct a telephone conversation (1334), as discussed in greater detail below with regard to FIGS. 15A-15B.

In some examples, the system 100 may send data to and receive data from a remote device (e.g., landline telephone associated with a caller) over the phone network 20 using the adapter 108, as illustrated in FIGS. 15A-15B. However, the disclosure is not limited thereto and the system 100 may send data to and receive data from a remote device (e.g., landline telephone, mobile device, computer, etc.) using voice over internet protocol (VoIP), as illustrated in FIGS. 16A-16B.

FIGS. 15A-15B are communication diagrams conceptually illustrating examples of sending and receiving audio data during a telephone conversation according to embodiments of the present disclosure. As illustrated in FIG. 15A, the device 110 may capture (1510) outgoing audio data using one or more microphones associated with the device 110 and may send (1512) the outgoing audio data directly to the adapter 108. For example, the device 110 may send the outgoing audio data to the adapter 108 via the AP 12 and/or directly using a wireless connection, such as WiFi, Bluetooth or the like. The adapter 108 may receive the outgoing audio data and may send (1514) the outgoing audio data over the phone network 20. The adapter 108 may receive (1516) incoming audio data over the phone network 20 and may send (1518) the incoming audio data to the device 110. For example, the adapter 108 may send the incoming audio data to the device 110 via the AP 12 and/or directly using a wireless connection, such as WiFi, Bluetooth or the like. The device 110 may receive the incoming audio data and may playback (1520) the incoming audio data to generate output audio using one or more speakers associated with the device 110.

As illustrated in FIG. 15A, in some examples the device 110 may directly connect to the adapter 108 using a wireless connection without departing from the disclosure. Thus, when the server(s) 120a sends an instruction to the device 110, the adapter 108 and/or the server(s) 120b to establish a communication session, the instruction may cause the device 110 to connect to the adapter 108 without the server(s) 120b. For example, one of the device 110 and/or the adapter 108 may become an access point (e.g., software enabled access point) and the other device may be instructed to connect to the access point.

As illustrated in FIG. 15B, the device 110 may capture (1510) the outgoing audio data using one or more microphones associated with the device 110. Instead of sending the outgoing audio data to the adapter 108 directly, the device 110 may send (1522) the outgoing audio data to the server(s) 120b and the server(s) 120b may send (1524) the outgoing audio data to the adapter 108. The adapter 108 may receive the outgoing audio data and may send (1514) the outgoing audio data over the phone network 20. The adapter 108 may receive (1516) incoming audio data over the phone network 20 and may send (1526) the incoming audio data to the server(s) 120b. The server(s) 120b may receive the incoming audio data and may send (1528) the incoming audio data to the device 110. The device 110 may receive the incoming audio data and may playback (1520) the incoming audio data to generate output audio using one or more speakers associated with the device 110.

In some examples, the phone network 20 may be unavailable. For example, a second user may be engaged in a telephone call using the phone network 20 via the wired telephone 24 and/or the wireless telephone 26. If the phone network 20 is in use by another telephone, the adapter 108 is unable to initiate a telephone call using the phone network 20. For example, the device 110 may send a command to initiate a telephone call using the adapter 108, but the adapter 108 may send a notification to the device 110 that the phone network 20 is currently busy. If the user wants to initiate a telephone call immediately, the device 110 may initiate the telephone call using VoIP instead of using the phone network 20.

FIG. 16A is a communication diagram conceptually illustrating an example of sending and receiving audio data during a telephone conversation using VoIP according to embodiments of the present disclosure. As illustrated in FIG. 16A, the device 110 may capture (1610) outgoing audio data using one or more microphones associated with the device 110 and may send (1612) the outgoing audio data to the server(s) 120b. The server(s) 120b may send (1614) the outgoing audio data to the network(s) 10 using VoIP and may receive (1616) incoming audio data from the network(s) 10 using VoIP. The server(s) 120b may send (1618) the incoming audio data to the device 110 and the device 110 may playback (1620) the incoming audio data to generate output audio using one or more speakers associated with the device 110.

While FIG. 16A illustrates the device 110 initiating a telephone call using VoIP, the disclosure is not limited thereto. Instead of using the phone network 20, the user may prefer to initiate a telephone call using VoIP from a landline telephone (e.g., wired telephone 24 or wireless telephone 26). For example, a long distance telephone call may result in charges when using the phone network 20 but may not cost money when using VoIP. Therefore, the adapter 108 may enable the landline telephone connected to the home telephone circuit 28 (e.g., connected to the phone network 20 via the panel 22) to send audio data to the server(s) 120a/120b and initiate a telephone call using VoIP.

FIG. 16B is a communication diagram conceptually illustrating an example of sending and receiving audio data during a telephone conversation using VoIP according to embodiments of the present disclosure. As illustrated in FIG. 16B, the wireless telephone 26 may capture (1650) outgoing audio data using one or more microphones associated with the wireless telephone 26 and may send the outgoing audio data to devices connected to the home telephone circuit 28 (e.g., connected to the panel 22). The adapter 108 may receive (1652) the outgoing audio data and may send (1654) the outgoing audio data to the server(s) 120b. The server(s) 120b may send (1656) the outgoing audio data to the network(s) 10 using VoIP and may receive (1658) incoming audio data from the network(s) 10 using VoIP. The server(s) 120b may send (1660) the incoming audio data to the adapter 108, the adapter 108 may send (1662) the incoming audio data to the wireless telephone 26 and the wireless telephone 26 may playback (1664) the incoming audio data to generate output audio using one or more speakers associated with the wireless telephone 26.

In addition to enabling VoIP, the adapter 108 may enable voice commands for landline telephones connected to the home telephone circuit 28. For example, a landline telephone may capture audio data and may send the audio data to the home telephone circuit 28, which may be received by the adapter 108 and sent to the server(s) 120a. The server(s) 120a may perform speech processing on the audio data to determine a voice command and may execute the voice command. Thus, the landline telephone may be used to issue voice commands to the server(s) 120*a*, which may control the devices 110, other devices associated with a user profile or the like.

The voice commands may control the devices 110 and/or the adapter 108 (e.g., initiate or receive a telephone call using the phone network 20), audio devices (e.g., play music over speakers, capture audio using microphones, or the like), multimedia devices (e.g., play videos using a display, such as a television, computer, tablet or the like), smart home devices (e.g., change temperature controls, turn on/off lights, lock/unlock doors, etc.) or the like. Thus, the adapter 108 may enable the landline telephone to control any device or services controlled by the server(s) 120*a* using voice commands. For example, the user may pick up a landline telephone and say "Alexa, stream Christmas music in the living room," "Alexa, turn up the volume," "Alexa, set the oven to a temperature of 475 degrees," "Alexa, turn on the lights in the living room," "Alexa, unlock the front door," "Alexa, turn the heat up to 72 degrees," or the like.

FIGS. 17A-17C illustrate examples of enabling voice commands on a landline device according to embodiments of the present disclosure. As illustrated in FIG. 17A, the adapter 108 may receive (1710) audio data from the wireless telephone 26 and may send (1712) the audio data to the server(s) 120*a*. The server(s) 120*a* may determine (1714) that the audio data corresponds to a command to initiate a telephone call using the phone network 20 and may determine (1716) a contact to call. For example, the server(s) 120*a* may perform speech processing on the audio data to determine text and may interpret the text to determine the command. In some examples, the server(s) 120*a* may determine the contact to call by identifying a recipient included in the text based on the user profile.

The server(s) 120*b* may send (1718) an instruction to initiate the telephone call to the adapter 108 and the adapter 108 may dial (1720) a phone number corresponding to the contact. For example, the adapter 108 may generate a series of audio tones corresponding to the phone number. After the adapter 108 initiates the telephone call over the phone network 20, the wireless telephone 26 may conduct a telephone conversation (1722), with audio data being sent between the wireless telephone 26 and a remote device associated with the phone number via the phone network 20.

While FIG. 17A illustrates the wireless telephone 26 sending a voice command to initiate a telephone call, the disclosure is not limited thereto. Instead, the wireless telephone 26 may send a voice command to perform a variety of actions, as illustrated in FIG. 17B. Additionally or alternatively, while FIG. 17A illustrates the server(s) 120*a* sending data to and receiving data from the adapter 108, the disclosure is not limited thereto and the server(s) 120*a* may send data to and receive data from the adapter 108 via the server(s) 120*b*.

As illustrated in FIG. 17B, the adapter 108 may receive (1710) the audio data from the wireless telephone 26 and may send (1712) the audio data to the server(s) 120*a*. The server(s) 120*a* may determine (1730) a command corresponding to the audio data and may send (1732) an instruction to perform the command to one or more smart home devices 1700, which may perform (1734) the command. The smart home devices 1700 may include any "smart" device that is configured to connect to the network(s) 10 and may receive data from the server(s) 120*a*. For example, the smart home devices 1700 may include a thermostat device, smart appliances (e.g., refrigerator, dishwasher, washing machine, etc.), light switches, electronic door locks, or the like. Thus, the adapter 108 may enable the wireless telephone 26 to send voice commands to change a temperature, turn on/off lights, lock/unlock doors or perform other commands.

While FIG. 17B illustrates the adapter 108 receiving the audio data from a telephone connected to the home telephone circuit 28 (e.g., the wireless telephone 26), the disclosure is not limited thereto. Instead, the adapter 108 may receive the audio data from any device via the phone network 20. For example, the user may remotely access the adapter 108 by calling the user's own number from a remote device and validating remote access credentials. Thus, the adapter 108 may enable the user to input voice commands from any telephone connected to the phone network 20.

As illustrated in FIG. 17C, the adapter 108 may receive (1750) a remote access request from the phone network 20. For example, a remote telephone may call the phone number associated with the home telephone circuit 28 and may input a command (e.g., voice command, sequence of numbers or the like) that indicates to the adapter 108 that remote access is being requested. The adapter 108 and/or the server(s) 120*a*/120*b* may validate (1752) remote access credentials in order to all the remote access. For example, the remote telephone may send audio data including a username and/or password, may generate audio tones corresponding to a sequence of numbers or the like. In some examples, the remote access command may be received by the server(s) 120*a*/120*b* and an instruction may be sent to the adapter 108 to send the audio data to the server(s) 120*a*/120*b*. For example, the incoming telephone call may not be answered and the server(s) 120*a*/120*b* may be configured to answer the incoming telephone call to generate a voicemail. While recording the voicemail, the server(s) 120*a*/120*b* may detect the remote access request and validate the remote access credentials.

After the remote access credentials are validated, the adapter 108 may receive (1754) audio data from the phone network 20 and may send (1756) the audio data to the server(s) 120*a*. The server(s) 120*a* may determine (1730) a command corresponding to the audio data and may send (1732) an instruction to perform the command to one or more smart home devices 1700, which may perform (1734) the command. The smart home devices 1700 may include any "smart" device that is configured to connect to the network(s) 10 and may receive data from the server(s) 120*a*. For example, the smart home devices 1700 may include a thermostat device, smart appliances (e.g., refrigerator, dishwasher, washing machine, etc.), light switches, electronic door locks, or the like. Thus, the adapter 108 may enable the wireless telephone 26 to send voice commands to change a temperature, turn on/off lights, lock/unlock doors or perform other commands.

While FIGS. 17B-17C illustrate the server(s) 120*a* sending the instruction to smart home devices 1700, the disclosure is not limited thereto. Instead, the server(s) 120*a* may send the instruction to any device associated with the user profile that is configured to receive data from the server(s) 120*a*. Additionally or alternatively, the smart home devices 1700 may include audio devices (e.g., devices having one or more speakers), display devices (e.g., devices having a display) or the like without departing from the disclosure. For example, the adapter 108 may enable the wireless telephone 26 to send voice commands to play music over speakers, capture audio data using microphones, play videos using a display, capture video data using cameras, or the like without departing from the disclosure.

In some examples, the adapter 108 may send all audio data received from the home telephone circuit 28 to the server(s) 120*a* and the server(s) 120*a* may determine whether the audio data includes voice commands. However, the disclosure is not limited thereto and the adapter 108 may determine to send audio data to the server(s) 120*a* using various techniques.

FIG. 18 illustrates multiple examples of an adapter identifying input commands to send audio data to a remote server according to embodiments of the present disclosure. As illustrated in FIG. 18, the user 10 may speak a wakeword 1810 and a landline telephone (e.g., wired telephone 24) may generate audio data including the wakeword 1810 and send it to devices connected to the home telephone circuit 28.

The adapter 108 may receive the audio data and may detect the wakeword 1810 using a wakeword detecting component 220. In some examples, the adapter 108 may include the wakeword detection component 220 and may detect the wakeword 1810 included in the audio data directly. In other examples, the adapter 108 may be physically connected to the device 110, which includes the wakeword detection component 220, and the device 110 may detect the wakeword 1810 included in the audio data. For example, the adapter 108 may be included in a charging station, docking station or the like that may mount to the device 110. However, the disclosure is not limited thereto and the adapter 108 may be mounted separately from the device 110 but may send the audio data to the device 110 using a wired connection. Additionally or alternatively, the adapter 108 may be included in the device 110 without departing from the present disclosure.

In other examples, the adapter 108 may be located separately from the device 110 but may send the audio data to the device 110 using a wireless connection. For example, the adapter 108 may send the audio data to the AP 12 and the AP 12 may forward the audio data to the device 110.

When the wakeword detection component 220 detects the wakeword 1810, the wakeword detection component 220 may send a command to the adapter 108 to send the audio data to the server(s) 120*a*. The adapter 108 may then send the audio data to the server(s) 120*a* and the server(s) 120*a* may perform speech processing on the audio data to determine the voice command included in the audio data. However, the disclosure is not limited thereto and if the wakeword detection component 220 is included in the device 110, the device 110 may send the audio data to the server(s) 120*a* upon detecting the wakeword 1810. Thus, when the adapter 108 sends the audio data to the device 110 to be processed by the wakeword detection component 220, the device 110 may detect the wakeword 1810 and send the audio data directly to the server(s) 120*a*.

As illustrated in FIG. 18, the user 10 may use a keypad 1820 to input a numeric command 1822 and/or a remote access command 1826 to instruct the adapter 108 to send corresponding audio data to the server(s) 120*a*. When the user 10 is using a telephone that is connected to the home telephone circuit 28, such as the wired telephone 24, the user 10 may use the keypad 1820 associated with the wired telephone 24 to input the numeric command 1822. After obtaining a dial tone, the user 10 may input the numeric command 1822, which may be a sequence of audio tones corresponding to a particular symbol followed by a string of numbers. For example, FIG. 18 illustrates the numeric command 1822 corresponding to "*701," such that the adapter 108 detects any time that the user inputs *701 using the keypad 1820 and sends audio data to the server(s) 120*a*.

When the user 10 is using a telephone that is not connected to the home telephone circuit 28, such as the remote telephone 1824, the user 10 may use the keypad 1820 associated with the remote telephone 1424 to input the remote access command 1426. However, the remote telephone 1824 must first connect to the home telephone circuit 28 by calling a number associated with the home telephone circuit 28 using the phone network 20. When the remote telephone 1824 connects to the home telephone circuit 28, the user 10 may use the keypad 1820 associated with the remote telephone 1824 to input the remote access command 1826, such as a sequence of audio tones corresponding to a particular string of numbers. In some examples, the remote access command 1826 may be identical to the numeric command 1822, but the disclosure is not limited thereto. Instead, the remote access command 1826 may include additional numbers corresponding to a password, pin number or the like that is stored in a user profile associated with the home telephone circuit 28. Thus, the adapter 108 and/or the server(s) 120*a* may validate remote access credentials using the additional numbers.

FIG. 19 illustrates examples of different functionality provided by an adapter according to embodiments of the present disclosure. As illustrated in FIG. 19, the adapter 108 may be configured to detect (1910) a prompt, such as a wakeword 1810, a numeric command 1822, a remote access command 1826, or the like, and to send (1912) audio data to the server(s) 120*a* to determine voice commands included in the audio data. Thus, the adapter 108 may enable voice commands on landline telephones.

The adapter 108 may be configured to monitor (1920) call statistics during a telephone call (e.g., determine call statistics) and to send (1922) the call statistics to the server(s) 120*a*. For example, the adapter 108 may identify a phone number associated with the recipient, a contact name associated with the phone number, a number of devices connected to the home telephone circuit 28 during the telephone call, a duration of the telephone call and the like. The server(s) 120*a* may store the call statistics and provide individual call statistics (e.g., duration of a current telephone call) or aggregate call statistics (e.g., amount of time spent on the phone). For example, the server(s) 120*a* may perform voice recognition on the audio data to determine identities associated with the telephone call and may track the call statistics based on the identities.

The adapter 108 may be configured to identify (1930) that the phone network 20 is busy or unavailable and to send (1932) an indication that the phone network 20 is busy to the server(s) 120*b*. For example, the adapter 108 may detect whenever the home telephone circuit 28 is connected to the phone network 20 during a telephone call and may send the indication to the server(s) 120*b* indicating that the phone network 20 is unavailable. Additionally or alternatively, the adapter 108 may receive an instruction to initiate a telephone call using the phone network 20 from the server(s) 120*b*, may detect that that phone network 20 is unavailable and may send the indication to the server(s) 120*b* indicating that the phone network 20 is unavailable. When the user 10 inputs a command to initiate the telephone call while the phone network 20 is unavailable, the server(s) 120*a* may provide additional options to the user 10 to complete the telephone call, as discussed below with regard to FIGS. 16A-16C.

During a telephone conversation (1940), the adapter 108 may be configured to detect (1942) that an additional telephone connected to the home telephone circuit 28 is active (e.g., picked up) and to send (1944) an indication that the telephone call is not secure. For example, the user 10 may not wish for anyone to listen to the telephone call and the adapter 108 may detect a change in voltage on the home telephone circuit 28 when the wired telephone 24 is active and listening to the telephone call. Thus, the adapter 108 may send the indication that the telephone call is not secure to the server(s) 120b, the server(s) 120b may communicate with the server(s) 120a and the server(s) 120a may send a notification to the user 10 indicating that the telephone call is not secure.

The adapter 108 may be configured to detect (1950) a charge call on the phone network 20 and to reset (1952) the phone network 20 to hang up the charge call. For example, the adapter 108 may detect a phone number input to the home telephone circuit 28 that is associated with charges, such as a long distance number, a premium-rate telephone number or the like. Upon detecting the phone number, the adapter 108 may automatically hang up to end the telephone call.

In some examples, the adapter 108 may be configured to hang up the telephone call associated with the charges using the phone network 20 and to initiate a second telephone call using VoIP via the server(s) 120b. For example, the adapter 108 may determine that the phone number is a long distance number, may reset the phone network 20 to end the telephone call and may send a request to the server(s) 120b to initiate the second telephone call to the phone number using VoIP. Thus, the adapter 108 enables the user 10 to avoid charges associated with long distance calling while still making the long distance call.

The adapter 108 may be configured to intercept (1960) a signal to an alarm company that is sent over the phone network 20 by an alarm system and to send (1562) an indication of the alarm to the server(s) 120b. For example, the alarm system may send a notification of the alarm being triggered to a phone number associated with the alarm company using the phone network 20. The adapter 108 may identify the phone number and/or identify that the phone number is associated with the alarm company and may send the indication of the alarm to the server(s) 120b.

Due to the adapter 108 intercepting the alarm signal, the server(s) 120a may be enabled to offer multiple services to the user 10 in response to the alarm being triggered. For example, the server(s) 120a may send a notification to the user 10, via email, text message or the like, enabling the user 10 to learn of the alarm being triggered and to respond more quickly. In some examples, the server(s) 120a may send an instruction to a speaker-enabled device in proximity to the adapter 108 (e.g., located within the home associated with the home telephone circuit 28) instructing the speaker-enabled device to blast audio at high volumes (e.g., generate a siren or audio alarm). The server(s) 120a may identify a physical location associated with the adapter 108 using a location sensor included in the adapter 108 and/or devices within wireless range of the adapter 108, although the disclosure is not limited thereto. Instead, the server(s) 120a may identify the physical location associated with the home phone number or the like or based on a location associated with the adapter 108 in the user profile.

Additionally or alternatively, the server(s) 120a may send an instruction to a microphone-enabled device in proximity to the adapter 108 (e.g., located within the home associated with the home telephone circuit 28) instructing the microphone-enabled device to capture audio data. The audio data may be stored locally on the microphone-enabled device, sent to the server(s) 120a, stored on the server(s) 120a, and/or sent to the devices 110 or other devices associated with the user profile. Thus, the server(s) 120a may generate audio at high volume to deter a potential intruder and/or may capture audio data to potentially identify the potential intruder.

The adapter 108 may be configured to perform intercom functionality. For example, the adapter 108 may send audio data to the wireless telephone 26 using wireless signals, such as very high frequency (VHF) and/or ultra high frequency (UHF) signals. Thus, the user 10 may speak an utterance that is captured by the devices 110 as audio data and sent from the device 110 to the server(s) 120a and then to the adapter 108 via the network(s) 10. The adapter 108 may then send the audio data to the wireless telephone 26 using the wireless signals (e.g., UHF/VHF 1970), and the wireless telephone 26 may generate output audio corresponding to the audio data. Thus, the adapter 108 may enable the devices 110 and/or other devices to perform intercom functionality with the wireless telephone 26 despite not being in proximity to the wireless telephone 26 and/or capable of sending the wireless signals.

As illustrated above with regard to FIGS. 15A-16B, the adapter 108 may be configured to send audio data from the phone network 20 and the server(s) 120b during the telephone call. While this allows the device 110 to initiate or receive telephone calls using the phone network 20, this also enables additional functionality for telephones connected to the home telephone circuit 28, such as three way telephone calls, conference calls, or the like. The additional functionality may be performed using the phone network 20 (e.g., during a telephone call using the phone network 20) or without the phone network 20 (e.g., during a telephone call using VoIP). For example, the user 10 may be talking to a second user during a telephone call when a third user wants to join. The third user may use another telephone connected to the home telephone circuit 28, may use the device 110 connected to the server(s) 120b or may use a remote device that connects to the telephone call via the server(s) 120b.

In some examples, the phone network 20 may be unavailable. For example, a second user may be engaged in a telephone call using the phone network 20 via the wired telephone 24 and/or the wireless telephone 26. If the phone network 20 is in use by another telephone, the adapter 108 is unable to initiate a telephone call using the phone network 20. For example, the device 110 may send a command to initiate a telephone call using the adapter 108, but the adapter 108 may send a notification to the device 110 that the phone network 20 is currently busy. If the user wants to initiate a telephone call immediately, the device 110 may initiate the telephone call using VoIP via the server(s) 120b instead of using the phone network 20. Alternatively, the user may request a notification when the phone network 20 becomes available. Thus, the adapter 108 may detect when the phone network 20 is available and may send an indication to the server(s) 120b, which may communicate with the server(s) 120a and the server(s) 120a may send a notification to the user. In some examples, the user may request a call back when the phone network 20 becomes available. Thus, the adapter 108 may detect when the phone network 20 is available and may send an indication to the server(s) 120b, which may communicate with the server(s) 120a and the server(s) 120a may send an instruction to the adapter 108 to initiate the telephone call. If the recipient answers the telephone call, the server(s) 120b may treat it similarly to an incoming call and may send a notification to the device 110.

Figure 20B:
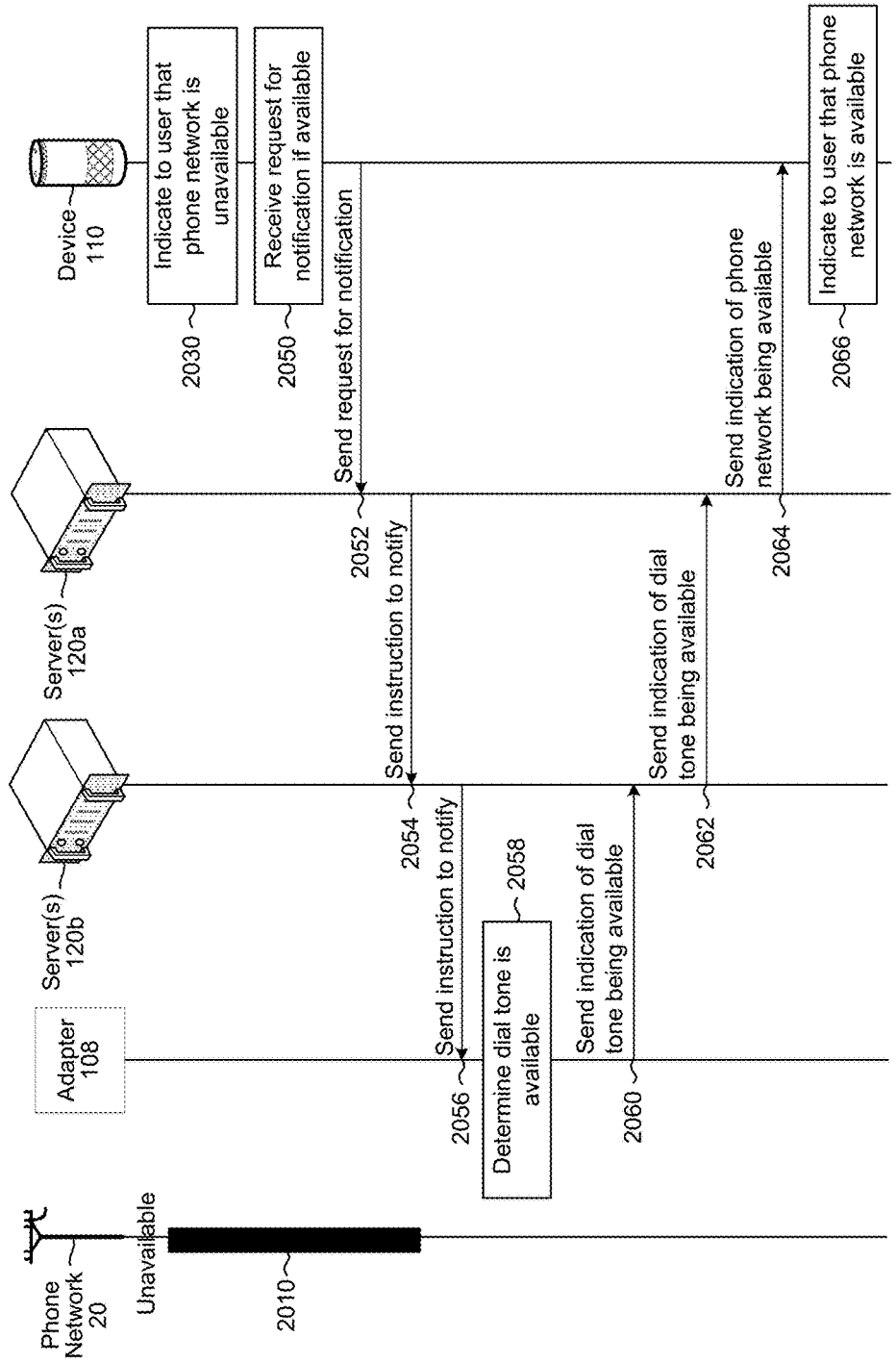

FIGS. 20A-20C are communication diagrams conceptually illustrating examples of services offered when an outgoing call is unavailable according to embodiments of the present disclosure. As illustrated in FIG. 20A, the phone network 20 may be unavailable (2010) for a period of time, such as during a telephone call using one of the landline telephones (e.g., wired telephone 24 and/or wireless telephone 26). When the phone network 20 is unavailable, the adapter 108 may not initiate a telephone call using the phone network 20.

The device 110 may receive (2012) audio data and may send (2014) the audio data to the server(s) 120*a*. The server(s) 120*a* may determine (2016) that the audio data corresponds to (e.g., represents) a command to initiate a telephone call and may send (2018) an instruction to initiate the call to the server(s) 120*b*, which may send (2020) the instruction to initiate the call to the adapter 108. The adapter 108 may determine (2022) that the dial tone is unavailable, which indicates that the phone network 20 is in use or otherwise unavailable. Thus, the adapter 108 may send (2024) an indication of the dial tone being unavailable to the server(s) 120*b*, which may send (2026) the indication to the server(s) 120*a*. The server(s) 120*a* may send (2028) the indication of the dial tone being unavailable to the device 110 and the device 110 may indicate (2030) to the user that the phone network is unavailable. For example, the device 110 may notify the user that the phone network is unavailable but offer alternatives (e.g., initiate telephone call using VoIP, send indication when the phone network 20 becomes available, initiate telephone call immediately when the phone network 20 becomes available, etc.). The device 110 may receive (2032) a request to initiate the telephone call using VoIP, instead of the phone network 20, and the device 110 and the server(s) 120*b* may initiate (1634) the telephone call using VoIP.

While FIG. 20A illustrates the server(s) 120*b* sending the indication of the dial tone being unavailable to the device 110 via the server(s) 120*a*, the disclosure is not limited thereto and the server(s) 120*b* may send the indication of the dial tone being unavailable directly to the device 110 without departing from the disclosure. For example, the system 100 may automatically select one of the alternative options (e.g., initiate telephone call using VoIP, send indication when the phone network 20 becomes available, initiate telephone call immediately when the phone network 20 becomes available, etc.). Additionally or alternatively, the device 110 may be configured to perform text-to-speech processing (e.g., text-to-speech (TTS) component 314) and may provide the alternative options based on receiving the indication of the dial tone being unavailable from the server(s) 120*b*.

While FIG. 20A illustrates the adapter 108 determining that the dial tone is unavailable in response to the instruction to initiate the telephone call, the disclosure is not limited thereto. Instead, the adapter 108 may determine that the dial tone is unavailable and send an indication to the server(s) 120*b* whenever the phone network 20 is unavailable without departing from the disclosure.

While FIG. 20A illustrates the user requesting to initiate the telephone call using VoIP, the disclosure is not limited thereto. In other examples, the user may wait for the phone network 20 to become available before placing the telephone call. As illustrated in FIG. 20B, the device 110 may indicate (2030) to the user that the phone network 20 is unavailable, may receive (2050) a request for a notification if the phone network 20 becomes available and may send (2052) the request for the notification to the server(s) 120*a*, which may send (2054) the request to the server(s) 120*b*, which may send (2056) the request to the adapter 108. When the phone network 20 becomes available, the adapter 108 may determine (2058) that the dial tone is available and may send (2060) an indication of the dial tone being available to the server(s) 120*b*, which may send (2062) the indication to the server(s) 120*a*. The server(s) 120*a* may send (2064) an indication of the dial tone being available to the device 110 and the device 110 may indicate (2066) to the user that the phone network 20 is available. While not illustrated in FIG. 20B, the server(s) 120*a* may generate audio data indicating that the phone network 20 is available and may send the audio data to the device 110 without departing from the disclosure. Thus, the device 110 may notify the user that the phone network 20 is available by generating audio using the audio data. Additionally or alternatively, the server(s) 120*b* may send the indication of the dial tone being available directly to the device 110 without including the server(s) 120*a* without departing from the disclosure.

In some examples, the user may request that the adapter 108 initiate the telephone call immediately upon the phone network 20 becoming available. As illustrated in FIG. 20C, the device 110 may indicate (2030) to the user that the phone network 20 is unavailable, may receive (2070) a request for a callback when the phone network 20 becomes available and may send (2072) the request for the callback to the server(s) 120*a*. The server(s) 120*a* may send (2074) an instruction to notify when the phone network 20 becomes available to the server(s) 120*b* and the server(s) 120*b* may send the instruction to the adapter 108. When the phone network 20 becomes available, the adapter 108 may determine (2078) that the dial tone is available and may send (2080) an indication of the dial tone being available to the server(s) 120*b*. The server(s) 120*b* may send (2082) an instruction to initiate the telephone call to the adapter 108 and the adapter 108 may initiate (2084) the telephone call using the phone network 20. If the recipient answers the telephone call, the adapter 108 may send (2086) a notification of the telephone call to the server(s) 120*b* and the server(s) 120*b* may send (2088) the notification of the telephone call to the device 110. The device 110 may indicate (2090) the incoming telephone call to the user and the system 100 may conduct (2092) the telephone conversation using the phone network 20.

While FIG. 20C illustrates the server(s) 120*a* sending the notification of the telephone call to the device 110 after the recipient answers the telephone call, the disclosure is not limited thereto. Instead, the adapter 108 may initiate the telephone call and the server(s) 120*a* may send the notification of the telephone call to the device 110 prior to the recipient answering the telephone call. While not illustrated in FIG. 20C, the server(s) 120*a* may generate audio data notifying the user of the telephone call and may send the audio data to the device 110 without departing from the disclosure. Thus, the device 110 may notify the user that the telephone call has been initiated and/or answered by generating audio using the audio data.

Figure 21B:
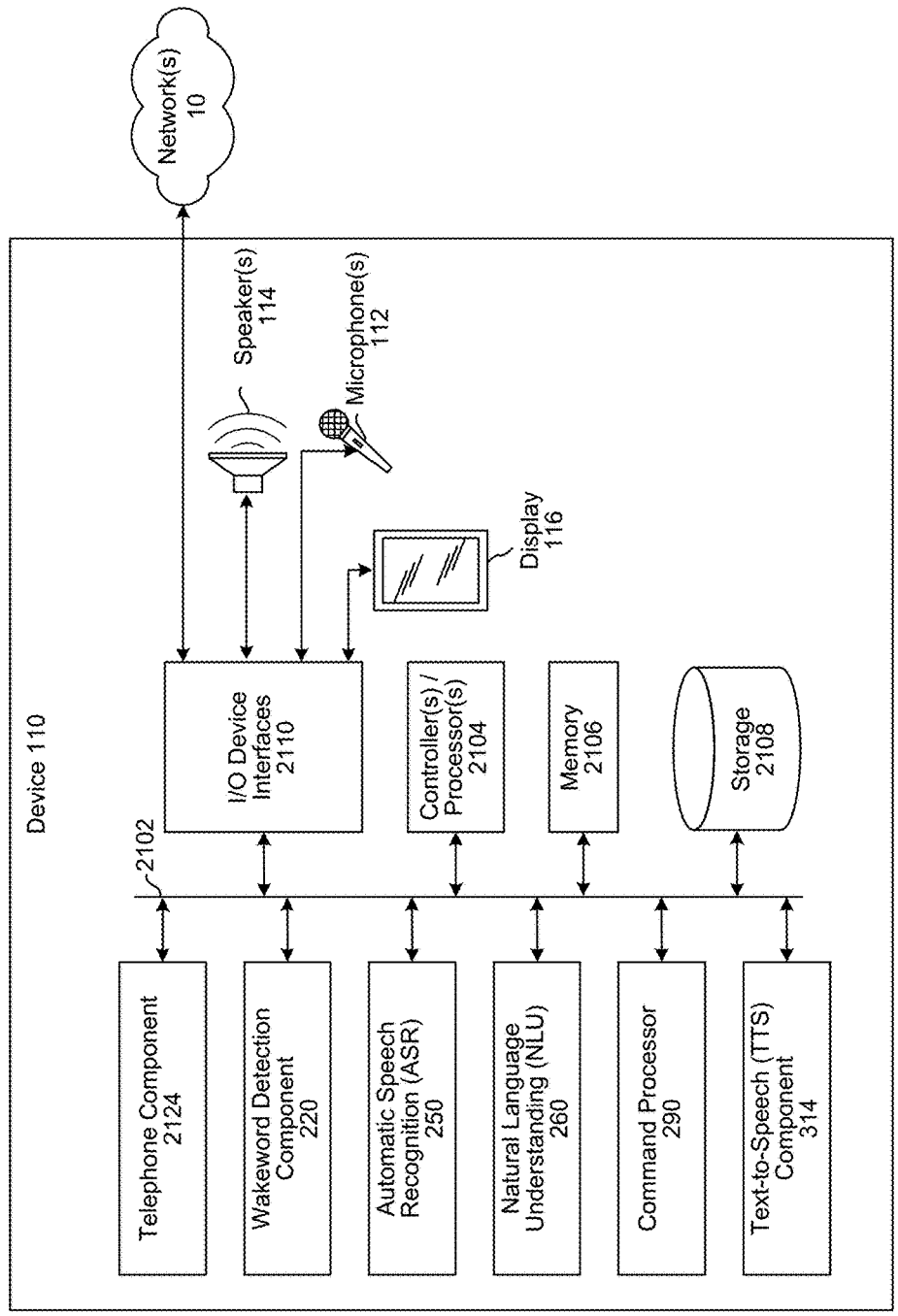
Figure 21C:
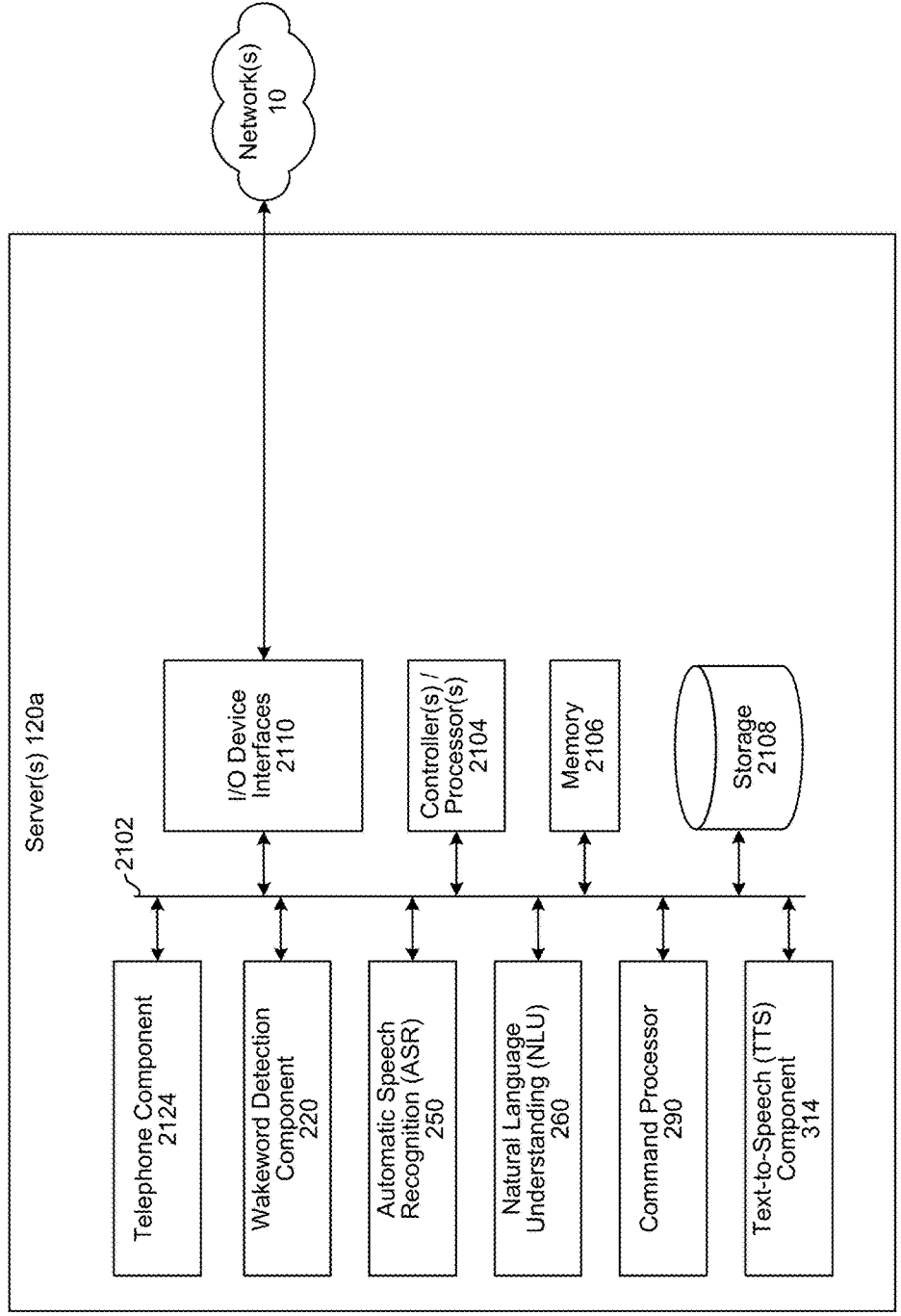

FIG. 21A is a block diagram conceptually illustrating an adapter 108 that may be used with the described system 100. FIG. 21B is a block diagram conceptually illustrating a device 110 that may be used with the described system 100. FIG. 21C is a block diagram conceptually illustrating example components of a remote device, such as remote server(s) 120*a* that may assist with Automatic Speech Recognition (ASR), Natural Language Understanding (NLU) processing, command processing, generating and storing progress data and/or generating synthesized speech. Multiple such server(s) 120*a* may be included in the system 100, such as one or more server(s) 120*a* for ASR, one or more server(s) 120*a* for NLU, etc. FIG. 21D is a block diagram conceptually illustrating example components of a remote device, such as remote server(s) 120*b* that may assist with communication. Multiple such server(s) 120*b* may be included in the system 100.

In operation, the system 100 may include computer-readable and computer-executable instructions that reside on the adapter 108, device 110, server(s) 120*a* and/or server(s) 120*b*, as will be discussed further below. The device 110 may be an electronic device capable of receiving voice commands, generating synthesized speech, receiving audio/video content, generating audio output and/or generating video output. Examples of electronic devices may include computers (e.g., a desktop, a laptop, a server or the like), portable devices (e.g., a smart phone, tablet or the like), media devices (e.g., televisions, video game consoles, media components or the like) or the like. The device 110/server(s) 120*a*/server(s) 120*b* may also be a component of any of the abovementioned devices or systems. The adapter 108 may be a device connected to the phone network 20 via a wired connection and may be connected to the network(s) 10 via a wired and/or wireless connection. Thus, the adapter 108 may send and receive audio data via the phone network 20 and may send and receive any data (e.g., data, audio data, video data, etc.) via the network(s) 10.

As illustrated in FIGS. 21A-21D, the adapter 108/device 110/server(s) 120*a*/server(s) 120*b* may include an address/data bus 2102 for conveying data among components of the adapter 108/device 110/server(s) 120*a*/server(s) 120*b*. Each component within the adapter 108/device 110/server(s) 120*a*/server(s) 120*b* may also be directly connected to other components in addition to (or instead of) being connected to other components across the bus 2102.

The adapter 108/device 110/server(s) 120*a*/server(s) 120*b* may include one or more controllers/processors 2104, that may each include a central processing unit (CPU) for processing data and computer-readable instructions, and a memory 2106 for storing data and instructions. The memory 2106 may include volatile random access memory (RAM), non-volatile read only memory (ROM), non-volatile magnetoresistive (MRAM) and/or other types of memory. The adapter 108/device 110/server(s) 120*a*/server(s) 120*b* may also include a data storage component 2108, for storing data and controller/processor-executable instructions (e.g., instructions to perform the algorithm illustrated in FIGS. 1, 13, 14, 15A-15B, 16A-16B, 17A-17C and/or 20A-20C). The data storage component 2108 may include one or more non-volatile storage types such as magnetic storage, optical storage, solid-state storage, etc. The adapter 108/device 110/server(s) 120*a*/server(s) 120*b* may also be connected to removable or external non-volatile memory and/or storage (such as a removable memory card, memory key drive, networked storage, etc.) through the input/output device interfaces 2110.

The adapter 108/device 110/server(s) 120*a*/server(s) 120*b* includes input/output device interfaces 2110. A variety of components may be connected through the input/output device interfaces 2110. For example, the adapter 108 may be connected to the network(s) 10 and to the phone network 20 using the input/output device interfaces 2110. The adapter 108 (using input/output device interfaces 2110, etc.) may be configured to transmit and/or receive audio data using the phone network 20 and to transmit and/or receive data using the network(s) 10. In addition, the adapter 108 may be configured to transmit the audio data to server(s) 120*a* for further processing and/or to process the audio data using internal components such as an optional wakeword detection component 220.

In some examples, the device 110 may be connected to a microphone(s) 112, speakers 114, and/or a display 116. However, the disclosure is not limited thereto and the device 110 may not include integrated microphone(s) 112, speakers 114, and/or display 116. Thus, the microphone(s) 112, speakers 114, display 116, and/or other components may be integrated into the device 110 or may be separate from the device 110 without departing from the disclosure. In some examples, the device 110 may include an inertial measurement unit (IMU), gyroscope, accelerometers or other component configured to provide motion data or the like associated with the device 110. If an array of microphones 112 is included, approximate distance to a sound's point of origin may be performed acoustic localization based on time and amplitude differences between sounds captured by different microphones of the array. The device 110 (using microphone 112, wakeword detection component 220, ASR component 250, etc.) may be configured to determine audio data corresponding to detected audio. The device 110 (using input/output device interfaces 2110, etc.) may also be configured to transmit the audio data to server(s) 120*a* for further processing or to process the data using internal components such as a wakeword detection component 220.

The input/output device interfaces 2110 may be configured to operate with network(s) 10, for example a wireless local area network (WLAN) (such as WiFi), Bluetooth, ZigBee and/or wireless networks, such as a Long Term Evolution (LTE) network, WiMAX network, 3G network, etc. The network(s) 10 may include a local or private network or may include a wide network such as the internet. Devices may be connected to the network(s) 10 through either wired or wireless connections.

The input/output device interfaces 2110 may also include an interface for an external peripheral device connection such as universal serial bus (USB), FireWire, Thunderbolt, Ethernet port or other connection protocol that may connect to network(s) 10. The input/output device interfaces 2110 may also include a connection to an antenna (not shown) to connect one or more network(s) 10 via an Ethernet port, a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc.

The device 110 and/or the server(s) 120*a* may include a wakeword detection component 220, an automatic speech recognition (ASR) 250, a natural language understanding (NLU) 260, a command processor 290 and/or a text-to-speech (TTS) component 314 as described above with regard to FIGS. 2-3. In some examples, the adapter 108 may optionally include the wakeword detection component 220, as illustrated by the dashed line, although the disclosure is not limited thereto.

The ASR component 250 in device 110 may be of limited or extended capabilities. The ASR component 250 may include the language models 254 stored in ASR model storage component 252, and an ASR component 250 that performs the automatic speech recognition process. If limited speech recognition is included, the ASR component 250 may be configured to identify a limited number of words, such as keywords detected by the device, whereas extended speech recognition may be configured to recognize a much larger range of words.

The device 110 and/or server(s) 120*a* may include a limited or extended NLU component 260. The NLU component in device 110 may be of limited or extended capabilities. The NLU component 260 may comprise the name entity recognition component 262, the intent classification component 264 and/or other components. The NLU component 260 may also include a stored knowledge base and/or entity library, or those storages may be separately located.

The device 110 and/or server(s) 120a may also include a command processor 290 that is configured to execute commands/functions associated with a spoken command as described above.

The device 110 may include a wakeword detection component 220, which may be a separate component or may be included in an ASR component 250. The wakeword detection component 220 receives audio signals and detects occurrences of a particular expression (such as a configured keyword) in the audio. This may include detecting a change in frequencies over a specific period of time where the change in frequencies results in a specific audio signature that the system recognizes as corresponding to the keyword. Keyword detection may include analyzing individual directional audio signals, such as those processed post-beamforming if applicable. Other techniques known in the art of keyword detection (also known as keyword spotting) may also be used. In some embodiments, the device 110 may be configured collectively to identify a set of the directional audio signals in which the wake expression is detected or in which the wake expression is likely to have occurred.

The wakeword detection component 220 receives captured audio and processes the audio (for example, using model(s) 232) to determine whether the audio corresponds to particular keywords recognizable by the device 110 and/or system 100. The storage 2108 may store data relating to keywords and functions to enable the wakeword detection component 220 to perform the algorithms and methods described above. The locally stored speech models may be pre-configured based on known information, prior to the device 110 being configured to access the network by the user. For example, the models may be language and/or accent specific to a region where the user device is shipped or predicted to be located, or to the user himself/herself, based on a user profile, etc. In an aspect, the models may be pre-trained using speech or audio data of the user from another device. For example, the user may own another user device that the user operates via spoken commands, and this speech data may be associated with a user profile. The speech data from the other user device may then be leveraged and used to train the locally stored speech models of the device 110 prior to the user device 110 being delivered to the user or configured to access the network by the user. The wakeword detection component 220 may access the storage 2108 and compare the captured audio to the stored models and audio sequences using audio comparison, pattern recognition, keyword spotting, audio signature, and/or other audio processing techniques.

In some examples, the device 110 may not include the ASR 250, the NLU 260, the command processor 290 and/or the TTS component 314. Instead, the server(s) 120a may include these components and may receive audio input, perform ASR/NLU on the audio input to generate and store program data, determine a command and/or generate synthesized speech. Thus, the device 110 may receive data and/or instructions from the server(s) 120a to perform functionality associated with the ASR 250, the NLU 260, the command processor 290 and/or the TTS component 314. Additionally or alternatively, in some examples the server(s) 120a may not include the wakeword detection component 220.

The server(s) 120b may include an outbound SIP translator 532, an inbound SIP translator 534, a call state database 540, a STUN server 710, a TURN server 720, a SIP proxy 1110 and/or a SIP Registrar 1112 as described above with regard to FIGS. 5-7 and 11-12.

The adapter 108/device 110/server(s) 120a/server(s) 120b further includes a telephone component 2124, which may comprise processor-executable instructions stored in storage 2108 to be executed by controller(s)/processor(s) 2104 (e.g., software, firmware, hardware, or some combination thereof). For example, components of the telephone component 2124 may be part of a software application running in the foreground and/or background on the adapter 108/device 110/server(s) 120a/server(s) 120b. The telephone component 2124 may control the adapter 108/device 110/server(s) 120a/server(s) 120b as discussed above, for example with regard to FIGS. 1, 13, 14, 15A-15B, 16A-16B, 17A-17C and/or 20A-20C. Some or all of the controllers/components of the telephone component 2124 may be executable instructions that may be embedded in hardware or firmware in addition to, or instead of, software. In one embodiment, the adapter 108/device 110/server(s) 120a/server(s) 120b may operate using an Android operating system (such as Android 4.3 Jelly Bean, Android 4.4 KitKat or the like), an Amazon operating system (such as FireOS or the like), or any other suitable operating system.

Executable computer instructions for operating the adapter 108/device 110/server(s) 120a/server(s) 120b and its various components may be executed by the controller(s)/processor(s) 2104, using the memory 2106 as temporary "working" storage at runtime. The executable instructions may be stored in a non-transitory manner in non-volatile memory 2106, storage 2108, or an external device. Alternatively, some or all of the executable instructions may be embedded in hardware or firmware in addition to or instead of software.

The components of the adapter 108/device 110/server(s) 120a/server(s) 120b, as illustrated in FIGS. 21A-21D, are exemplary, and may be located a stand-alone device or may be included, in whole or in part, as a component of a larger device or system.

The concepts disclosed herein may be applied within a number of different devices and computer systems, including, for example, general-purpose computing systems, server-client computing systems, mainframe computing systems, telephone computing systems, laptop computers, cellular phones, personal digital assistants (PDAs), tablet computers, video capturing devices, video game consoles, speech processing systems, distributed computing environments, etc. Thus the components, components and/or processes described above may be combined or rearranged without departing from the scope of the present disclosure. The functionality of any component described above may be allocated among multiple components, or combined with a different component. As discussed above, any or all of the components may be embodied in one or more general-purpose microprocessors, or in one or more special-purpose digital signal processors or other dedicated microprocessing hardware. One or more components may also be embodied in software implemented by a processing unit. Further, one or more of the components may be omitted from the processes entirely.

The above embodiments of the present disclosure are meant to be illustrative. They were chosen to explain the principles and application of the disclosure and are not intended to be exhaustive or to limit the disclosure. Many modifications and variations of the disclosed embodiments may be apparent to those of skill in the art. Persons having ordinary skill in the field of computers and/or digital imaging should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Embodiments of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media.

Embodiments of the present disclosure may be performed in different forms of software, firmware and/or hardware. Further, the teachings of the disclosure may be performed by an application specific integrated circuit (ASIC), field programmable gate array (FPGA), or other component, for example.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each is present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, comprising:
   receiving, via a data network from a speech-controlled device associated with a user profile, first audio data;
   performing speech processing using the first audio data to determine that the first audio data represents a command to initiate a telephone call to a recipient user profile using a public switched telephone network (PSTN);
   identifying, using the user profile, a phone number associated with the recipient user profile;
   sending, via the data network, the phone number to the speech-controlled device; and
   sending, to the speech-controlled device via the data network, an instruction to initiate the telephone call using the PSTN via an adapter, the adapter coupled to the PSTN and configured to facilitate communications from the PSTN to the speech-controlled device, the instruction causing the speech-controlled device to send the phone number to the adapter and the adapter to dial the phone number.

2. The computer-implemented method of claim 1, further comprising, by the at least one server:
   receiving, from the adapter via the data network, a notification of an incoming telephone call from a second phone number;
   sending, to the speech-controlled device via the data network, the notification of the incoming telephone call from the second phone number;
   receiving, from the speech-controlled device via the data network, a second command to answer the incoming telephone call; and
   sending, to the adapter via the data network, a second instruction to answer the incoming telephone call, the second instruction causing the adapter to answer the incoming telephone call using the PSTN.

3. The computer-implemented method of claim 1, further comprising:
   receiving, from the adapter via the data network, second audio data corresponding to call audio data received by the adapter from a recipient device over the PSTN during the telephone call;
   sending, to the speech-controlled device via the data network, the second audio data, the speech-controlled device configured to output audio corresponding to the second audio data using a first speaker associated with the speech-controlled device;
   receiving, from the speech-controlled device via the data network, third audio data, the third audio data generated by a microphone associated with the speech-controlled device; and
   sending, to the adapter via the data network, the third audio data to be sent by the adapter to the recipient device over the PSTN during the telephone call;
   receiving, from the adapter via the data network, first data corresponding to telephone statistics associated with a second telephone call over the PSTN;
   receiving, from the speech-controlled device via the data network, a request for at least a portion of the telephone statistics;
   generating fourth audio data corresponding to the at least the portion of the telephone statistics; and
   sending, to the speech-controlled device via the data network, the fourth audio data.

4. The computer-implemented method of claim 1, further comprising:
   receiving, from the speech-controlled device via the data network, second audio data;
   performing speech processing using the second audio data to determine that the second audio data represents a second command to initiate a second telephone call to a second recipient user profile over the PSTN;
   identifying a second phone number associated with the second recipient user profile;
   sending, to the adapter via the data network, a second instruction to initiate the second telephone call over the PSTN, the second instruction causing the adapter to dial the second phone number;

receiving, from the adapter via the data network at a first time, an indication that the PSTN is currently unavailable to initiate the second telephone call;

sending, to the speech-controlled device via the data network, a first notification that the PSTN is unavailable to initiate the second telephone call;

receiving, from the adapter via the data network at a second time after the first time, a second indication that the PSTN is available to initiate the second telephone call; and sending, to the speech-controlled device via the data network, a second notification that the PSTN is available to initiate the second telephone call.

5. A computer-implemented method comprising:

receiving, via a data network from a first device, first audio data;

performing speech processing using the first audio data to determine that the first audio data represents a command to initiate a telephone call using a public switched telephone network (PSTN);

sending, to the first device via the data network, a first instruction to initiate the telephone call over the PSTN via an adapter; and sending, to the adapter via the data network, a second instruction to send second audio data corresponding to the telephone call to the first device, wherein the adapter is coupled to the PSTN and configured to facilitate communications from the PSTN to the first device.

6. The computer-implemented method of claim 5, further comprising:

receiving, from the adapter via the data network, the second audio data received over the PSTN during the telephone call;

sending, to the first device via the data network, the second audio data;

receiving, from the first device via the data network, third audio data; and sending, to the adapter via the data network, the third audio data to be sent over the PSTN during the telephone call.

7. The computer-implemented method of claim 5, further comprising:

receiving, from the adapter via the data network, a notification of an incoming telephone call;

sending, to the first device via the data network, the notification of the incoming telephone call;

receiving, from the first device via the data network, a second command to answer the incoming telephone call; and sending, to the adapter via the data network, a second instruction to answer the incoming telephone call, the second instruction causing the adapter to answer the incoming telephone call over the PSTN.

8. The computer-implemented method of claim 5, further comprising:

determining, based on a user profile associated with the first device, a phone number with which to initiate the telephone call;

determining that the adapter is connected to the PSTN and is associated with the user profile;

determining a network address associated with the adapter; and sending, to the adapter via the data network and using the network address, the instruction to initiate the telephone call, the instruction including the phone number.

9. The computer-implemented method of claim 5, further comprising:

performing speech recognition on the first audio data to determine first text data;

determining, based on the first text data, that the first audio data represents the command to initiate the telephone call over the PSTN;

determining, based on the first text data and a user profile associated with the first device, a contact name;

determining a phone number corresponding to the contact name;

sending, to the adapter via the data network, the phone number; and sending, to the adapter via the data network, the instruction to initiate the telephone call using the phone number.

10. The computer-implemented method of claim 5, further comprising:

receiving, from the adapter via the data network, an indication that an alarm is triggered;

determining a physical location associated with the adapter;

determining a second device in proximity to the physical location; and sending, to the second device via the data network, a second instruction, the second instruction causing the second device to at least one of:

generate audio using one or more speakers associated with the second device; or capture third audio data using one or more microphones associated with the second device.

11. The computer-implemented method of claim 5, further comprising:

sending, to the adapter via the data network, a second instruction to initiate a second telephone call over the PSTN;

receiving, from the adapter via the data network at a first time, an indication that the PSTN is currently unavailable to initiate the second telephone call;

sending, to the first device via the data network, a first notification that the PSTN is unavailable to initiate the second telephone call;

receiving, from the adapter via the data network at a second time after the first time, a second indication that the PSTN is available to initiate the second telephone call; and sending, to the first device via the data network, a second notification that the PSTN is available to initiate the second telephone call.

12. The computer-implemented method of claim 5, further comprising:

sending, to the adapter via the data network, a second instruction to initiate a second telephone call over the PSTN;

receiving, from the adapter via the data network at a first time, an indication that the PSTN is currently unavailable to initiate the second telephone call;

sending, to the first device via the data network, a first notification that the PSTN is unavailable to initiate the second telephone call;

receiving, from the first device via the data network, a second command to automatically initiate the second telephone call when the PSTN becomes available;

receiving, from the adapter via the data network at a second time after the first time, a second indication that the PSTN is available to initiate the second telephone call;

sending, to the adapter via the data network, the second instruction to initiate the second telephone call over the PSTN;

receiving, from the adapter via the data network, third audio data; and sending, to the first device via the data network, a notification of the second telephone call.

13. The computer-implemented method of claim 5, further comprising:

receiving, from the adapter via the data network, first data corresponding to telephone statistics associated with a second telephone call over the PSTN;

receiving, from a second device via the data network, a request for at least a portion of the telephone statistics;

generating third audio data corresponding to the at least the portion of the telephone statistics; and sending, to the second device via the data network, the third audio data.

14. The computer-implemented method of claim 5, further comprising:

receiving, from the adapter via the data network, an indication that a second device is connected to the PSTN during the telephone call and is receiving the second audio data; and sending, to the first device via the data network, a notification that the telephone call is not secure.

15. A system, comprising:

at least one processor;

at least one network component configured to connect to at least one data network;

memory including instructions operable to be executed by the at least one processor to cause the system to:

receive, via the data network from a first device, first audio data;

perform speech processing using the first audio data to determine that the first audio data represents a command to initiate a telephone call using a public switched telephone network (PSTN);

send, to the first device via the at least one network component, a first instruction to initiate the telephone call over the PSTN via an adapter; and sending, to the adapter via the at least one network component, a second instruction to send second audio data corresponding to the telephone call to the first device, wherein the adapter is coupled to the PSTN and configured to facilitate communication from the PSTN to the first device.

16. The system of claim 15, wherein the memory further comprises instructions that, when executed by the at least one processor further cause the system to:

receive, from the adapter via the at least one network component, the second audio data received over the PSTN during the telephone call;

send, to the first device via the at least one network component, the second audio data;

receive, from the first device via the at least one network component, third audio data; and send, to the adapter via the at least one network component, the third audio data to be sent over the PSTN during the telephone call.

17. The system of claim 15, wherein the memory further comprises instructions that, when executed by the at least one processor further cause the system to:

receive, from the adapter via the at least one network component, a notification of an incoming telephone call;

send, to the first device via the at least one network component, the notification of the incoming telephone call;

receive, from the first device via the at least one network component, a second command to answer the incoming telephone call; and send, to the adapter via the at least one network component, a second instruction to answer the incoming telephone call, the second instruction causing the adapter to answer the incoming telephone call over the PSTN.

18. The system of claim 15, wherein the memory further comprises instructions that, when executed by the at least one processor further cause the system to:

perform speech recognition on the first audio data to determine first text data;

determine, based on the first text data, that the first audio data represents the command to initiate the telephone call over the PSTN;

determine, based on the first text data and a user profile associated with the first device, a contact name;

determine a phone number corresponding to the contact name;

send, to the adapter via the at least one network component, the phone number; and send, to the adapter via the at least one network component, the instruction to initiate the telephone call using the phone number.

19. The system of claim 15, wherein the memory further comprises instructions that, when executed by the at least one processor further cause the system to:

receive, from the adapter via the at least one network component, an indication that an alarm is triggered;

determine a physical location associated with the adapter;

determine a second device in proximity to the physical location; and send, to the second device via the at least one network component, a second instruction, the second instruction causing the second device to at least one of:

generate audio using one or more speakers associated with the second device; or capture third audio data using one or more microphones associated with the second device.

20. The system of claim 15, wherein the memory further comprises instructions that, when executed by the at least one processor further cause the system to:

send, to the adapter via the at least one network component, a second instruction to initiate a second telephone call over the PSTN;

receive, from the adapter via the at least one network component at a first time, an indication that the PSTN is currently unavailable to initiate the second telephone call;

send, to the first device via the at least one network component, a first notification that the PSTN is unavailable to initiate the second telephone call;

receive, from the first device via the at least one network component, a second command to automatically initiate the second telephone call when the PSTN becomes available;

receive, from the adapter via the at least one network component at a second time after the first time, a second indication that the PSTN is available to initiate the second telephone call;

send, to the adapter via the at least one network component, the second instruction to initiate the second telephone call over the PSTN;

receive, from the adapter via the at least one network component, fourth audio data; and send, to the first device via the at least one network component, a notification of the second telephone call.

* * * * *